(12) United States Patent
Buxbaum et al.

(10) Patent No.: US 12,557,588 B2
(45) Date of Patent: Feb. 17, 2026

(54) METHODS OF CROSS-SECTION IMAGING OF AN INSPECTION VOLUME IN A WAFER

(71) Applicant: Carl Zeiss SMT GmbH, Oberkochen (DE)

(72) Inventors: Alex Buxbaum, San Ramon, CA (US); Eugen Foca, Ellwangen (DE); Chuong Huynh, Quincy, MA (US); Dmitry Klochkov, Schwaebisch Gmuend (DE); Thomas Korb, Schwaebisch Gmuend (DE); Jens Timo Neumann, Aalen (DE); Baohua Niu, Livermore, CA (US)

(73) Assignee: Carl Zeiss SMT GmbH, Oberkochen (DE)

( * ) Notice: Subject to any disclaimer, the term of this patent is extended or adjusted under 35 U.S.C. 154(b) by 338 days.

(21) Appl. No.: 17/820,117

(22) Filed: Aug. 16, 2022

(65) Prior Publication Data
US 2022/0392793 A1 Dec. 8, 2022

Related U.S. Application Data

(63) Continuation of application No. PCT/EP2021/055670, filed on Mar. 5, 2021.
(Continued)

(30) Foreign Application Priority Data

Mar. 13, 2020 (DE) .......................... 102020203228.9
May 26, 2020 (DE) .......................... 102020206503.9

(51) Int. Cl.
*H01L 21/67* (2006.01)
*G06T 7/00* (2017.01)
(Continued)

(52) U.S. Cl.
CPC ...... *H01L 21/67288* (2013.01); *G06T 7/0004* (2013.01); *G06T 7/30* (2017.01);
(Continued)

(58) Field of Classification Search
CPC ....... H01L 21/67288; G06T 7/50; G06T 7/30; G06T 7/0004; G06T 2207/10028;
(Continued)

(56) References Cited

U.S. PATENT DOCUMENTS 7,348,556 B2 3/2008 Chitturi
9,466,537 B2 10/2016 Kim
(Continued)

FOREIGN PATENT DOCUMENTS

CN 105264635 A 1/2016
JP 2014-116292 A 6/2014
(Continued)

OTHER PUBLICATIONS

German Office Action, with translation thereof, for corresponding DE Appl 102020203228.9, dated Oct. 29, 2020.
(Continued)

*Primary Examiner* — Michael J Logie
*Assistant Examiner* — Hanway Chang
(74) *Attorney, Agent, or Firm* — Fish & Richardson P.C.

(57) ABSTRACT

The present disclosure relates to dual beam device and three-dimensional circuit pattern inspection techniques by cross sectioning of inspection volumes with large depth extension exceeding 1 μm below the surface of a semiconductor wafer, as well as methods, computer program products and apparatuses for generating 3D volume image data of a deep inspection volume inside a wafer without removal of a sample from the wafer. The disclosure further relates to 3D volume image generation and cross section image align-
(Continued)

ment methods utilizing a dual beam device for three-dimensional circuit pattern inspection.

31 Claims, 29 Drawing Sheets

Related U.S. Application Data

(60) Provisional application No. 63/145,612, filed on Feb. 4, 2021, provisional application No. 63/059,438, filed on Jul. 31, 2020, provisional application No. 63/037,847, filed on Jun. 11, 2020.

(51) Int. Cl.
| | |
|---|---|
| *G06T 7/30* | (2017.01) |
| *G06T 7/50* | (2017.01) |
| *H01J 37/22* | (2006.01) |
| *H01J 37/28* | (2006.01) |
| *H01J 37/305* | (2006.01) |

(52) U.S. Cl.
CPC .............. *G06T 7/50* (2017.01); *H01J 37/222* (2013.01); *H01J 37/28* (2013.01); *H01J 37/3053* (2013.01); *G06T 2207/10028* (2013.01); *G06T 2207/30148* (2013.01); *H01J 2237/226* (2013.01); *H01J 2237/24578* (2013.01); *H01J 2237/2803* (2013.01)

(58) Field of Classification Search
CPC .......... G06T 2207/30148; H01J 37/222; H01J 37/28; H01J 37/3053; H01J 2237/226; H01J 2237/24578; H01J 2237/2803
See application file for complete search history.

(56) References Cited

U.S. PATENT DOCUMENTS

| | | |
|---|---|---|
| 9,633,819 B2 | 4/2017 | Phaneuf |
| 9,941,096 B2 | 4/2018 | Schmidt |
| 10,026,590 B2 | 7/2018 | Stone |
| 10,184,790 B2 | 1/2019 | Kawada |
| 2009/0242759 A1 | 10/2009 | Bray |
| 2009/0296073 A1 | 12/2009 | Wagganer |
| 2013/0186747 A1 | 7/2013 | Schmidt |
| 2013/0248708 A1 | 9/2013 | Man |
| 2013/0306862 A1 | 11/2013 | Tanner |
| 2014/0226003 A1 | 8/2014 | Phaneuf |
| 2015/0262788 A1 | 9/2015 | Uemoto et al. |
| 2018/0301319 A1 | 10/2018 | Stone et al. |
| 2020/0051777 A1 | 2/2020 | Shneyour et al. |

FOREIGN PATENT DOCUMENTS

| | | |
|---|---|---|
| JP | 2016-503890 A | 2/2016 |
| JP | 6374035 B2 | 11/2017 |
| TW | 201600828 A | 1/2016 |
| WO | WO 2018/020627 A1 | 2/2018 |
| WO | WO 2020/244795 | 12/2020 |

OTHER PUBLICATIONS

German Office Action, with translation thereof, for corresponding DE Appl 102020206503.9, dated Jun. 30, 2020.
International Search Report and Written Opinion for corresponding App No. PCT/EP2021/055670, dated Jul. 13, 2021.
Michael D. Uchic et AL., "Three-Dimensional Microstructural Characterization Using Focused Ion Beam Tomography", Mrs Bulletin, vol. 32, No. 05, May 1, 2007 (May 1, 2007), pp. 408-416.
Uchic M D ET AL., "Microstructural tomography of a Ni(70)Cr(20)Al(10) superalloy using focused ion beam microscopy", Ultramicroscopy, Elsevier, Amsterdam, NL, vol. 109, No. 10, Sep. 1, 2009 (Sep. 1, 2009), pp. 1229-1235.
U.S. Appl. No. 62/858,470, "Cross section imaging with improved 3D volume image reconstruction accuracy", filed Jun. 7, 2019.
German Patent Application No. 10 2019 006 645.6, "Cross section imaging with improved 3D volume image reconstruction accuracy", filed Sep. 20, 2019.
Korean Office Action, with English translation thereof, for corresponding KR Application No. 2022-7035231, dated Oct. 18, 2024.
Japanese Office Action, with English translation thereof, for corresponding JP Application No. 2022-555175, dated Nov. 19, 2024.
Office Action in Japanese Appln. No. 2022-555175, mailed on Mar. 3, 2025, 5 pages (with English translation).
Office Action in Taiwanese Appln. No. 110108261, mailed on May 1, 2025, 15 pages (with English translation).
Office Action in Chinese Appln No. 202180020918.0, mailed on Jun. 28, 2025, 13 pages (with English translation).

METHODS OF CROSS-SECTION IMAGING OF AN INSPECTION VOLUME IN A WAFER

CROSS-REFERENCE TO RELATED APPLICATIONS

The present application is a continuation of, and claims benefit under 35 USC 120 to, international application PCT/EP2021/055670, filed Mar. 5, 2021, which claims benefit under 35 USC 119 of German Application No. 10 2020 203 228.9, filed Mar. 13, 2020, and German Application No. 10 2020 206 503.9, filed May 26, 2020. International application PCT/EP2021/055670 also claims priority under 35 USC 119(e) to U.S. Provisional Application No. 63/037,847, filed Jun. 11, 2020, U.S. Provisional Application No. 63/059,438, filed Jul. 31, 2020, and U.S. Provisional Application No. 63/145,612, filed Feb. 4, 2021. The entire disclosures of these applications are incorporated by reference herein.

FIELD

The present disclosure relates to three-dimensional circuit pattern inspection and measurement techniques by cross sectioning of integrated circuits. For example, the present disclosure relates to three-dimensional circuit pattern inspection techniques by cross sectioning of inspection volumes at measurement sites of semiconductor wafers comprising integrated circuits and, as an example, to methods, computer program products and corresponding semiconductor inspection devices for obtaining a 3D volume image of an inspection volume at a measurement site of a semiconductor wafer. The methods can employ milling of cross sections surfaces into an inspection volume of a wafer under a slanted angle and imaging the slanted cross section surfaces with a charged particle imaging microscope. The methods, computer program products and devices can be utilized for quantitative metrology, defect detection, process monitoring, defect review, and inspection of integrated circuits within semiconductor wafers.

BACKGROUND

Semiconductor structures are amongst the finest man-made structures and often suffer from only very few imperfections. These rare imperfections can be the signatures which defect detection or defect review or quantitative metrology devices are looking for.

Fabricated semiconductor structures are often based on prior knowledge. The semiconductor structures are generally manufactured from a sequence of layers being parallel to a substrate. For example, typically in a logic type sample, metal lines run parallel in metal layers or HAR (high aspect ratio) structures and metal vias run perpendicular to the metal layers. The angle between metal lines in different layers is usually either 0° or 90°. On the other hand, for VNAND type structures it is known that their cross sections are, in general, circular on average.

In the fabrication of integrated circuits, the features size is becoming smaller. The current minimum feature size or critical dimension is generally below 10 nanometers (nm), for example 7 nm or 5 nm, and is expected to approach below 3 nm in near future. Therefore, it can become challenging to measure edge shapes of patterns and to determine the dimensions of features or the line edge roughness with high precision. Edge shapes of patterns or roughness of lines are usually subject to several influences. Generally, the edge shape of a line or pattern may be subject to the property of involved materials itself, the lithography exposure or any other involved process step, such as etching, deposition, or implantation. The measurement resolution of charged particle systems is typically limited by the sampling raster of individual image points or dwell times per pixel on the sample, and the charged particle beam diameter. The sampling raster resolution can be set within the imaging system and can be adapted to the charged particle beam diameter on the sample. A typical raster resolution is 2 nm or below, but the raster resolution limit can often be reduced with no physical limitation. The charged particle beam diameter generally has a limited dimension, which can depend on the charged particle beam operation conditions and lens. The beam resolution is often limited by approximately half of the beam diameter. The resolution can be below 2 nm, for example even below 1 nm.

With the features sizes of integrated semiconductor circuits becoming smaller, and with the increasing desire for higher resolution of charged particle imaging systems, the inspection and 3D analysis of integrated semiconductor circuits in wafers can become more and more challenging. A semiconductor wafer can have a diameter of 300 mm and can include a plurality of several sites, so called dies, each comprising at least one integrated circuit pattern such as for example for a memory chip or for a processor chip.

Semiconductor wafers often run through about 1000 process steps, and within the semiconductor wafer, about 100 and more parallel layers are typically formed, comprising the transistor layers, the layers of the middle of the line, and the interconnect layers and, in memory devices, a 3D array of memory cells.

A common way to generate 3D tomographic data from semiconductor samples on nm scale is the so-called slice and image approach elaborated for example by a dual beam device. In such an apparatus, two particle optical systems are arranged at an angle. The first particle optical system can be a scanning electron microscope (SEM). The second particle optical system can be a focused ion beam optical system (FIB), using for example gallium (Ga) ions. A focused ion beam (FIB) of Gallium ions is used to cut off layers at an edge of a semiconductor sample slice by slice and every cross-section is imaged using a scanning electron microscope (SEM). The two particle optical systems might be oriented perpendicular or at an angle between 45° and 90°. FIG. 1 shows a schematic view of a slice and image approach, using a FIB optical column 50, with a focused ion beam 51 in z-direction, and scanning in y-z-plane, a thin layer from the cross-section through a semiconductor sample 10 is removed to reveal a new front surface 52 as a cross-section surface 52. In a next step, for example a SEM 40 is used for scanning imaging of the front surface of the cross-section surface 52. In this example, the SEM optical axis 42 is oriented parallel to the x-direction, and the image is generated by scanning the electron beam 44 along scanning imaging lines 46 in y-z-plane. After performing the raster scan of the cross-section surface 52, cross-section image slice 100.1 is formed. By repetition of this approach of FIB milling and SEM imaging through for example front cross-section surfaces 53 and 54, cross-section image slices 100.2 and 100.3 with distance d are obtained. Finally, a sequence of 2D cross-section images 1000 through the sample in different depths is obtained. The distance d between two subsequent image slices can be between 1 nm and some tens of nm, for example 30 nm. From the sequence of these 2D cross-section images 1000, a 3D image of the integrated semiconductor structure can be reconstructed.

FIG. 1 illustrates a slice and image approach at the example of a block shaped integrated semiconductor sample 10, which is removed from a semiconductor wafer by known techniques. The fiducials are formed on top of the block sample. It is a common method to derive the lateral position of each slice as well as the distance from layer to layer with the help of so-called fiducials. U.S. Pat. No. 9,633,819 B2 discloses an alignment method based on guiding structures ("fiducials") exposed to the top of the sample. U.S. Pat. No. 7,348,556 describes an alignment mark on a surface for the determination of a three-dimensional surface roughness from a sequence of successive image slices.

The common known slice and image approach is generally not applicable to inspection volumes inside a wafer. With the known common slice and imaging approach, a sample is removed or extracted from a semiconductor wafer, before it is possible to perform the slice and image method to acquire a 3D volume image of the sample. It is therefore a task to provide a slice and image method applicable to a 3D volume image generation of an inspection volume in a wafer without removal of a sample.

U.S. Pat. No. 7,438,556 shows a method of determination of a line edge or surface roughness with a dual beam FIB/SEM tool. A series of cross-section surfaces is generated by a FIB milling normal to a surface of a sample. A sequence of cross sections is generated at slice distances of about 10 nm or more. A fiducial is applied on the top surface for determining the lateral position of the cross sections. The SEM is inclined to the normal of the surface of the sample and is used to form a sequence of cross-section images. From each cross-section images, a critical dimension (CD) of a feature in direction parallel to the wafer surface is determined. A line edge roughness of a feature is determined from the CDs, wherein in each cross-section image, the edge of the feature is determined with reference to the fiducial. Edge positions perpendicular to the surface of the sample are determined with reference to the fiducial and the known angle of the SEM. The proposed method is believed to be limited to 1D measurements of semiconductor features running parallel to the surface of the sample. Especially, the proposed method does not provide seem to provide a precise determination of the depth of a semiconductor feature below a wafer surface.

For an analysis of repetitive and deep semiconductor features, such as HAR structures of memory devices, a slicing and imaging under a single wedge cut geometry with small slant angles of a FIB-Beam for milling was proposed. For example, U.S. Pat. No. 9,466,537 shows a method of inspection of a semiconductor device with a mold layer. By milling into the mold layer at an inclined angle, an inclined cross-section surface through the mold layer is formed. To achieve the desired inclination angle, a stage holding the sample under investigation is tilted between a milling step and an imaging step. The obtained image of the cutting or cross-section surface is analyzed and for example center positions of semiconductor features are derived relative to a selected semiconductor feature, which serves as a reference. It is claimed that from this analysis, process deviations from fabrication processes can be derived. However, it has turned out that the analysis of a single cut or cross section, and utilizing a feature of interest as reference, can be of limited accuracy and does not provide the information for monitoring fabrication processes. Furthermore, tilting a stage between milling and imaging is often impractical for high throughput inspection tasks.

U.S. Pat. No. 10,026,590 discloses a similar method of inspection of a feature of interest by milling a single cross-section surface into a sample at a glancing angle and a virtual feature is constructed from the cross sections of different features of interest at different depths. The depth is determined according a lateral distance of a cross-section of a feature to an edge of the trench. An improvement of the depth resolution of the virtual feature can be achieved with additional milling operations. To monitor the milling operation, alignment fiducials normal to the FIB beam are proposed. However, it has turned out that a milling under a very small glancing angle may not be possible or may lead to unprecise results of the milling operation, and the derivation of a virtual feature from few cross sections can be of limited accuracy and may not provide the information for monitoring fabrication processes. In addition, depth determination from an edge of a trench or cut is inaccurate, and the application of a fiducial at a surface perpendicular to the FIB Beam can be a difficult and time-consuming process.

With the decreasing thickness of individual layers of a multilayer stack of a semiconductor device, the slant angles for milling a cross section surface into an inspection volume of a wafer can get smaller and smaller, for example below 5° or even below 3°. Such an approach is described in U.S. Pat. No. 9,941,096 BB. It is however difficult, if not impossible, to reach such small slant angles with practical setups. The milling at a very small angle of for example below 150 of a cross section surface into a deep semiconductor structure of a depth of the multilayer structure of about 5 µm or more generally involves milling with the FIB of very large surfaces over a great length in the direction of the milling beam, extending beyond 40 µm or even 100 µm for deeper structures. A milling of such large surfaces can be time consuming and the surface quality decreases drastically with the deeper layers. Furthermore, the large cross section surfaces can exceed the field of view of a typical high resolution charged particle imaging device of between 10 µm and 20 µm, and the imaging of the large cross section surfaces can involve an image stitching. U.S. Ser. No. 10/184,790 proposes a method of image stitching to form a 2D image of an inclined surface, where a series of SEM images is obtained with lateral shift of the sample, and the images are stitched together to form the single 2D image of the inclined surface. The depth is measured with reference to an edge of the trench, visible in one of the SEM images. The achieved 2D information and the limited accuracy may not be enough for recent desired accuracy performance. It is therefore a task of the disclosure to provide a wafer inspection tool and method for 3D volume image generation including imaging of deep structures with high quality.

US 2009 296073 describes a method of analyzing semiconductor features by milling surface substantially parallel to a wafer surface. However, it is unclear how to achieve surfaces of sufficient accuracy parallel to a wafer surface or even by very small angles below 5° or 10° by milling with a FIB without removal of a sample from the wafer.

Recent developments can involve higher accuracy at considerably higher throughput, including a precise determination of a depth of a semiconductor feature below a wafer surface. It is therefore a task to provide a slice and image method applicable to a 3D volume image generation of an inspection volume in a wafer without removal of a sample. It is often desirable to determine the depths of the features in the inspection volume of a wafer with high precision. It is therefore a task to provide a slice and image method applicable to a 3D volume image generation of a volume in a wafer with high resolution in depth and without removal of a sample. It is a further task of the disclosure to provide a wafer defect inspection device and method capable of inspection of defects in an inspection volume of a wafer without removal of a sample from the wafer.

Recently, the trend to further integration of semiconductor circuits can result in even higher stacks of alternating layers formed in or on silicon wafers. Current memory chips generally comprise up to hundred and more different layers, for example 92 layers. A stack of about 100 layers can reach a thickness of height of more than 6 micrometers (µm), and current and future stack heights can reach 10 µm. With the increasing stack height, the imaging of deep structures can be more and more challenging for inspection volumes in a wafer. It is therefore a task to provide a wafer inspection tool and method for 3D volume image generation including imaging of deep structures without destruction of the wafer.

In addition to the increasing depth, the thickness of each of the layers is generally becoming smaller and smaller. For an inspection task, it is desirable to obtain a cross section image through a plurality of HAR structures in one single layer, for example a word-line or an isolation layer. It is therefore a task to provide a wafer inspection tool and method for 3D volume image generation for generation of cross sections through HAR structures in single layers, without removal of a sample from the wafer.

With the increasing depth, the imaging with a charged particle imaging beam of the cross section surfaces of inspection volumes of large depth extension is generally becoming more and more challenging. It is therefore a task to provide a dual beam device and method for 3D volume image generation for inspection of inspection volumes with large depth extension inside a wafer.

A typical wafer inspection task for inline inspection involves a very high throughput. It is therefore a further task of the disclosure to provide a 3D volume inspection in semiconductor devices fabricated in wafers with high throughput.

SUMMARY

The disclosure seeks to provide a method of 3D inspection of an inspection volume in a wafer with a dual beam device and a dual beam device configured for inspection of an inspection volume in a wafer, without the need to extract or remove the inspection volume from the wafer. The disclosure also seeks to provide a computer program product with a program code for executing a method of 3D inspection of an inspection volume in a wafer with a dual beam device. The 3D inspection of the inspection volume in a wafer can be performed in a wedge-cut geometry. The wedge-cut geometry can enable the investigation of an inspection volume with a lateral extension of about 10 µm-15 µm and a depth extension within the wafer of up to 10 µm or more without destruction of wafer or without extraction of a sample volume from the wafer. The slicing and imaging method under wedge-cut geometry is capable of generating a 3D-representation or 3D volume image of the entire inspection volume of the wafer with high lateral resolution of below 5 nm, for example below 2 nm, such as below 1 nm. For the entire inspection volume, a 3D volume image for 3D inspection can be provided.

In some embodiments, the present disclosure provides a dual beam device and a 3D measurement method by cross sectioning and 3D volume image data generation of integrated circuits without removal from samples from a wafer. For example, in certain embodiments, the disclosure provides, a dual beam device and a method of wafer inspection with high resolution of an inspection volume of large depth extension under a surface of a wafer. The present disclosure provides, in some embodiments, a 3D measurement method for three-dimensional circuit pattern inspection of inspection volumes inside wafers without removal of samples from the wafer. For example, in certain embodiments, the present disclosure relates to a three-dimensional circuit pattern inspection technique by cross sectioning of inspection volumes at measurement sites of semiconductor wafers comprising integrated circuits and, more particularly, to a method, computer program product and a corresponding semiconductor inspection device for obtaining a 3D volume image of an inspection volume at a measurement site of a semiconductor wafer without removal of samples from the wafer. The method can employ a depth determination of first cross-section image features by utilizing second cross-section image features. The plurality of second cross-section image features can correspond to structures in layers in the integrated circuit, or generally, to structures of known or predetermined depth. In an example, the depth determination of a first cross-section is a relative depth determination in relation to the plurality of second cross-section image features. After acquisition and alignment of at least one cross-section images slice and depth determination of the first cross-section images features, the inspection volume at a measurement site of a wafer can be evaluated for example for fabrication errors of the wafer. The fabrication errors can be analyzed and for example a failure analysis of the fabricated wafer is performed. In an example, the fabrication errors are analyzed and for example a specific fabrication process step for fabricating the wafer is improved. The method, computer program product and device can be utilized for quantitative metrology, defect detection, process monitoring, defect review, and inspection of integrated circuits within semiconductor wafers.

In some embodiments, a method of wafer inspection of at least a first inspection volume in a wafer with a first dual beam device comprising the step of loading the wafer on a wafer support table in the dual beam device, the dual beam device comprising at least a FIB column and a charged particle imaging device, with a first optical axis of the FIB column forming the slanted angle GF with a surface of the wafer support table, and a second optical axis of the charged particle imaging device forming an angle GE with the normal to the surface of a wafer support table, the first and second optical axes forming an intersection point. The method of wafer inspection can further comprise the step of movement of the wafer support table to bring a first measurement site on the wafer in coincidence with an intersection point of the dual beam device and milling a first cross section surface at a slanted angle GF in the first inspection volume with the FIB column. The method of wafer inspection can further comprise generating a first cross section image slice of the first cross section surface with the charged particle imaging device. The method of wafer inspection can further comprise the step of obtaining a performance indicator of a plurality of first semiconductor features in the first inspection volume comprising the step of analyzing the at least one first cross section image slice with a priori information about the plurality of first semiconductor features. In an example, the first semiconductor feature is one of a via, a HAR structure, or a HAR channel and the step of analyzing comprises a step of an image processing to extract a plurality of first cross section image features representing cross sections of the plurality of first semiconductor features at slant angle GF, and the image processing comprising at least one of a feature extraction, an edge detection, a pattern recognition, or a pixel interpolation. In an example, the step of obtaining a performance indicator further comprises the step of computing at least a descriptive parameter of a first semiconductor feature from at least one of the plurality of first cross section image features, with the descriptive parameter being one of a dimension, a diameter, an angle, an area, a shape or a volume. In an example, the step of obtaining a performance indicator further comprises the step of computing one of an average or a statistical deviation of the at least one descriptive parameter of the plurality of first semiconductor features. In an example, the step of analyzing further comprises generating a depth map $Z(x,y)$ of the first cross section image slice. In an example, the step of generating the depth map further comprises determining at least two second cross section image features in the first cross section image slice and determining the depth map $Z(x,y)$ from a lateral positions of the at least two second cross section image features. The at least two second cross section image features can represent integrated semiconductor structures or features at a different depth within the inspection volume. The plurality of first semiconductor features can extend in a direction perpendicular to the wafer surface, and the second cross section image features can comprise cross sections of semiconductor structures extending in a direction parallel to the wafer surface. In an example, the second cross section image features comprise at least cross sections of one of an isolator line or layer, a metal line or layer, a semiconductor line or layer. The step of obtaining a performance indicator can further comprise the derivation of a tilt angle deviation of the plurality of first semiconductor features from the lateral positions of the plurality of first cross section image features, the tilt angle deviation being an angle of a first semiconductor feature with respect to an axis normal of the wafer surface.

In an example, the method of wafer inspection further comprises the step of deriving a 3D representative of the first plurality of semiconductor features from the plurality of first cross sections image features arranged at the slant angle GF and the depth map $Z(x,y)$.

In an example, the step of analyzing further comprises comparing the first cross section image slice with a 2D digital image slice through an inspection volume of a reference wafer or die. The 2D digital image slice can be a cross section image slice obtained in a previous measurement of a reference wafer or die and stored in a memory. In an example, the 2D digital image slice is a virtual cross section image slice, and wherein the virtual cross section image slice is generated from a 3D volume image data stored in a memory.

In an example, the 3D volume image data is obtained in a previous slice and image measurement of an inspection volume of a reference wafer or die and stored in the memory. In an example, the previous slice and image measurement is performed with a second dual beam device comprising at least a second FIB column and a second charged particle imaging device. In an example, the previous slice and image measurement is performed by the first dual beam device.

In an example, the method of wafer inspection further comprises: movement of the wafer support table to bring a second measurement site of the wafer in coincidence with an intersection point of the first dual beam device; milling a second cross section surface at the slanted angle GF in a second inspection volume with the FIB column; generating a second cross section image slice of the second cross section surface with the charged particle imaging device; and obtaining the performance indicator of the plurality of first semiconductor features in the first and second inspection volumes by analyzing the first and the second cross section image slices with a priori information about the plurality of first semiconductor features.

In an example, between the milling of the first cross section surface in the first inspection volume and the milling of the second cross section surface in the second inspection volume, the wafer support table is rotated with respect to an axis normal to the wafer support surface, and the step of derivation of a tilt angle deviation of the plurality of first semiconductor features can comprise an analysis of the first and second cross section image slices.

In some embodiments, the disclosure provides a wafer defect inspection device, wherein the wafer defect inspection device is configured to inspect an inspection volume in the wafer, while the inspection volume is not extracted from the wafer, comprising: a focused ion beam (FIB) column configured for milling and exposing at least a first cross section surface at a slant angle GF through a first inspection volume in a wafer; a charged particle imaging device configured for imaging of the at least first cross section surface to form a first cross section image slice; an image processing unit with a software code installed configured to determine a plurality of cross section image features in the at least first cross section image slice and to determine the depth of the plurality of cross section features within the inspection volume, the plurality of cross section image features being cross sections of semiconductor structures at the slant angle GF inside the inspection volume; a defect detection unit configured to determine from the plurality of cross section image features deviations from predetermined properties of the semiconductor structures inside the inspection volume.

In an example, the image processing unit with a software code installed is further configured for computing a 3D representative of the plurality of first semiconductor structures from the plurality of first cross sections image features arranged at the slant angle GF. In an example, wafer defect inspection device further comprises a memory for storing a priori information. The memory device can be part of a control unit or of an image processing unit of the control unit.

In some embodiments, the method of inspection of an inspection volume in a wafer with a dual beam device comprises the step of loading the wafer on a wafer support table in the dual charged particle beam tool and movement of the wafer support table to bring a first measurement site of the wafer in coincidence with an intersection point of the optical axes of FIB and charged particle imaging device. The method can further comprise the step of obtaining a sequence or a plurality of N cross-section images slices comprising at least a first cross-section image slice and a second cross-section image slice in an inspection volume. The number N of cross-section images slices can be at least N=10 (e.g., N>100, N≥300, N>1000). The plurality of cross-section image slices can be obtained by subsequently exposing a plurality of N cross-section surfaces in the inspection volume by milling into the inspection volume with the FIB column approximately at angle GF, and imaging each of the plurality of N cross-section surfaces with the charged particle imaging device to obtain a plurality of cross-section image slices. The plurality of cross-section surfaces can comprise at least a first and a second cross-section surface. The plurality of cross-section image slices can comprise at least a first and a second cross-section image slice. The method can further comprise determining at least one first cross-section image feature in the first and in the second cross-section image slice, and determining at least one second cross-section image feature in the first and in the second cross-section image slice; and determining the depth of the at least one first cross-section image feature in the first cross-section image slice from a lateral position of the at least one second cross-section image feature in the first cross-section image slice. In an example, during the step of obtaining the sequence of N cross-section image slices in the inspection volume, the wafer is not moved.

Furthermore, the method of inspection of an inspection volume in a wafer further optionally comprises the step of performing a mutual lateral alignment of the first and the second section image slices with the at least one common cross-section image feature. In an example, the common cross-section image feature is a first cross-section image feature present in the first and in the second cross-section image slice. In an example, the common cross-section image feature is an image segment of an alignment feature provided or existing in the proximity of the inspection volume. The step of mutual lateral image alignment optionally further includes a subtraction or numerical compensation of an image distortion deviation between the at least first and second cross-section image slices.

In some embodiments, the depth of a first cross-section image feature in a first cross-section image slice is determined, and a 3D volume image of the inspection volume is derived by an algorithm utilizing several steps. A first step can be cross-section image feature detection and classification, which detects and classifies cross-section image features into first cross-section image features and second cross-section image features. A second step can be generating a depth map from second cross-section image features in a plurality of cross-section image slices. A third step can be determining a depth of each first cross-section image feature based on the depth map. A forth step can be generating a 3D volume image of semiconductor structures of interest in the inspection volume. A fifth step can be deriving integrated circuit features or properties of the semiconductor structures of interest in the 3D volume image. A sixth step can be to derive defects of the integrated circuit features or properties of the semiconductor structures of interest in the 3D volume image. In an example of the method of inspection of an inspection volume in a wafer, the slant angle GF of the FIB beam for milling the plurality of cross-section surfaces is adjustable. With change of the slant angle GF, the covered depth range of the inspection volume can be changed. In an example of the method of inspection of an inspection volume in a wafer, the distances between subsequent cross-section surfaces are adjustable. In an example, the distances between the plurality of cross-section surfaces are adjusted to be different for at least some of the distances of cross-section image surfaces. By the adjustment of distances, throughput and resolution of the 3D volume image of the inspection volume can be entirely or locally adjusted to the wafer inspection task.

In some embodiments, the step of determining the depth map or depth comprises determining lateral positions of second cross-section image features. The depth map or a depth of a first cross-section image feature in the first cross-section image slice can be determined from a lateral difference of a first position of a second cross-section image feature in the first cross-section image slice and a second position of the second cross-section image feature in the second cross-section image slice. The depth determination via the second cross-section image features may not utilize the first cross-section image features, which represent for example the HAR channels of a memory device. The first cross-section image features and errors in the fabrication of the semiconductor structures represented by first cross-section image features, for example the entire three-dimensional HAR structure within the inspection volume, can be determined with high accuracy. In examples of the method of inspection of an inspection volume in a wafer, tilt or wiggling relative to the wafer surface, or alignment errors in the HAR structure fabrication, or memory stack orientation are determined with high accuracy and low ambiguity. In an example of the method of inspection of an inspection volume in a wafer, HAR structures are investigated and compared in multiple depths throughout the inspection volume of a wafer.

In some embodiments, the positions of two second cross-section image features are determined in the first cross-section image slice, wherein each of the second cross-section image features represent an integrated semiconductor structure at a predetermined depth within the inspection volume. In an example, the step of determining the depth of the first cross-section image feature in the first cross-section image slice or a depth map of the first cross-section image slice is determined from the lateral positions of the two second cross-section image features.

In some embodiments, the method comprises the further step of forming at least one alignment feature. The at least one alignment feature can be formed or exposed in the proximity of the inspection volume. The alignment features can be configured for mutual lateral alignment of a plurality of cross-section images slices, including the first and the second cross-section image slices. In some embodiments, the alignment feature is fabricated above the inspection volume and configured for determining the position of edges formed by the intersection of the cross-section surfaces with the wafer surface. In an example, alignment features are provided or exposed in a certain depth or multiple depths in an additional trench or multiple trenches to enable alignment in different imaging depths in the inspection volume beyond the wafer surface. Furthermore, the method of inspection of an inspection volume in a wafer further optionally comprises the step of performing a mutual lateral alignment of the first and the second cross-section image slices with the at least one common cross-section image feature. In an example, the common cross-section image feature is a first cross-section image feature present in the first and in the second cross-section image slice. In aa example, the common cross-section image feature is an image segment of an alignment feature provided or existing in the proximity of the inspection volume. The step of mutual lateral image alignment is optionally further improved by a subtraction or numerical compensation of an image distortion deviation between the at least first and second cross-section image slices.

In some embodiments, a sequence of N cross section images slices comprises at least a first cross section image slice and a second cross section image slice of an inspection volume, wherein the first cross section image surface is milled with a larger extension in a direction perpendicular to the FIB beam compared to the second cross section surface, such that after forming the second cross section surface a parallel surface segment of the first cross section surface is remaining. At least one alignment feature can be formed on the parallel surface segment of the first cross section surface and in proximity of the second cross section surface for a first mutual lateral alignment of the first and the second cross section image slices.

In some embodiments, a precision alignment of a plurality of cross section image slices of an inspection volume below a wafer surface is obtained. A first, coarse alignment of a first and second cross section image slice can be performed for example by additional alignment features, which are formed in the proximity of the inspection volume. With the first alignment, a mapping of cross section image features in the first and second cross section image slices can be obtained. A second, precision alignment of the first and second cross section image slices can utilize cross section image features of the semiconductor structure within the inspection volume below a wafer surface, and a mutual position accuracy with an accuracy below 5 nm, 3 nm or even below 2 nm can be achieved. In an example, the second, precision alignment includes the computation of a first displacement $\Delta Y'_{Ch}$ of the first cross section image features between the first cross section image slice and the second cross section image slice, the computation of a second displacement $\Delta Y'_{WL}$ of the second cross section image features between the first cross section image slice and the second cross section image slice, the determination of a distance d between the first and second cross section image slice, and the determination of a mutual lateral displacement vector $\Delta Y'$ between the first and second cross section image slice. Thereby, with such a two-step alignment process, registration errors can be avoided and a precision alignment can be achieved.

In an example of a method of inspection of an inspection volume in a wafer, the step of obtaining a sequence of N cross-section image slices comprises the acquisition of multiple laterally displaced image segments and stitching of the multiple laterally displaced image segments to form a cross-section image slice. In an example, the acquisition of multiple image segments the charged particle imaging microscope includes a change of focus position of the charged particle imaging device for at least a subset of the multiple image segments. Thereby, high resolution imaging can be maintained even if the inspection volume has a large extension in direction perpendicular to the wafer surface.

In some embodiments, a fan-beam tomography approach is applied. In such embodiments, the plurality or sequence of N cross-section image slices in the inspection volume can comprise scanning of the focused ion beam of the FIB column by a scanning unit in a first direction to expose a first cross-section surfaces within the inspection volume by FIB milling, tilting the focused ion beam by the scanning unit in a second direction perpendicular to the first direction, and scanning focused ion beam by the scanning unit in the first direction to expose a second cross-section surface within the inspection volume by FIB milling, such that the first and second cross-section surfaces form different angles of at approximately slant angle GF with the wafer surface. With the fan-beam tomography approach, the plurality of cross-section surfaces can form different angles with the wafer surface with an angular spread GZ centered at the slant angle GF. In the fan-beam tomography approach, during the step of obtaining the plurality of cross-section image slice in the inspection volume, the wafer is optionally not moved.

In some embodiments, the cross-section imaging method in wedge-cut geometry and the method of inspection of an inspection volume in a wafer comprises a distortion compensation. Image distortion in the cross-section image slices can arise for example by a charged particle imaging beam under angle GE deviating from 0°, for example for beam angles of 10° or more. Other sources of image distortions can be errors in the image scanning units of the charge particle imaging device, dynamic change of focus position of the charge particle imaging device or deviations of the cross-section surface from a planar shape. Image distortion in the cross-section image slices can be determined for example from the predetermined angle GE or from the second cross-section image features in comparison to a priori knowledge of the semiconductor design and image distortion is digitally compensated.

In some embodiments, the disclosure comprises an algorithm and a method to generate a 3D volume image of the inspection volume. In a first step, cross-section image features can be detected in the plurality of cross-section image slices, for example by methods of object detection known in the art. The cross-section image features can be further classified in a feature classification, and the cross-section image features are classified into first cross-section image features and second cross-section image features. In a second step, a depth map can be generated for each cross-section image slice from second cross-section image features representing features of known or reference depth as described above. The depth map can be an absolute depth map in units of nm, or a relative depth map scaled relative to a reference given by the relative depth of second integrated semiconductor features, for example features in the specific layers or the plurality of planar layers constituting the integrated circuit. In a third step, a depth of each first cross-section image feature can be determined based on the depth map. A forth step can be generating a 3D volume image of the inspection volume, comprising the depth information of a plurality of first cross-section image features from a plurality of depth maps of each of the plurality of cross-section image slices. From the depth maps together with the plurality of first cross-section image features of the plurality of cross-section image slices, a 3D volume image of the inspection volume can be generated for example by projection and interpolation of virtual cross section images slices. A fifth step can be to derive properties of integrated circuit structures of interest in the 3D volume image, such as for example features or properties of HAR structures, such as the tilt angle or wiggling. A sixth step can be to derive defects of the integrated circuit features or properties in the 3D volume image. In an example, the integrated circuit features deviate from their lateral design positions or from the position in depth beyond the wafer surface, corresponding to fabrication errors of for example the HAR structures. Detection of fabrication errors can be one particular interest of wafer defect inspection. Utilizing the method of depth determination of the first cross-section images features via second cross-section image features can enable the determination of fabrication errors of the HAR structures with great precision, including global offset errors like a global lateral offset of all HAR structures.

In some embodiments, a method of obtaining a virtual cross-section image or a sequence of virtual cross-section images, each virtual image slice comprising a plurality of virtual cross-section image pixels, from a set of cross-section image slices is provided. The method can comprise the step of obtaining a sequence of N cross-section image slices by alternately imaging and milling into an inspection volume inside a wafer at a slant angle GF a sequence of N cross-section surfaces, and the step of determining a first orientation direction of first semiconductor features, the first semiconductor features forming a first plurality of first cross-section image features in the sequence of N cross-section image slices. The method of obtaining a virtual cross-section image or a sequence of virtual cross-section images can further comprise the step of computing the virtual cross-section image perpendicular to the first orientation direction, wherein for each virtual cross-section image pixel a pixel value can be computed by a projection of a subset of at least one cross-section image slice of the sequence of N cross-section image slices in the first orientation direction and by an interpolation of the pixel value from the projection of the subset of at least one cross-section image slice. In the method of obtaining at least a virtual cross-section image, the number N of cross-section images slices can be at least N=10 (e.g., N>100, N is about 1000 or more).

In an example of the method of obtaining at least a virtual cross-section image, for each virtual cross-section image pixel, the subset of at least one cross-section image slice is selected by evaluating the distance of each cross-section image slice of the sequence of N cross-section image slices to the virtual cross-section image pixel in the first orientation direction and selecting at least a first cross-section image slice with minimum distance. In an example, a second cross-section image slice of the subset of at least one cross-section image slice is selected accordingly as the cross-section image slice with a second minimum distance. In an example, further cross-section image slices of the subset of at least one cross-section image slice are selected in sequence of increasing distances to the virtual cross-section image pixel in the first orientation direction.

In some embodiments, the step of the projection of the subset of at least one cross-section image slice and interpolation of the pixel value from the projection of the subset of at least one cross-section image slice comprises projection and interpolation of at least a subset of the first plurality of first cross-section image features to form a third plurality of first cross-section image features in the virtual image slice. In an example, the step of projection and interpolation is combined with at least one of feature extractions, a thresholding operation, a contour interpolation or a model-based interpolation. With feature extraction, thresholding operation or a contour interpolation or a model-based interpolation, first cross-section image features are detected in the subset of at least one cross-section image slice, and the third plurality of first cross-section image features in the virtual image slice can be interpolated with high precision.

In some embodiments, the method further comprises the step of generating, for each of the sequence of N cross-section image slices, a depth map $Z(x,y;n)$ with index $n=1 \ldots N$ for each of the N cross-section image slices. In an example, the depth map $Z(x,y;n)$ of each of the cross-section image slices with index $n=1 \ldots N$ is generated from a plurality of second cross-section image features, the plurality of second cross-section image features representing cross sections through second semiconductor features oriented in a second orientation direction, the second orientation direction being perpendicular to the first orientation direction. In an example, the depth map $Z(x,y;n)$ of each of the cross-section image slices with index $n=1 \ldots N$ is generated by determining the depth of a first cross-section image feature in a cross-section image slice from the lateral positions of at least two second cross-section image features in the cross-section image slice.

In an example, a depth map $ZV(x,y)$ for the virtual cross-section image is generated. From the depth map $ZV(x,y)$ and the plurality of depth map $Z(x,y;n)$ with index $n=1 \ldots N$ for each of the N cross-section image slices, the subset of at least one cross-section image slice is selected by evaluating the distance of each depth map $Z(x,y;n)$ for each cross-section image slice to the depth map $ZV(x,y)$ of the virtual cross-section image pixel in the first orientation direction and selecting at least a first cross-section image slice with minimum distance.

In an example, a second cross-section image slice of the subset of at least one cross-section image slice is selected accordingly as the cross-section image slice with a second minimum distance. In an example, further cross-section image slices of the subset of at least one cross-section image slice are selected in sequence of increasing distances to the virtual cross-section image pixel in the first orientation direction.

In some embodiments, the first semiconductor features comprise at least of one of a via, a HAR structure, or a HAR channel of an integrated semiconductor circuit inside the inspection volume of the wafer. The second semiconductor features can comprise at least one of an isolator line or layer, a metal line or layer or word-line, or a semiconductor line or layer of an integrated semiconductor circuit inside the inspection volume of the wafer. The method further comprises the steps of determining at least one first cross-section image feature in each of the sequence of N cross-section image can slice and determine at least one second cross-section image feature in each of the sequence of N cross-section image slices.

In some embodiments, the first orientation direction is the z-direction perpendicular to a wafer surface and the virtual cross-section image slice is computed in a plane parallel to the wafer surface at a depth ZV below the wafer surface. In some embodiments, for each virtual cross-section image pixel coordinate (x,y), the subset of at least one cross-section image slices is determined by selecting at least the $m^{th}$ cross-section image slice with minimum distance to the depth ZV, such that distance $Zrv(m)=Z(x,y;m)-ZV$ is the minimum value of all depth maps $Z(x,y;n)$ with index $n=1 \ldots N$. In an example, a second and further cross-section image slices of the subset of at least one cross-section image slice is selected in sequence of increasing distances $Zrv(n)$ to the virtual cross-section image pixel in the Z-direction. In an example, the depth ZV is adjusted according the depth of layers parallel to the wafer surface, wherein the layers are formed by second semiconductor features oriented in a second orientation direction parallel to the wafer surface. In an example, a first virtual cross-section image slice is computed at a depth ZV1 in an isolation layer between two adjacent metal layers or word-lines. In an example, a second virtual cross-section image slice is computed at a depth ZV2 inside a metal layer of word-line.

In some embodiments, the optical axis of a charged particle beam imaging system for acquiring the sequence of N cross-section image slices is oriented perpendicular to the wafer surface, such that an angle GE=0° for the angle GE between the optical axis and the z-axis normal to the wafer surface. In an example, the charged particle imaging device is a Helium Ion Microscope (HIM).

In some embodiments, the method further comprises the step of forming at least one alignment feature in the proximity of the inspection volume configured for forming at least one common cross-section image feature for mutual lateral alignment, and the step of performing the mutual lateral alignment of each of the sequence of N cross-section image slices with at least one common cross-section image feature. In an example, the step of mutual lateral image alignment includes subtraction of an image distortion deviation.

The method of obtaining at least a virtual cross-section image can further comprise the steps of loading the wafer on a wafer support table in a dual beam device, the dual beam device comprising at least a FIB column and a charged particle imaging device, with a first optical axis of the FIB column forming the slanted angle GF with a surface of the wafer support table, and a second optical axis of the charged particle imaging device forming an angle GE with the normal to the surface of a wafer support table, the first and second optical axes forming an intersection point, and the step of movement of the wafer support table to bring a first measurement site on the wafer in coincidence with an intersection point of the dual beam device. In an example, during the step of obtaining the sequence of N cross-section image slices in the inspection volume, the wafer is not moved.

In some embodiments, a method of obtaining at least a 2D virtual cross-section image or a set of 2D virtual cross-section images from a set of cross-section image slices can comprise the steps of: obtaining a sequence of N cross-section image slices by alternately imaging and milling into an inspection volume inside a wafer at a slant angle GF a sequence of N cross-section surfaces; determining a first orientation direction of a first semiconductor structures or feature of interest, the first semiconductor features forming a first plurality of first cross-section image features in the sequence of N cross-section image slices; and computing a virtual cross-section image perpendicular to the first orientation direction, each virtual image slice comprising a plurality of virtual cross-section image pixels, whereby for each virtual cross-section image pixel a pixel value is computed by a projection of a subset of at least one cross-section image slices of the sequence of N cross-section image slices in the first orientation direction and by interpolation of the pixel value from the projection of the subset of the cross-section image slices. For each virtual cross-section image pixel, the subset of the at least one cross-section image slice can be determined by computing the distance of each of the sequence of N cross-section image slices to the virtual cross-section image pixel in the first orientation direction and selecting at least a first cross-section image slice with minimum distance. In an example, a second cross-section image slice of the subset of the at least one cross-section image slice is selected accordingly as the cross-section image slice with a second minimum distance. Further cross-section image slices of the subset of the at least one cross-section image slice can be selected accordingly in sequence of increasing distances to the virtual cross-section image pixel in the first orientation direction.

In an example, the method of obtaining at least a 2D virtual cross-section image or a set of 2D virtual cross-section images comprises: determining at least one first cross-section image feature in each of the sequence of N cross-section image slices; and determining at least one second cross-section image feature in each of the sequence of N cross-section image slices and deriving the depth of the at least one first cross-section image feature relative to the depth of the at least one second cross-section image feature. The depth of the at least one second cross-section image feature can be either a priori known or used as reference. Further details of the method of the depth map generation can be described in the examples and embodiments.

In some embodiments, the charged particle imaging device is a scanning Helium ion microscope. A cross-section surface can be exposed approximately at slant angle GF and extend approximately at slant angle GF to the wafer surface throughout the inspection volume. The scanning Helium ion microscope can provide the desired depth of focus and enables high resolution imaging in a single image scan of the cross-section surfaces without the need of change of focus of the charged particle imaging device, even if the inspection volume has a large extension exceeding more than 2 μm in direction perpendicular to the wafer surface.

In some embodiments, a wafer inspection method for 3D inspection of an inspection volume in a wafer is disclosed, whereby the inspection volume is not extracted or removed from the wafer, and the inspection volume is having a depth range of more than 1 μm (e.g., more than 2 μm, more than 6 μm, more than 10 μm). The method can comprise the steps of generating by the 3D inspection an image with a lateral resolution of below 2 nm (e.g., below 1 nm, below 0.5 nm), wherein the 3D inspection of the inspection volume is performed at the wafer, wherein the image is a 3D image. The method comp can comprise rises further a step of milling at least a cross section surface through the depth range of the inspection volume with a FIB column. The image can be obtained by obtaining at least an image of the at least one cross section surface through the inspection volume with a Helium Ion microscope in a single image scan. The method can further comprise an image processing, performing at least one of a feature extraction, edge detection, pattern recognition, or pixel interpolation. The method further comprises the step of computing one of a depth map, a 3D volume image, or a virtual cross section image. The method can further comprise the step of computing one of a dimension, an area, a diameter, an angle or a shape of a semiconductor feature. The method further comprises the step of computing one of an average, a statistical deviation of plurality of semiconductor features.

In some embodiments, a method of inspection of a wafer with a dual beam device is provided. The dual beam device comprises a focused ion beam column (FIB) with on optical axis arranged under an angle GF between 30° and 45° to a support surface of wafer support table and a Helium ion microscope (HIM) with an optical axis arranged perpendicular to the support surface, the optical axis of the FIB column and the HIM forming an intersection point. The method of inspection of a wafer can further comprise the steps of: positioning a first measurement site of a wafer with a wafer stage with a wafer support table configured for holding the wafer at the intersection point; milling with the FIB column a first cross section surfaces approximately at the angle GF through a first inspection volume with a depth extension LZ below a wafer surface of more than 1 μm; and imaging the first cross section surface with a single image scan with the Helium ion microscope to form a high-resolution cross section image slice.

In an example, the first inspection volume has a depth range of more than 2 μm, more than 6 μm or even 10 μm, and the HIM is configured for generating an image with a lateral resolution of below 2 nm (e.g., below 1 nm, below 0.5 nm) in single image scan of the cross-section surface at angle GF through the inspection volume.

In some embodiments, a method of inspection of an inspection volume underneath a wafer surface of a wafer with a dual beam device is disclosed. The dual beam device can comprise a focused ion beam column (FIB) with on optical axis arranged under an angle GF exceeding 30° to a support surface of wafer support table and a Helium ion microscope (HIM) with an optical axis arranged perpendicular to the support surface, the optical axis of the FIB column and the HIM forming an intersection point. The method can comprise the steps of: loading a wafer on a wafer support table in the dual beam device; positioning a first measurement site of the wafer with a wafer stage with the wafer support table configured for holding the wafer at the intersection point; alternately milling with the FIB column a plurality of N cross section surfaces approximately at the angle GF in the inspection volume with a depth extension LZ below a wafer surface of more than 1 μm; and imaging each cross section surface with a single image scan with the Helium ion microscope to form a plurality of N high-resolution cross section image slices.

In an example, the number N of cross-section images slices is at least N=10 (e.g., N>100, N is about 1000 or more). In an example, the number N of milling surfaces is below 50 (e.g., below 20), and the inspection volume is separated in a plurality of B blocks arranged diagonal through the inspection volume.

In an example, the milling of the plurality of N cross section surfaces has a depth extension LZ below the wafer surface of more than 2 µm (e.g., more than 6 µm, 10 µm). In an example, the method further comprises the step of computing at least a virtual cross-section image parallel to the wafer surface from a plurality of N cross-section image slices. For example, a first virtual cross-section image is computed in a conducting layer or word-line, and a second virtual cross-section image is computed in an isolating layer.

In an example, the method further comprises the step of performing a mutual lateral alignment of each of the sequence of N cross-section image slices with at least one common cross-section image feature. In an example, the method comprises the step of forming at least one alignment feature in the proximity of the inspection volume configured for forming the at least one common cross-section image feature and performing a mutual lateral alignment of the sequence of N cross-section image slices with the at least one common cross-section image feature. The method can further comprise the steps of: generating, for each of the sequence of N cross-section image slices, a depth map $Z(x,y;n)$ with index n=1 ... N for each of the N cross-section image slices; and determining at least one second cross-section image feature in each of the sequence of N cross-section image slices, the at least one second cross-section image feature representing a cross section through second semiconductor features oriented in parallel to the wafer surface, wherein the depth map $Z(x,y;n)$ of each of the cross-section image slices with index n=1 ... N is generated from the lateral positions of the at least one second cross-section image feature.

In some embodiments, a cross-section imaging method in wedge-cut geometry for a dual beam device is provided with additional trenches adjacent to the inspection volume for debris mitigation. The additional trenches can comprise fabricated by FIB milling in a first direction and can further comprise a first, proximal trench, and a second, distal trench. After fabrication of the additional trenches, the wafer can be rotated by 90° and the inspection volume is inspected utilizing the cross-section imaging technique in wedge-cut geometry. Debris produced during milling of the cross-section can be collected in the distal additional trench.

In some embodiments, the disclosure provide a wafer inspection device for inspection of an inspection volume at an inspection site of a wafer in a wedge cut geometry comprises a six axis wafer stage with a wafer support table configured for holding a wafer with a wafer surface on a support surface of the wafer support table. The wafer inspection device can comprise configured for inspection of an inspection volume in the wafer, while the inspection volume is not extracted from the wafer and comprises a dual beam device. The dual beam device can comprise a focused ion beam (FIB) column configured for milling and exposing at least a first cross-section surface in a first inspection volume inside the wafer approximately at a slant angle GF to a surface of the wafer, and a charged particle imaging device configured for imaging. The charged particle imaging device is for example a scanning electron microscope (SEM) or a Helium ion microscope (HIM), with a first optical axis of the FIB column forming a slanted angle GF with a surface of a wafer support table, and a second optical axis of the charged particle imaging device forming an angle GE with the normal to the surface of a wafer support table. The first and second optical axes of the columns of the dual beam device form an intersection point. The wafer inspection device can be further provided with a control unit, configured to perform and control any of the methods of inspection of an inspection volume in a wafer. The wafer inspection device can further comprise an image processing unit. The control unit and the image processing unit can comprise processors and memories with software code installed, configured to perform to perform a method of the disclosure, including the image processing steps and depth map generation steps described above.

In some embodiments, a wafer defect inspection device is configured for milling and exposing a plurality of cross-section surfaces, comprising at least a first and a second cross-section surface in a wafer. The wafer defect inspection device can be further configured for imaging of the at least first and second cross-section surfaces to form first and second cross-section image slices. The wafer defect inspection device can further comprise an image processing unit with a software code installed configured to determine cross-section image features in the at least first and second cross-section image slices and to determine the depth of the cross-section features within the inspection volume, the cross-section image features being cross sections of semiconductor structures inside the inspection volume. The wafer defect inspection device can further comprise a defect detection unit configured to determine from the cross-section image features deviations from predetermined properties of the semiconductor structures inside the inspection volume.

In an example, a wafer defect inspection device comprises a wafer stage for holding a wafer, a focused ion beam (FIB) column configured for milling and exposing a sequence of N cross-section surface in an inspection volume inside the wafer at a slant angle GF to a surface of the wafer with a depth extension exceeding 2 µm, and a charged particle imaging device configured for imaging a plurality of N cross-section surfaces to form each of a plurality of N cross-section image slices with a single image scan. The wafer defect inspection device can further comprise an image processing unit with a software code installed configured to determine from the sequence of N cross-section image slices a virtual cross-section image, wherein the virtual cross-section image is oriented parallel to the surface of the wafer.

In an example, the wafer defect inspection device further comprises a focused ion beam (FIB) column configured for milling and exposing during use a sequence of N cross-section surface in an inspection volume inside the wafer at a slant angle GF to a surface of the wafer, a charged particle imaging device configured for imaging during use sequence of N cross-section surfaces to form a sequence of N cross-section image slices and an image processing unit with a software code installed configured to determine during use from the sequence of N cross-section image slices a virtual cross-section image, wherein the virtual cross-section image is oriented parallel to the surface of the wafer. The wafer defect inspection device with the dual beam device can comprise an operation unit and an image processor configured for performing the method of obtaining a virtual cross-section image from a set of cross-section image slices.

In some embodiments, the charged particle imaging beam is a scanning electron beam. In another examples, the charged particle imaging beam is an ion beam of an ion microscope, such as a Helium ion beam of a Helium ion microscope (HIM). The resolution achieved with a HIM by the slice and image method can be lower than 1 nm, (e.g., below 0.5 nm, 0.25 nm). HIM further provides a higher material contrast. A HIM further can provide a large depth of focus of up to 10 micrometer depth of focus, which can be very large compared to a scanning electron beam and is especially larger than a depth range of a cross section surface milled into a wafer surface at a milling angle GF of between 30° and 80°, the depth range exceeding 1 µm, 2 µm, or even reaching up to 10 µm. Generally, the inspection volume has a depth extension LZ below the wafer surface of more than 1 µm (e.g., more than 2 µm), and the HIM is configured with a depth of focus (DOF) exceeding the depth extension LZ, such that cross section image slices is obtained by a single image scan with the HIM beam without image stitching. Other examples of imaging ion beam microscopes comprise other noble gases as ions, such as Neon or a mixture of Helium and Neon.

In some embodiments, a dual beam device for wafer inspection comprises (a) a wafer stage for supporting a wafer, (b) a Gallium FIB column arranged at an angle GF to a support surface of the sample support stage, configured for milling at least a first cross section surface into a wafer at the angle GF, (c) a Helium Ion beam column arranged perpendicular to the support surface of the wafer stage, configured for generating a first cross section image slice of the cross section surface by a single image scan, (d) a secondary electron detector, configured to collect a plurality of secondary electrons during the single image scan, and (e) an operation unit configured for operation control of the dual beam device during use. The FIB at angle GF between 30° and 40° can be configured to mill the cross-section surface into a depth range below the wafer surface extending over more than 1 µm, more than 2 µm or even more than 6 µm. The operation unit further can comprise (f) an image processing unit for performing at least one of a feature extraction, edge detection, pattern recognition, or pixel interpolation. The image processing unit if further configured for computing one of a depth map, a 3D volume image, or a virtual cross section image. The operation unit can further comprise (g) a defect detection unit for computing one of a dimension, an area, a diameter, an angle or a shape of a semiconductor feature. The defect detection unit is further configured for computing one of an average, a statistical deviation of plurality of semiconductor features.

In some embodiments, a wafer inspection device for inspection of an inspection volume at an inspection site of a wafer in a wedge cut geometry comprises a control unit for controlling the FIB column and the HIM, configured for alternatingly milling a plurality of N cross section surfaces in an inspection volume with the FIB beam approximately at the angle GF and imaging each cross section surface by single image scans with the HIM beam to form a plurality N of cross section image slices of high resolution with resolution better than 2 nm (e.g., better than 1 nm), whereby the inspection volume has a depth extension LZ in direction of the optical axis of the HIM of more than 1 µm, more than 3 µm, for example 6 µm or even 10 µm. The imaging of each cross-section surface to form a plurality N of cross section image slices of high resolution can be achieved by the HIM beam with a depth of focus (DOF) exceeding the depth extension LZ. The control unit can be configured to scan during use the HIM beam in single image scans over an area exceeding the lateral size LX or LY of the inspection volume of about 10 µm (LX or LY) and collecting in a time sequential manner a plurality of secondary electrons with secondary electron detector.

In an example of the disclosure, a dual beam device for inspection of an inspection volume underneath a wafer surface of a wafer is disclosed, the dual beam device comprising: a wafer stage with a wafer support table configured for holding during use the wafer on a support surface of the wafer support table; a focused ion beam column (FIB) with on optical axis arranged under an angle GF exceeding 30° to the support surface of wafer support table; a Helium ion microscope (HIM) with an optical axis arranged perpendicular to the support surface, the optical axis of the FIB column and the HIM forming an intersection point; a stage control unit, configured to position during use a first measurement site of a wafer at the intersection point; and a control unit for controlling the FIB column and the HIM, configured for alternatingly milling a plurality of N cross section surfaces in the inspection volume with the FIB beam approximately at the angle GF and imaging each cross section surface by scanning with the HIM beam to form a plurality of N high-resolution cross section image slices, whereby the inspection volume has a depth extension LZ below the wafer surface of more than 1 µm (e.g., more than 2 µm). In an example, the depth extension LZ in direction exceeds 5 µm, for example up to 10 µm. By milling of the plurality of N cross section surfaces in the inspection volume with the FIB beam at approximately the angle GF is meant that the actual angles of the cross-section surfaces can deviate from the milling angle GF by a few degrees, for example 1° to 4° due to a beam divergency of the FIB. The control unit is further configured to scan during use in a single scan the HIM beam over an area exceeding the lateral size LX or LY of the inspection volume of about 5 µm to 10 µm (LX or LY) and collecting in a time sequential manner a plurality of secondary electrons with a secondary electron detector. The HIM can be configured with a depth of focus (DOF) exceeding the depth extension LZ, such that each of the plurality of N high-resolution cross section image slices is obtained by a single image scan with the HIM beam with high resolution of about below 2 nm, for example 1 nm or even 0.5 nm. In an example, the Dual Beam device can further comprise an image processing unit with a software code installed configured to determine from the plurality of N cross-section image slices at least a first virtual cross-section image, wherein the at least first virtual cross-section image is oriented parallel to the surface of the wafer.

The optical axis of the FIB column can be arranged at the slant angle GF to the wafer support table, and the slant angle GF can be between 30° and 80°, for example GF is about 30° to 45°. In an alternative example, the slant angle GF between first optical axis of the FIB column with a surface of a wafer support table is in a range between 45° and 80°. In an alternative example, the slanted angle GF of the first optical axis of the FIB column with a surface of a wafer support table is in a range from 8° to 30°, for example in a range from 8° to 15°.

An optical axis of the charged particle imaging device can be arranged at an angle perpendicular to the wafer support table, with GE=0°. In an example, the optical axis of the charged particle imaging device is arranged approximately perpendicular to the wafer or at an angle GE between the optical axis of the charged particle imaging device and the normal to the surface of the wafer support table is below 10°.

A further method of the disclosure is a method of measurement recipe generation for inspection of representative inspection volumes in wafers. A method of measurement recipe generation, can comprise the steps of: generating of a first set of design performance indicators D1, the set of design performance indicators D1 comprising CAD image data and dimensions of design features in the inspection volume; generating a second set of fabrication performance indicators D2, comprising 3D volume image data obtained during a fabrication process development; deriving a measurement recipe R comprising a step for obtaining at least one of a third set of performance indicators D3; and the step of generating a second set of fabrication performance indicators D2 and the measurement recipe R comprising acquiring at least a first cross section image slice of at least a first cross section surface through the representative inspection volume with a depth extension LZ>1 µm underneath a wafer surface. At least one of the steps of obtaining at least one of the performance indicators D1 to D3 can comprise a step of an image processing to extract a plurality of first cross section image features representing cross sections of the plurality of first semiconductor features at slant angle GF, and the image processing comprising at least one of a feature extraction, an edge detection, a pattern recognition, or a pixel interpolation. At least one of the steps of obtaining at least one of the performance indicators D1 to D3 can comprise the step of computing at least a descriptive parameter of at least one first semiconductor feature from at least one of a plurality of first cross section image features, with the descriptive parameter being one of a dimension, a diameter, an angle, an area, a shape or a volume. At least one of the steps of obtaining at least one of the performance indicators D1 to D3 further can comprise the step of computing one of an average or a statistical deviation of the at least one descriptive parameter of the plurality of first semiconductor features.

In some embodiments, the disclosure further provides a Computer program product with a program code for executing any of the methods of the disclosure. For example, a computer program product with a program code for executing a method of inspection of an inspection volume in a wafer is provided. For example, a computer program product with a program code for executing any of the method steps of the method of obtaining at least a virtual cross-section image is provided. For example, the computer program product comprises elements to control the generation of the set of N cross-section image slices, elements to select the first orientation direction, and elements to compute at least a virtual cross section image from the set of N cross-section image slices by projection in the first orientation direction and interpolation.

In some embodiments, a dual beam device comprises a control unit and an image processing unit, configured to perform any of the method steps of the method above is provided.

In some embodiments, the first cross-section image features comprise at least cross sections of a semiconductor structure extending in a direction parallel to an axis normal to the wafer surface, and the second cross-section image features comprise at least a cross-section of a semiconductor structure extending in a direction parallel to the wafer surface. For example, the first common cross-section image features comprise at least cross sections of one of a via, a HAR structure, or a HAR channel of the integrated semiconductor circuit. For example, the second cross-section image features comprise at least a cross-section of one of an isolator line or layer, a metal line or layer or word-line, or a semiconductor line or layer of the integrated semiconductor circuit.

The embodiments or examples as described above can be fully or partly combined with one another. This also holds for examples or embodiments describing different aspects of the disclosure.

BRIEF DESCRIPTION OF THE DRAWINGS

The present disclosure will be even more fully understood with reference to the following drawings.

DETAILED DESCRIPTION

Figure 1:
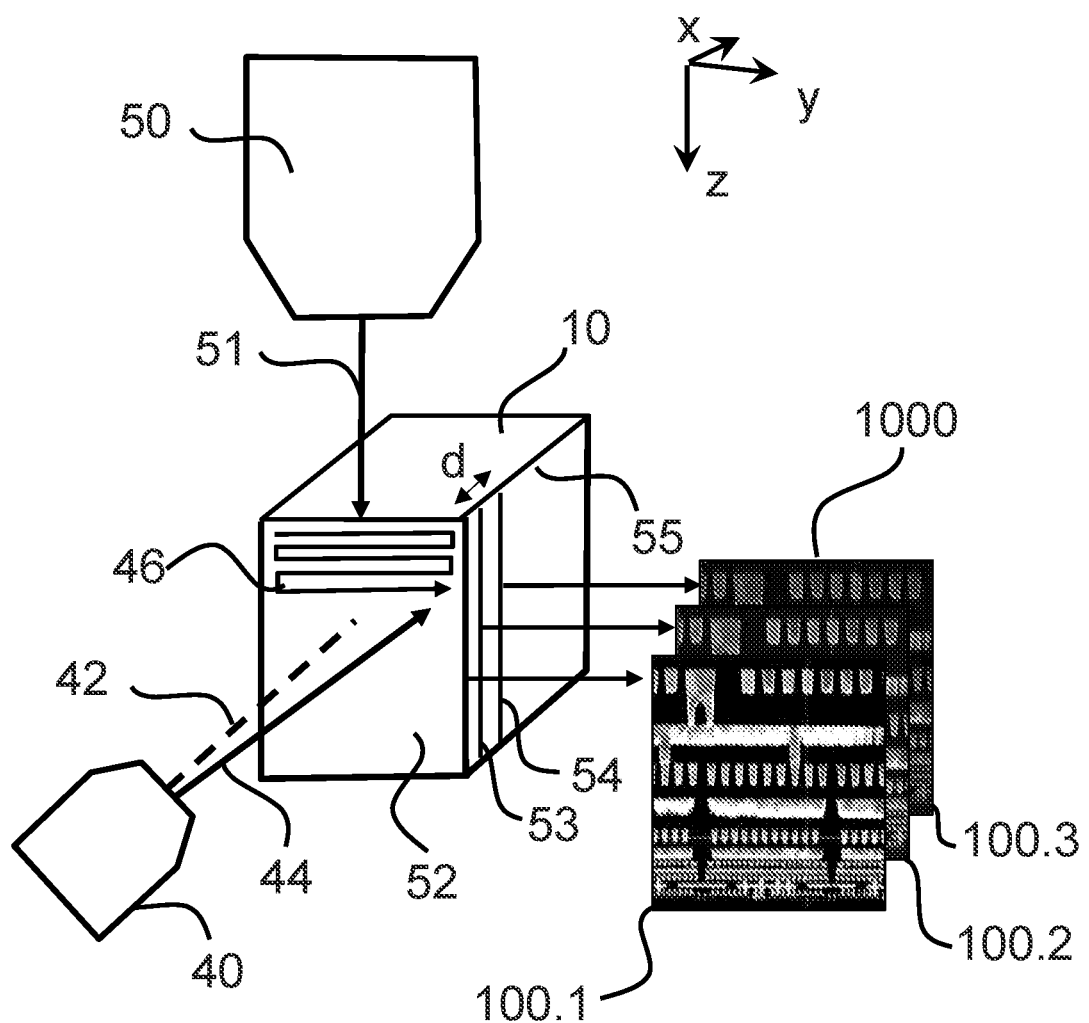
FIG. 1 illustrates a cross-section imaging technique explained at a sample extracted from a wafer.

FIG. 1 shows a schematic view of the common cross-section image approach to obtain a 3D volume image of an integrated semiconductor sample. With the cross-section approach, also called slice and image approach, three-dimensional (3D) volume image acquisition is achieved by a "step and repeat" fashion. First, the integrated semiconductor sample is prepared for the common cross-section image approach by methods known in the art. Throughout the disclosure, "cross-section image" and "slice" will be used as synonyms. In a step, a thin surface layer or "slice" of material is removed. This slice of material may be removed in several ways known in the art, including the use of a focused ion beam milling or polishing at glancing angle by focused ion beam (FIB) column 50. For example, the focused ion beam 51 propagates almost parallel to z-axis and is scanned in y-direction to mill through the top surface of the sample 10 and expose a new cross-section surface 52 in an y-z-plane. As a result, the new exposed cross-section surface 52 is accessible for imaging. In a subsequent step, the cross-section surface layer 52 is raster scanned by a charged particle beam (CPB) imaging system 40, such as a scanning electron microscope (SEM) or a second FIB, to obtain a cross-section image slice 100.1. The optical axis 42 of the charged particle imaging system 40 can be arranged to be parallel to the x-direction or inclined at an angle to the x-direction. Secondary as well as backscattered electrons are collected by a detector (not shown) to reveal a material contrast inside of the integrated semiconductor sample, and are visible in the cross-section image slice 100.1 as different grey levels. Metal structures generate brighter measurement results. The surface layer removal by milling and the cross-section imaging process are repeated through cross-section surfaces 53 and 54 and further cross-section surfaces at equal distance, and a sequence of 2D cross-section image slices 1000, comprising for example N cross-section image slices 100.2, 100.3, . . . 100.N in different depths is obtained so as to build up a three-dimensional 3D dataset. The representative cross-section image slice 100.1 is obtained by measurement of a commercial Intel processor integrated semiconductor chip with 14 nm technology.

With the method, at least first and second cross-section image slices are generated by subsequently milling cross-section surfaces into the integrated semiconductor sample with a focused ion beam to expose or to make accessible a sequence of cross-section surface for imaging and imaging each cross-section surface of the integrated semiconductor sample with a charged particle beam imaging system 40. From the sequence of N 2D cross-section image slices 1000, a 3D image of the integrated semiconductor structure is reconstructed. The distance d of the cross-section image slices 100.1, 100.2, 100.3 can be controlled by the FIB milling or polishing process and can be between 1 nm and 30 nm.

In the above example, the cross-section image planes are oriented perpendicular to the top surface 55 of the integrated semiconductor wafer, with the normal to the wafer top surface 55 oriented parallel to the z-direction, as shown in FIG. 1. This results in 2D cross-section image slices which are oriented parallel to the y-z plane, or, in other words, the cross-section image planes include the z-axis or wafer normal axis, and the imaging direction x is parallel to the wafer surface. The conventional slice and image method in this conventional geometry is therefore only applicable to samples which are extracted from a wafer.

It is a task of the disclosure to provide a slice and image method applicable to inspection volumes inside a wafer. According to some embodiments of the disclosure, a method of a 3D volume image generation utilizes the slice and image method applied to an inspection volume inside a wafer in the so called "wedge-cut" approach or wedge-cut geometry, without the need of a removal of a sample from the wafer. The slice and image method is applied to an inspection volume with dimensions of few μm, for example 5 μm to 10 μm lateral extension in 200 mm or 300 mm wafers, without removal of samples from the wafer. A groove or edge is milled in the top surface of an integrated semiconductor wafer to make accessible a cross-section surface at an angle to the top surface. 3D volume images of inspection volumes are acquired at a limited number of measurement sites, for example representative sites of dies, for example at process control monitors (PCM), or at sites identified by other inspection tools. The slice and image method will destroy the wafer only locally, and other dies may still be used, or the wafer may still be used for further processing.

Figure 2:
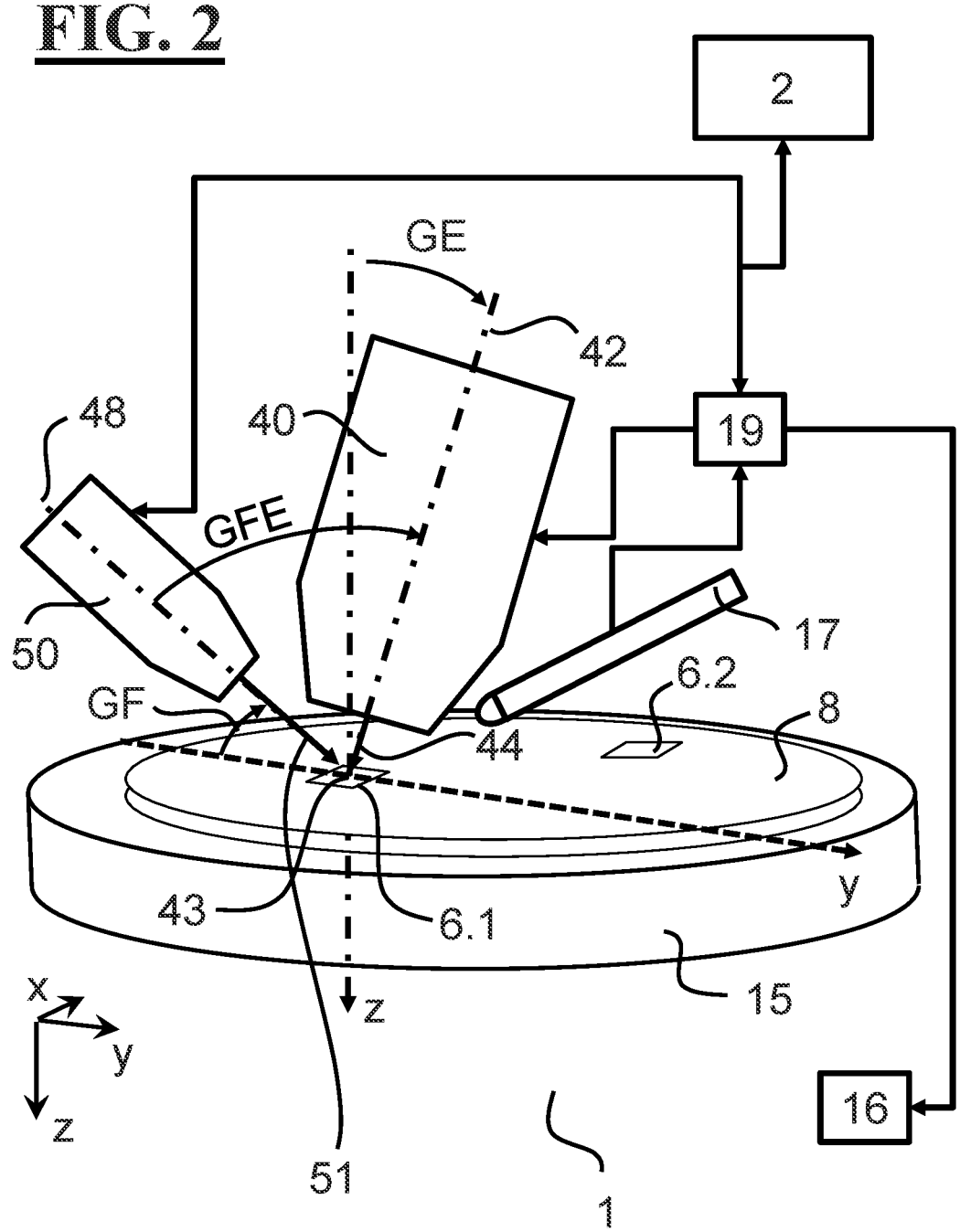
FIG. 2 illustrates a dual beam apparatus configured for a cross-section imaging technique in wedge-cut geometry, applied to a wafer.

An example of the wedge-cut geometry is illustrated in FIG. 2. A wafer 8 is provided, with several measurement sites 6.1 and 6.2, with the measurement sites for example defined in a location map generated from an inspection tool or from design information. The wafer 8 is placed on a wafer support table 15. A measurement site 6.1 of the wafer 8 is aligned with a five-axis wafer stage (not shown) at the intersection point 43 of a dual-beam device, comprising a FIB column 50 with a FIB optical axis 48 and a charged particle beam (CPB) imaging system 40 with optical axis 42. At the intersection point 43 of both optical axes of FIB and CPB imaging system, the wafer surface is arranged at angle GF to the FIB axis 48. FIB axis 48 and CPB imaging system axis 42 include an angle GFE, and the CPB imaging system axis forms an angle GE with the z-axis, which is perpendicular to the wafer plane. With FIB 51, impinging under angle GF to the surface of the wafer 8, slanted cross-section surfaces are milled into the wafer by ion beam milling at the inspection site 6.1 under approximately the slant angle GF. In the example of FIG. 2, the slant angle GF is approximately 30°. The actual slant angle of the slanted cross section surface can deviate from the slant angle GF by up to 1° to 4° due to the beam divergency of the focused ion beam, for example a Gallium-Ion beam. With the charged particle beam imaging system 40, inclined under angle GE to the wafer normal, images of the milled surfaces are acquired. In the example of FIG. 2, the angle GE is below 15°. During imaging, a beam of charged particles is scanned by a scanning unit of the charged particle beam imaging system 40 along a scan path over a cross-section surface of the wafer at measurement site 6.1, and secondary particles as well as scattered particles are generated. Particle detector 17 collects at least some of the secondary particles and scattered particles and communicates the particle count with a control unit 19. Control unit 19 is in control of the charged particle beam imaging column 40, of FIB 50 and connected to a control unit 16 to control the position of the wafer mounted on the wafer support table via the wafer stage (not shown). Control unit 19 communicates with operation unit 2, which triggers placement and alignment for example of measurement site 6.1 of the wafer 8 at the intersection point 43 via wafer stage movement and triggers repeatedly operations of FIB milling, image acquisition and stage movements.

Each intersection surface is imaged using a substantially vertical charged particle imaging beam 44, for example scanning electron beam or any other charged particle beam microscope such as a Helium-Ion microscope (HIM).

Figure 3:
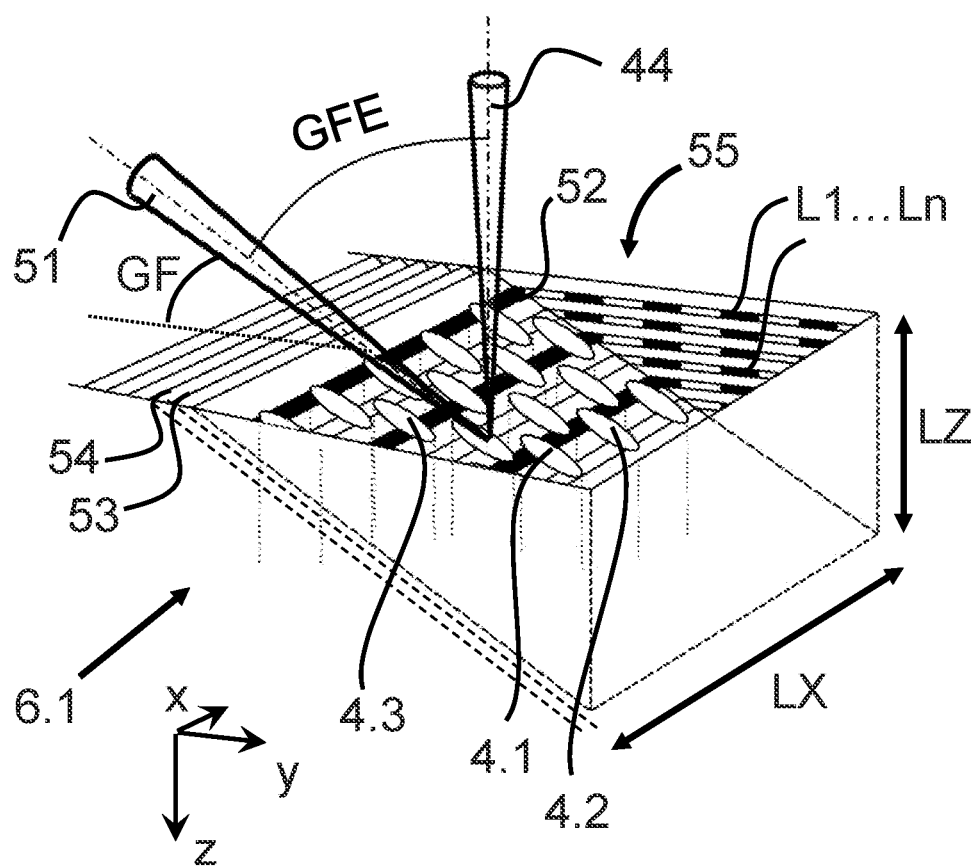
FIG. 3 shows certain details of a cross-section imaging technique in wedge-cut geometry.

In some embodiments, a slice and image method in the wedge cut geometry is provided. By repetition of the slicing and imaging method in wedge-cut geometry, a stack of N cross-section image slices comprising image slices of cross-section surfaces 52, 53, 54 (see FIGS. 1 and 3) and following is generated and a 3D volume image of an inspection volume of the wafer 8 at measurement site 6.1 is generated. FIG. 3 illustrates the wedge cut geometry at the example of a 3D-memory stack. The wafer surface is milled with a FIB beam 51 at an angle GF below 800 to the wafer surface, for example at an angle GF of 30°, but other angles below 45° are possible as well, for example 40°, or 36°. In an example, a small milling angle GF of between 8° and 450 can allow better imaging with high resolution of the first cross-section image features described below, such as HAR structures. In another example, a steep milling angle GF, e.g., more than 30°, or more than 45° can be used. A steep milling angle GF between 45° and 80° allows to cut through the depth of the inspection volume with a small lateral dimension. With steeper milling angles, larger depths can be achieved and a 3D volume image generation of deep semiconductor stacks of for example more than 6 µm depth, for example 10 µm or 15 µm depth in thick or deeps semiconductor stacks can be achieved. At steeper angles, the lateral extension of the cross-section surface remains below for example 30 µm (e.g., below 20 µm), such that cross section image slices can be obtained without image stitching with high throughput.

Depending of the selection of the coordinate system, the wafer surface 55 coincides with the XY-plane. The memory stack extends in the Z-direction perpendicular to the wafer surface 55. With FIB beam 51, a new cross-section surface 52 is generated in the wafer, wherein the cross-section surface 52 is inclined to the wafer surface approximately by angle GF. The cross-section surface 52 is scanned for example by SEM beam 44, which is in the example of FIG. 3 arranged at normal incidence to the wafer surface 55, and a high-resolution image is generated. The cross-section image slice comprises first cross-section image features, formed by intersections with high aspect ratio (HAR) structures or vias (for example first cross-section image features of HAR-structures 4.1, 4.2, and 4.3) and second cross-section image features formed by intersections with layers L1 . . . LM, which comprise for example SiO2, SiN- or Tungsten lines. Some of the lines are also called "wordlines". The maximum number M of layers is typically more than 50, for example more than 100 or even more than 200. The HAR structures and layers extend throughout most of the volume in the wafer but may comprise gaps. The HAR structures typically have diameters below 100 nm, for example about 80 nm, or for example 40 nm. The cross-section image slices contain therefore first cross-section image features as intersections or cross sections of the HAR channel footprints at different depth (Z) at the respective XY-location. In case of vertical memory channels of a cylindrical shape, the obtained first cross sections image features are circular or elliptical structures at various depths determined by the locations of the structures on the sloped cross-section surface 52.

The selection of slicing distance d is a balance between the desired sampling and throughput. The thickness d or minimum distances d between two adjacent cross-section image slices is adjusted to values typically in the order of few nm, for example 30 nm, 20 nm, 10 nm, 5 nm, 4 nm or even less. Once a layer of material of predetermined thickness d is removed with FIB, a next cross-section surface 53 is exposed and accessible for imaging with the almost vertical imaging beam 44. A plurality of N cross-section image slices acquired in this manner cover an inspection volume of the wafer 8 at measurement site 6.1 and is used for forming of a 3D volume image of high 3D resolution below for example 10 nm (e.g., below 5 nm), and to reconstruct the properties of semiconductor structures of interest, for example the memory stack inside the inspection volume. The plurality of N cross-section image slices can comprise few images, for example N=ten or N=twenty, up to several 100 cross-section images slices, for example N=1000 or more. The inspection volume typically has a lateral extension of LX=LY=5 µm to 15 µm in x-y plane, and a depth LZ of 2 µm to 15 µm below the wafer surface, but the lateral extension of the inspection volume can also be significantly larger and reach a lateral dimension of about 1 mm. The lateral extension of a single cross section surface can be below 30 µm, for example below 20 µm. In some examples, for memory devices comprising memory HAR structures, it is sufficient to provide at least three cross-section image slices per HAR structure. A slicing distance d can therefore be below 30 nm.

In an example, features and 3D positions of the semiconductor structures of interest, for example the positions of the HAR channels, are detected by the image processing methods, for example from HAR centroids. A 3D volume image generation including image processing methods and feature based alignment is further described in U.S. provisional application No. 62/858,470 and German patent application 10 2019 006 645.6, which are hereby fully incorporated by reference. It should be mentioned, that the layers and HAR structures do not need to extend through the whole measured volume.

Figure 4A:
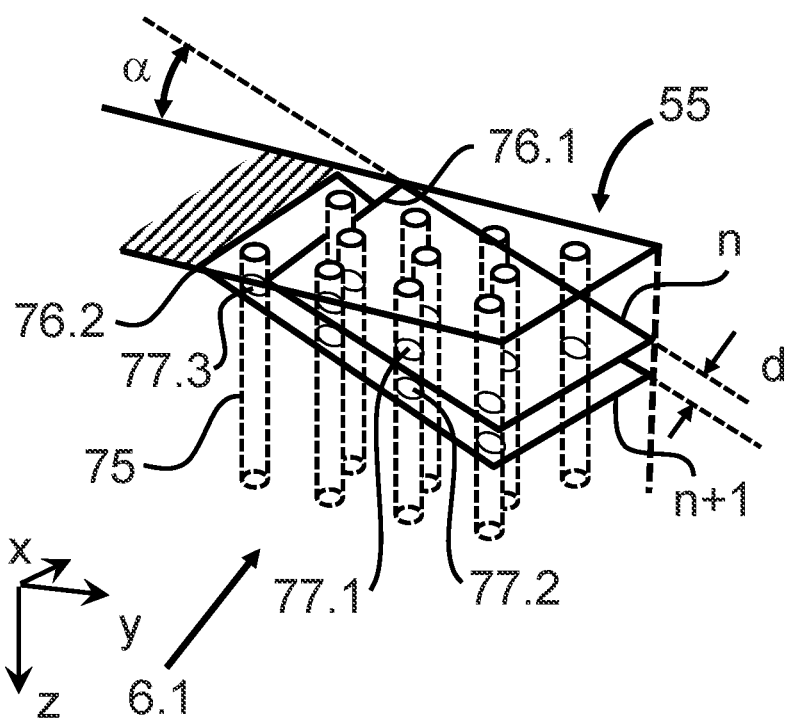
FIGS. 4A-4B illustrate aspects of a cross-section imaging technique in wedge-cut geometry.
Figure 4B:
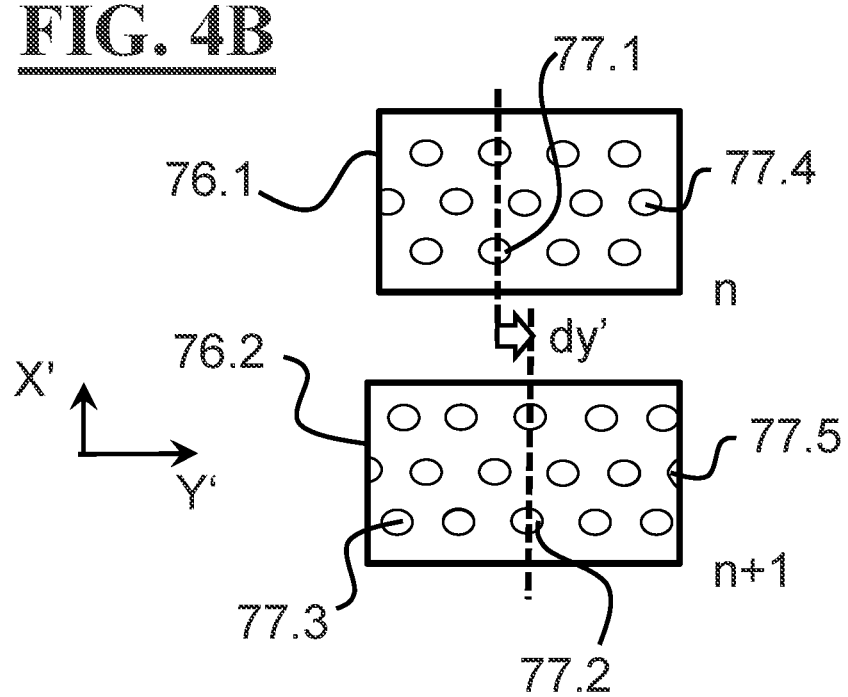

The method to recover the information about the mutual positions, depths and orientations of the cross-section image features of the HAR structures with respect to each other inside the inspection volume is described now in some embodiments of the disclosure. The angle GF between the FIB direction and the wafer surface 55 (XY-plane) controls the depth LZ, as well as the scanning in x and y controls the field of view (FoV) of the imaging beam 44 and the total lateral area LX and LY available for scanning imaging with imaging beam 44. The proper positioning of the image slices with respect to each other is often referred to as alignment, which includes in a first step registration of features of the 2D images and in a second step recovering the correct distance d between the subsequent cross-section image slices. A first alignment method is illustrated at FIGS. 4A-4B. Pillar like HAR structures, e.g., channels or channel holes, with one example referred to by number 75, extending in z-direction through a volume of a wafer, e.g., a memory chip. The HAR structures are oriented perpendicular to the wafer surface and become visible in the cross-section image slices obtained by imaging beam 44 (see FIG. 3). As in the illustration above, the cross-section surfaces are oriented at the predefined angle of approximately GF to the HAR structures. In the example of FIGS. 4A-4B, the slant angle GF is approximately 25°. FIG. 4B shows two examples of two 2D consecutive cross sections image slices with indices n and n+1, with first cross-section image features of HAR channels indicated by 77.1 to 77.5. In this example, the cross-section image slices n and n+1 are obtained perpendicular to the cross-section image surfaces n and n+1, with an imaging beam 44 arranged under an angle GFE of approximately 90° to the ion beam 51, with image coordinate system X',Y',Z' rotated at x-axis by angle GE to the coordinate system (x,y,z) of the wafer. Each of the cross-section surfaces n and n+1 form an edge with the top surface of the wafer 55, two examples of edges are indicated by reference numbers 76.1 and 76.2. In the example, a first HAR structure is intersected in the first cross-section image slice with index n with a first cross-section image feature 77.1, and in a second image slice with index n+1 again with the first cross-section image feature 77.2. The first cross-section image features 77.1 and 77.2 are common cross-section image features to both image slices, displaced by lateral displacement vector dy'. Due to the lateral shift, some of the cross-section image features of HAR structures disappear, such as cross-section image feature 77.4 of the nth image almost disappears in the (n+1) cross-section image slice, in which only a part of the cross-section image feature 77.5 is visible. Generally, with slant angle GF of the slanted cross-section surfaces, distance between images slices d and angle GE of imaging beam 44, the apparent lateral displacement dy' in the image coordinate system is given by dy'=d·sin(GE)/cos(GF). The difference in lateral coordinate corresponds to a difference in depth dz beyond the wafer surface with dz=(dy')/sin(GE). In an example, the change of depth dz of a corresponding first cross-section image feature 77.1, 77.2 perpendicular to the wafer surface 55 is derived from the lateral displacement dy' of the first cross-section image feature 77.1, 77.2 in at least two images n and n+1 of the plurality of images generated by FIB beam milling at predetermined angle GF and imaging at predetermined angle GE.

In the method of depth determination according to the example explained in FIGS. 4A-4B, imaging charged particle beam 44 (see FIG. 3) is oriented at a predetermined angle GE to the normal to wafer surface 55, which corresponds to the z-axis in the selected coordinate system. The method utilizes the apparent lateral displacement of first cross-section image features in a plurality of cross-section images wherein the first cross-section image features are cross sections of a vertically oriented structure in a semiconductor wafer such as a VIA or HAR structure. The vertically oriented VIA or HAR structures are oriented perpendicular to the wafer surface 55. However, with the method according to the example illustrated in FIG. 4A-4B, lateral displacement errors of first cross-section image features have an impact on the depth determination of the first cross-section image features. The method illustrated in FIG. 4A-4B, utilizing the first cross-section image features for depth determination, can therefore be of limited accuracy especially for deep structures. For example, real cross-section image surfaces deviate from planar shape, and the deviation increases with increasing depth. Also, HAR structures deviate from being perfectly perpendicular to the wafer surface.

Figure 5:
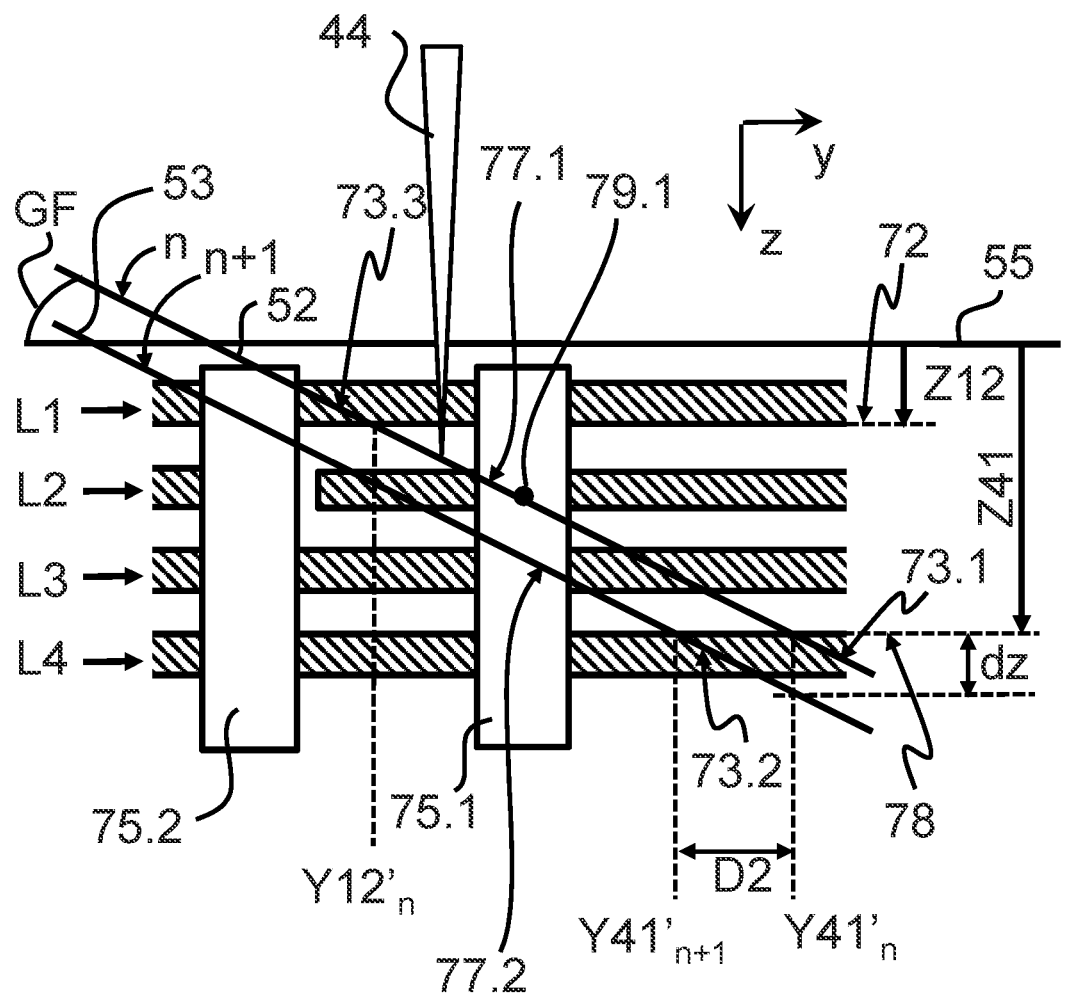
FIG. 5 illustrates a depth determination method of cross-section image features in a view in x-direction.

It is therefore a further task of the disclosure to provide a method for determining the positions of the first cross-section image features with even higher accuracy. A solution is provided with a second example of the method of depth determination of the disclosure. The method is described with imaging charged particle beam 44 oriented parallel to the normal to the wafer surface 55, thus the predetermined angle GE is selected approximately to be GE=0°. FIG. 5 illustrates this setup. The method is however not limited to imaging charged particle beam 44 oriented perpendicular to the wafer surface 55, and angles GE deviating from 0° are possible as well.

Two cross-section surfaces 52 and 53 are illustrated, which are inclined with predetermined angle GF to the wafer surface 55. In FIG. 2, the slant angle GF is approximately 26°, but other slant angles, for example 300 or more are possible as well.

Two HAR structures 75.1 and 75.2 and a set of layers L1 to L4 are illustrated. Since the imaging charge particle beam 44 is incident perpendicular to the wafer surface 55, the first cross-section image features 77.1 and 77.2 of a theoretically perfect HAR structure 75.1 appear in the n-th and (n+1)th image at the same y-coordinate and a depth determination from an apparent lateral displacement of the cross-section image features 77.1 and 77.2 in the n-th and (n+1)th image is not possible. If the first cross-section image features 77.1 and 77.2 of a real HAR structure 75.1 appear in the n-th and (n+1)th image at different y-coordinates, any depth determination from the different y-coordinates would be a misinterpretation. The depth determination according to the second example utilizes second cross-section image features of the plurality of layers comprising layers L1 to L4 in the plurality of N cross-section image slices comprising cross-section image slices n and n+1. For example, the second cross-section image features (see reference number 73.1 and 73.2) of layer L4 with an upper surface 78 with depth Z41 underneath the wafer surface have y'-coordinate $Y41'_n$ in the nth cross-section image and $Y41'_{n+1}$ in the (n+1)th cross-section image. For example, the second cross-section image feature 73.3 of a lower surface 72 of layer L1 with depth Z12 underneath the wafer surface has y'-coordinate $Y12'_n$ in the nth cross-section image. With the knowledge of depths of at least two edges of two layers, for example the depth Z41 and depth Z12, the y-coordinates in the cross-section image slice can be transformed in z-coordinates and a depth map Z(x,y) can be derived. For example, the depth z of the centroid 79.1 of first cross-section image feature 77.1 in the nth image is derived from the y-coordinate of the second cross-section image feature 73.3 and from the y-coordinate y' of centroid 79.1 with $z = Z12 + (y' - Y12'_n) \cdot \tan(GF)$. In an alternative example, the depth z of the centroid 79.1 of first cross-section image feature 77.1 in the nth image is derived from the y-coordinates of at least two second cross-section image features 73.1 and 73.3, and depth map Z(x,y) is obtained by $Z = Z12 + (y - Y12'_n) \cdot (Z41 - Z21)/(Y41'_n - Y12'_n)$. A local displacement of the positions of a second cross-section image feature, for example the local displacement D2 of upper boundary surface of layer L4 at positions with y-coordinates $Y41'_n$ and $Y41'_{n+1}$ in two consecutive cross-section image slices n and (n+1) are for example used as a reference for lateral alignment of the depth maps of consecutive cross-section image slices n and (n+1) or are used as verification of local milling angle GF or local slice distance dz. With the latter method, precise knowledge of milling angle GF is not required and a depth map Z(x,y;n) can be derived for each cross-section image slice with index n. In the example, cross-section image slices are presumed as parallel to the x-direction and thus having the same depth for each x-coordinate for a specific y-coordinate, and thus the depth-map Z(x,y;n) only depends on y, but is independent from x. In another example, the depth Z(x,y;n) is different for each x coordinate as well, and the depth map Z(x,y;n) is generated for each x-coordinate separately in analogous manner. With the method of some embodiments, a depth map Z(x,y) in generated for each cross-section image slice of the plurality of N cross section image slices, and a precise depth and position determination of cross-section image features is possible in the plurality of cross-section image slices obtained under wedge cut geometry. With an example of the method of some embodiments, a depth map Z(x,y) in generated for a cross-section image slice from the lateral positions of second cross section image features within the cross-section image slice, and a precise depth and position determination of first cross-section image features is possible for the cross-section image slices obtained under wedge cut geometry.

Figure 6:
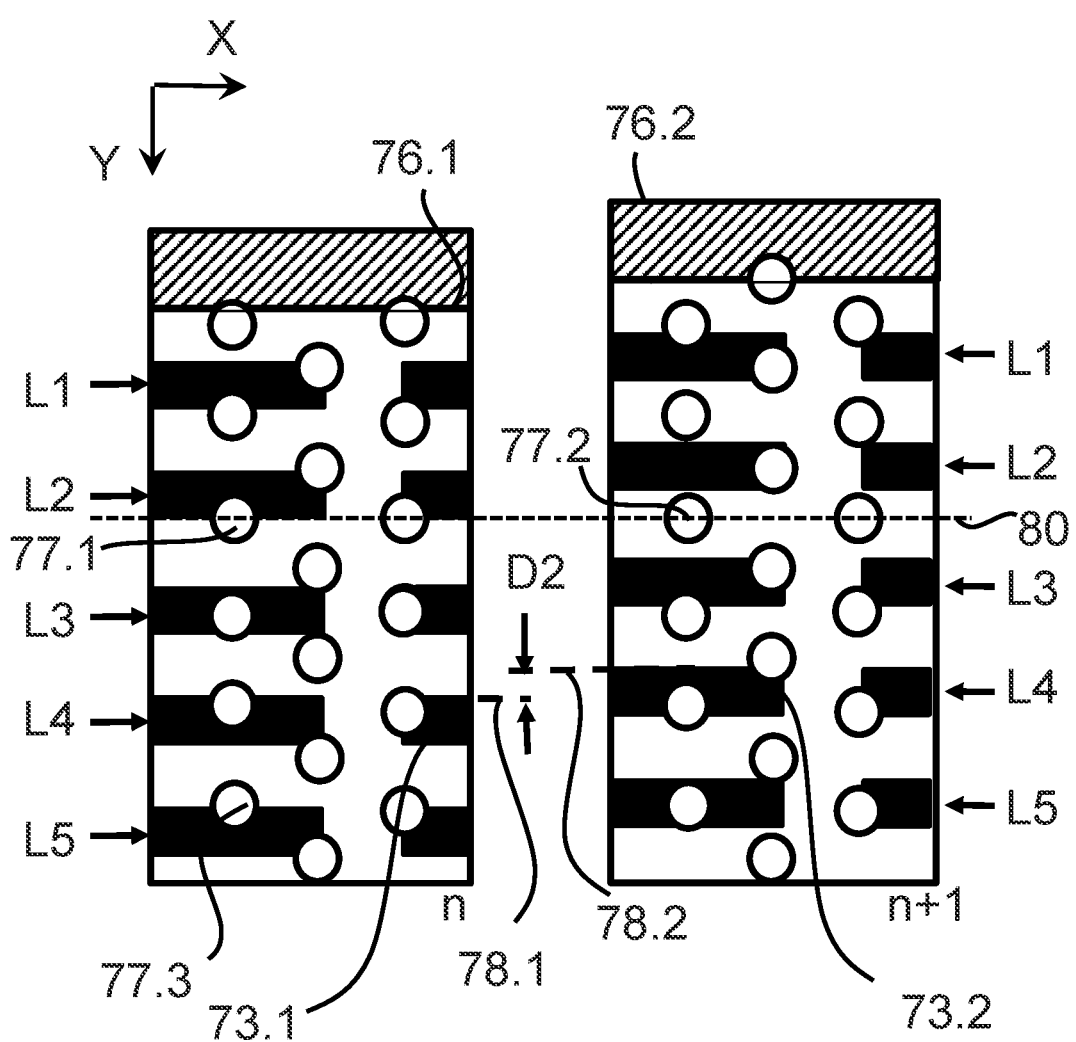
FIG. 6 illustrates a depth determination method of cross-section image features at the example of two cross-section image slices.

FIG. 6 illustrates the nth and (n+1)-th cross-section images, obtained by milling with FIB beam 51 at predetermined angle GF and imaging by imaging charged particle beam 44 (see FIG. 5) oriented in z-direction or perpendicular to wafer surface 55, with angle GE=0°. The vertical HAR structures appear in the cross-section image slices as first cross-section image features, for example first cross-section image features 77.1, 77.2 and 77.3. Since the imaging charged particle beam 44 is oriented parallel to the HAR structures, the first cross-section image features representing for example an ideal HAR structures would appear at same y-coordinates. Deviations from the constant position correspond to fabrication errors, for example a tilt or a "wiggling" of the HAR structures. For example, first cross-section image features of ideal HAR structures 77.1 and 77.2 are centered at line 80 with identical Y-coordinate of the nth and (n+1)-th image slice. The first cross-section image features of HAR structures, for example 77.1 to 77.3, therefore do not allow a depth determination of the cross-section image features within the wafer, nor do they allow a determination of slice distance d or slicing angle GF. The cross-section image slices further comprise a plurality of second cross-section image features of a plurality of layers comprising for example layers L1 to L5, for example second cross-section image features 73.1 and 73.2 of layer L4. The layer structure appears as high-contrast segments of stripes along X-direction in the cross-section image slices. The position of these stripes or second cross-section image features representing the plurality of layers, here shown layers L1 to L5, however, changes with each cross-section image slice with respect to the first cross-section image features. As the layers intersect the image planes at increasing depth, the position of the second cross-section image features changes from image slice n to image slice n+1 in a predefined manner. The upper surface of layer L4, indicated by reference numbers 78.1, 78.2, are displaced by distance D2 in y-direction, from which for example slice distance d or slice angle GF is computed by equation d=D2·sin(GF). From determining the positions of a second cross-section image feature, for example 78.1 and 78.2, the two depth maps Z(x,y) of two consecutive cross-section image slices can be aligned with respect to the Z-coordinate and a plurality of depth maps $Z_N(x,y)$ can be derived for the plurality of cross-section images slices.

By feature extraction of the second cross-section image features, such as edge detection or centroid computation and image analysis, and by knowledge of the depth of the second cross-section image features from a priori information, for example from design information, the determination of the lateral position as well as the depth of the first cross-section image features in cross-section image slices is therefore possible with high precision. The depth of any boundaries or surfaces of each layer running parallel to the wafer surface, such as layers L1 to L5, is usually known with very high precision and, due to the planar fabrication techniques involved in the fabrication of a wafer, constant over a larger area of a wafer. In an example, the method for depth determination is applied when the depths of the second cross-section image features, for example the layers or upper or lower surfaces of the layers are not known. Even without knowledge of the exact depth value in nm, a depth designation on a scale relative to the boundaries or surfaces of layers is possible with high precision. In this example, the depth of first cross-section image features within cross-section image slices is given relative to the depth of the second cross-section image feature boundaries such as upper and lower surfaces of the pluralities of layers. In other words, the depth of first cross-section image features is given relative the depth of second cross-section images features, like above, beyond, at same depth, or on the depth scale according a plurality of second cross-section image features L1 to LM with M layers.

Figure 7:
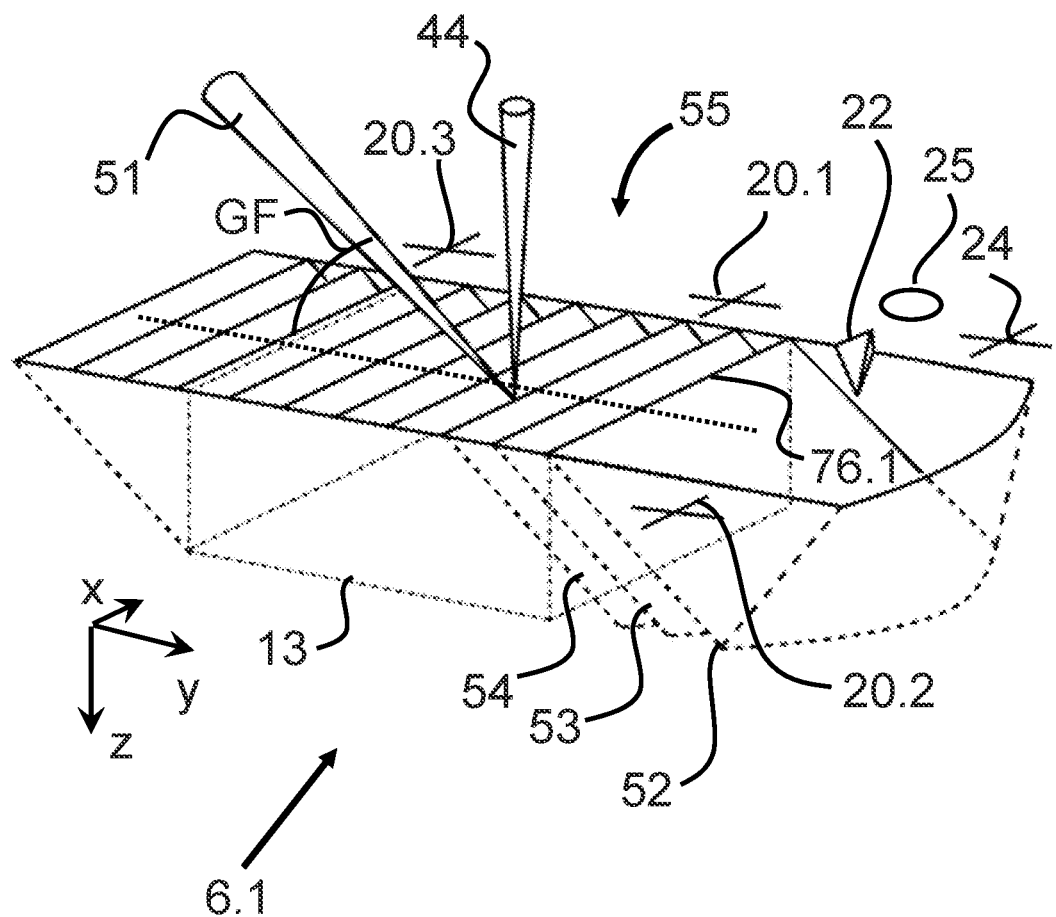
FIG. 7 illustrates a cross-section imaging technique in wedge-cut geometry utilizing additional alignment features.

A method and structures for alignment of a cross section image slice is provided. FIG. 7 illustrates several further aspects of the method of 3D volume inspection in a wafer. The inspection volume 13 at the measurement site 6.1 is for example marked by alignment mark 24. After placement of the wafer with measurement site 6.1 under the intersection point of FIB beam 51 and charged particle imaging beam 44, first a wedge above the first cross-section surface 52 is removed and the first cross-section image slice is obtained by scanning of charged particle imaging beam 44. After imaging the first cross-section surface 52, FIB milling is repeated at angle GF to the wafer surface 55 and charged particle imaging beam 44 is imaging the plurality of cross-section surfaces comprising cross-section surfaces 52, 53 and 54, and forms a plurality of cross-section image slices in the slice and image approach described above. In an example, the slice and image method in wedge-cut geometry comprises additional alignment features used for mutual alignment of the plurality of cross-section images. Before the milling of the cross-section surfaces, additional alignment features such as for example alignment marks 20.1, 20.2, 20.3 are fabricated on the wafer surface 55 by deposition of a layer and structuring the layer with an alignment pattern. An example of alignment pattern can be a cross, as illustrated at alignment feature 20.1, but arbitrary alignment patterns known in the art are applicable as well. Alignment features can also be for example an alignment trench or edge 22 milled into the boundary of the wedge cut, in a part which is not changed by the FIB while milling the slices through the inspection volume 13 at measurement site 6.1. Alignment feature 22 is not limited to an edge but can for example also be a tooth-like feature. Alignment features can also be integrated circuit features exposed at the wafer surface in the proximity of the inspection volume, such as integrated circuit structure 25. Alignment features as explained above form common cross-section image features in several cross-section image slices and allow an additional method for lateral alignment of the cross-section image slices. The coordinates of the first cross-section image features representing the semiconductor structures of interest are obtained with higher precision, as well as the derivation of the depth maps Z(x,y) from Y-coordinates of representative second cross-section image features is obtained with higher precision.

The alignment features are present in all cross-section image slices as common cross-section image features and can be analyzed by conventional edge-detection techniques (like, e.g., gradient-based contour extraction) in every individual cross-section image slice. It is known that the edge position can be most accurately determined in the direction orthogonal to the edge. In an example, the accuracy of the edge localization is improved in at least two directions by additional features, for example at least two alignment features. In an example, additional alignment features 20.1, 20.2, 20.3 are used for the lateral image alignment of the cross-section image slices. The alignment features 20, 22 enable to reconstruct the 3D volume from the plurality of tilted cross-section image slices without relying on the geometry of the semiconductor inside the inspection volume. In an example, the additional alignment features described above are configured for high contrast imaging with the charged particle imaging beam. High contrast and good visibility of for example the alignment patterns or the edges is achieved by locally coating the wafer surface at a measurement site prior to the patterning process or milling of the wedge into the wafer surface with a material offering high material contrast against the wafer sample material Silicon. Appropriate coating materials are for example Platinum (Pt) or Carbon (C) or a combination of both.

Instead or in addition to the fabricated alignment marks, integrated circuit features present and visible on a surface of the wafer can be used as additional alignment marks. For example, the visible structures 25 is formed by an HAR structure present on the wafer surface in the proximity of the inspection volume and visible in the cross-section image slices in a similar way as the alignment marks 20.1, 20.3, and 24. In an example, the visible structures 25 of an integrated circuit are used as additional alignment features and are used for the lateral image alignment of the cross-section image slices. For example, a surface of a wafer is processed in the proximity of an inspection volume to expose integrated circuit structures 25, such that the exposed integrated circuit structures 25 are visible for the charged particle imaging column and can be utilized for alignment via common cross-section image features.

Figure 8:
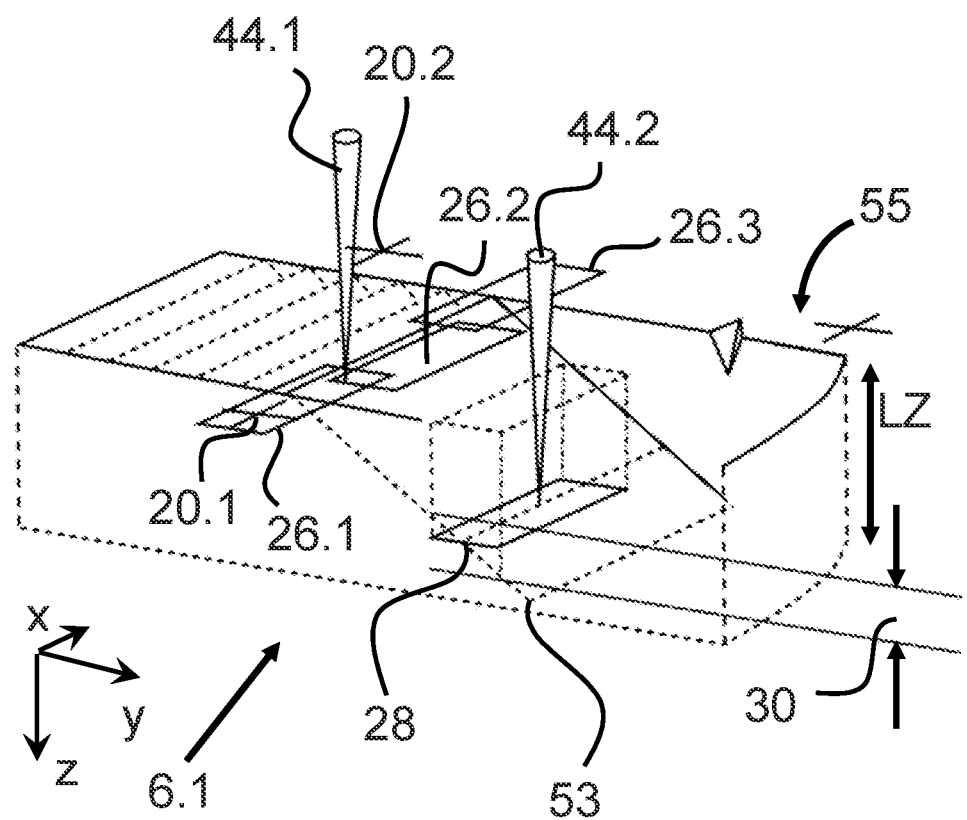
FIG. 8 illustrates a cross-section imaging technique in wedge-cut geometry utilizing stitching of image segments.

The cross-section surfaces, milled by the FIB beam 51, are imaged with charged particle imaging beam 44 by scanning imaging. In an example, the cross-section surfaces are not perpendicular to the charged particle imaging beam 44, and the field of view (FOV) of one scanning operation can be too small or the cross-section surface may be outside the depth of focus of the charged particle imaging beam 44 to obtain an image in one scanning operation. In such case, at least two scanning image segments are obtained by charged particle imaging beam 44 and the at least two image segments are stitched together. An example is illustrated in FIG. 8. After surface 53 is milled and exposed by FIB beam (not shown), a first image segment 26.1 is obtained by scanning imaging with charged particle imaging beam 44.1 at first position. The first image segment 26.1 comprises for example alignment feature 20.1 on the surface of the wafer 55. The wafer mounted on wafer stage (not shown) is then laterally displaced and further image segments, for example image segment 26.2 and 26.3 are obtained by scanning charged particle beam 44.1 at a second or a third position. The plurality of image segments 26.2, 26.2, 26.3 and further are configured to mutually overlap to enable mutual alignment of at least each pair of image segments using cross-section image features of structures present in the overlapping area of adjacent image segments. The "top-down" imaging of the sloped cross-section surface involves a certain depth of focus (DoF) of the vertical charged particle imaging beam. In case of insufficient depth of focus of imaging beam 44, for example if the DOF of imaging beam 44 is smaller than LZ, the FoV of the scanning imaging beam 44 is split into smaller sub-fields and imaged sequentially with progressive focus adjustments. Generally, the depth of focus of a charged particle imaging beam is limited by the desired resolution. For high-resolution imaging with a resolution of below 2 nm, for example 1 nm, the depth of focus is reduced. For example, in a scanning electron microscope SEM, the depth of focus at 1 nm resolution is below 50 nm. Es will be explained below in more detail, for inspection volumes with large depth extension LZ, it is therefore optional to apply a Helium Ion microscope instead, offering a much larger depth of focus of about up to 10 μm at high resolutions of about 1 nm.

Figure 9:
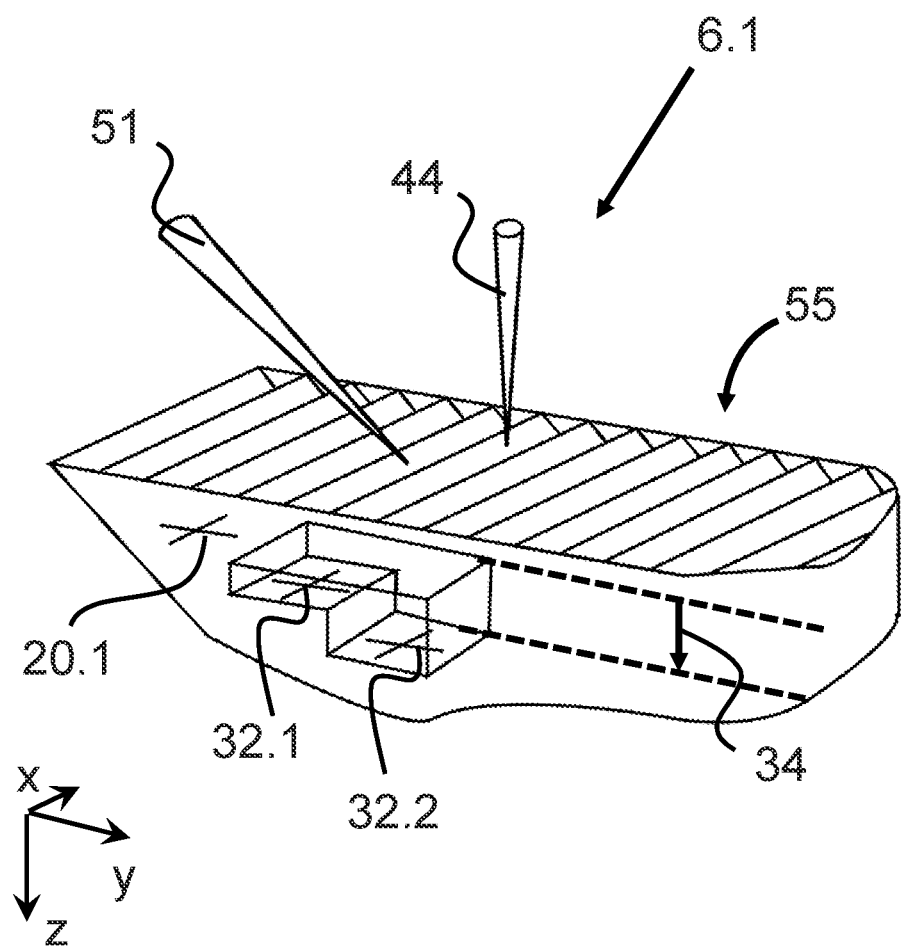
FIG. 9 illustrates a cross-section imaging technique in wedge-cut geometry utilizing additional alignment features in different depths.

In the example of LZ exceeding the DOF of the charged particle imaging beam of desired resolution of below 2 nm, for example 1 nm, the imaging plane of charged particle imaging beam 44.2 is changed to a position deeper in the wafer, and image segment 28 is obtained. The extension of image segment 28 is selected such that the depth extension 30 of the image segment 28 with respect to cross-section image surface 53 is below the depth of focus (DoF) of the charged particle imaging beam 44 at the desired resolution. It should be mentioned that for example a SEM offers also a dynamic focus adjustment during image scanning, which is however of limited range of z-position of about 1 μm to 2 μm and can involve a change of focus position for example by movement of the wafer stage such that the depth extension 30 of the image segment 28 is below the range for dynamic focus adjustment of the charged particle imaging beam 44. By adjusting the z- or focus position, for example by movement of the wafer stage in z-direction, a desired resolution can be maintained throughout the imaging of slanted cross-section surface 53. It is also possible to generate a smaller, second trench close to the inspection volume and generate at least one additional alignment feature at the bottom of the second trench. Thereby, several alignment marks are configured at predetermined depths to overcome the limitation of the DoF of the imaging beam 44. In an example, additional alignment features 32.1 and 32.2 are placed in three depth levels, as illustrated in FIG. 9. For example, alignment feature 32.2 is fabricated at depth level DLZ (reference number 34) for alignment of image segments at depth level DLZ. To achieve this, a small trench of a desired depth DLZ is milled into the wafer surface and the alignment pattern is structured at depth level DLZ. In an example, the alignment features 32.1 or 32.2 in different depth levels are integrated circuit features of the integrated semiconductor in proximity to the inspection volume. The alignment features 32.1 or 32.2 in different depth levels form common image features in the sequence of cross section image slices and enable a precision alignment of the sequence of cross section image slices for 3D volume image generation with high precision. In an example, the method of image stitching and the method of image alignment with additional alignment features provided at different depths is applied in conjunction with a dual beam device with the FIB column arranged at an angle between 8° and 450 and a SEM as charged particle beam imaging system. In an example, the method of image alignment with additional alignment features provided at different depths is applied to the inspection of deep inspection volumes with depth extension below the wafer surface of more than 5 μm, for example 6 μm or 10 μm or more.

Figure 26:
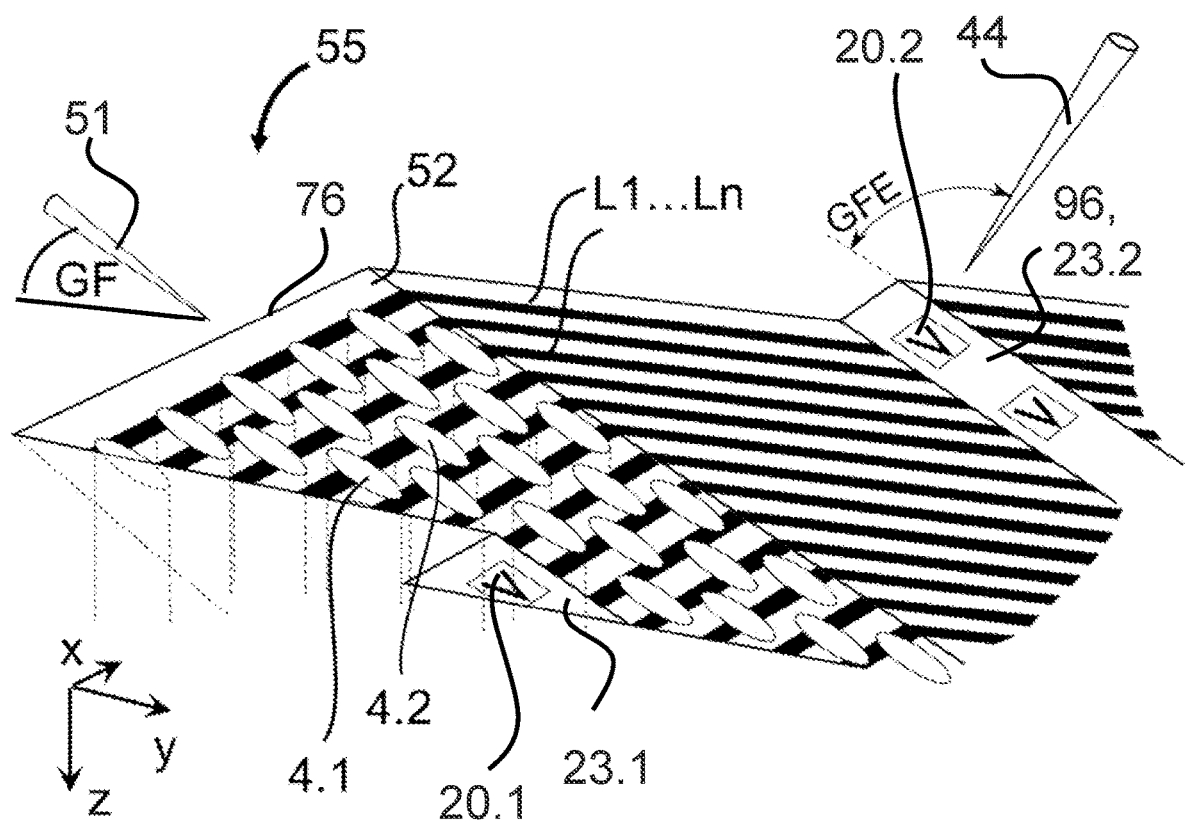
FIG. 26 illustrates a cross-section imaging technique in wedge-cut geometry utilizing additional alignment features on a previous or first cross section surface with larger extension.

FIG. 26 illustrates another example of additional alignment features according some embodiments. In the example, the angle GFE between the charged particle imaging beam 44 and the FIB 51 for slicing the plurality of surface cross sections is GFE=90°. The Angle GF is selected approximately at 30°, but can in general be between 25° and 60°. The plane formed by the FIB 51 and the imaging charged particle column 44 is orthogonal to the wafer surface 55. As a result, the imaging beam is orthogonal to the imaged cross section surfaces (slices). For sake of simplicity, only a single cross section surface 52 is shown. With such a setup, the entire cross section surface can stay "in focus" of the imaging beam 44. This can be especially important for an electron beam as imaging charged particle column with its limited depth of focus of about 200 nm. The large angle GFE between the FIB 51 and imaging columns 44 of GFE=90° reduces a possible volume conflict of the two columns.

In case of particularly deep samples (>10 μm), a steeper cut angle (e.g., >60°) will allow one to cover the entire depth range and thereby keeping the extension of the cross section surface 52 within the field of view (FOV) of a typical single beam charged particle microscope of about 10 μm to 15 μm. A shallower angle, on the contrary, for example an angle of GF below 20° would lead to a very extended field of view and image stitching would be involved. Therefore, in one example a slant angle GF between 25° and 60° can be used.

An initial alignment of the cross section image slices in the direction orthogonal to the imaging charged particle beam (i.e., parallel to the slices) can be achieved using the alignment marks 10.1 or 20.2. In the example of FIG. 26, the alignment marks 20.1 and 20.2 are formed on a first cross section 96, which is formed by the FIB 44 to a larger extension in x-direction, compared to the plurality of second cross section images slices below the first cross section 96, such as for example cross section 52. With this arrangement, at least a parallel surface segment 23.1 is achieved as a part of the first cross section surface 96, which remains at least at on one side of a second cross section surface, such as cross section surface 52. In the parallel surface segment 23.1, alignment features 20.1 can be formed for example by deposition and etching. A second parallel surface segment 23.2 can be achieved, comprising further alignment features 20.2.

Due to various factors, such as image distortion or a change of focus plane from the first cross section surface 96 to a second cross section surface 52, the alignment of the plurality of cross section images with the methods of alignment described above, utilizing additional alignment features such as features 20.1 and 20.2, usually turns out to be too coarse for a 3D volume image reconstruction with a lateral resolution below few nm, for example 5 nm, 3 nm or even below 2 nm. Therefore, according some embodiments, an additional method of precision alignment based on the structures or semiconductor features of the wafer inside the inspection volume is applied. The method of precision alignment also comprises a computation of the actual slice thicknesses d. With the step of the first, coarse alignment, registration errors of repetitive patterns are avoided and a mapping or registration of cross section image features in the cross-section image slices is obtained. With the second step or precision alignment, a mutual position accuracy of each pair of cross section image slices is achieved with an accuracy below 5 nm, 3 nm or even below 2 nm.

Figure 27:
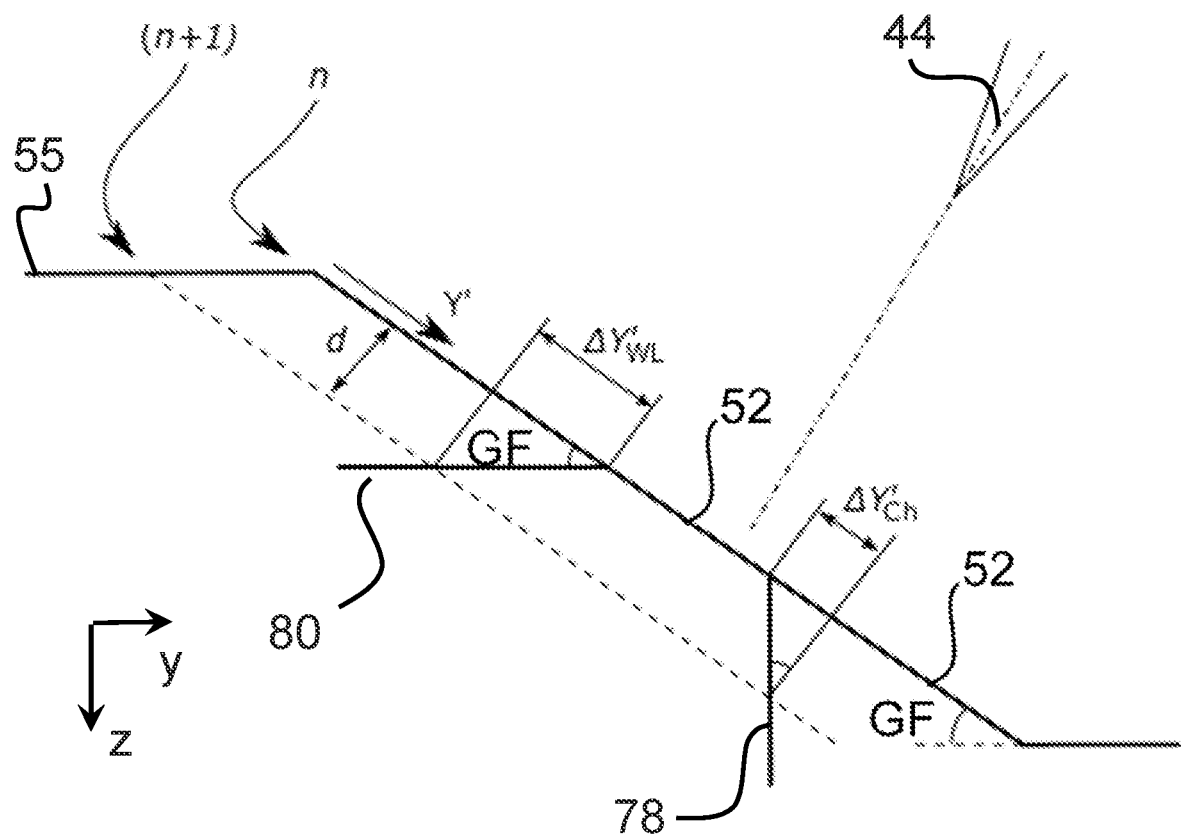
FIG. 27 illustrates a method of depth determination of cross section image features.

The integrated circuit structures inside the wafer usually contain vertical structures (such as 3D-memory channels or vias, 4.1 and 4.2 in FIG. 26) and horizontal structures (such "word-lines" or metal lines L1 to Ln). As described above, both types of structures can be used for the fine-alignment and for the slice thickness determination. An example is illustrated in FIG. 27. FIG. 27 shows a cross-section of a wafer according the wedge-cut method. The horizontal and vertical structures are indicated by a horizontal edge 80 of a layer and a vertical edge 78 of for example a HAR structure (for example elements 4.1 or 4.2 in FIG. 26). The Y'-components of the positions of the horizontal edge 80 and of the vertical edge 78 in cross section image slice with index (n+1) are compared to the Y'-components of the positions of the horizontal edge 80 and of the vertical edge 78 in the cross section image slice with index n, and the differences are computed with as $\Delta Y'_{WL}$ ("WL"="Word-Line") and $\Delta Y'_{Ch}$ ("Ch"="Channel"). The Y'-axis lies in the plane of the cross section image slice. Imperfect alignment leads to an additional displacement $\Delta Y'$, which is equal for all structures in the cross-section images slices. Therefore, the real displacements of the horizontal and of the vertical structures considered above are $$\Delta Y'_{WL} = -\frac{d}{\tan GF} + \Delta Y',$$

$$\Delta Y'_{Ch} = d\tan GF + \Delta Y'.$$

where d is the actual distance between the two cross section surfaces. Note that the displacement $\Delta Y'_{WL}$ is negative since Y-axis points downwards along the slice.

One can thus compute the displacement error $\Delta Y'$ and the slice thickness d which are used to reconstruct the lateral position of the cross-section image slice (n+1) with respect to the cross-section image slice (n) in the volume as $$\Delta Y' = \frac{\Delta Y'_{Ch} + \Delta Y'_{WL}\tan^2 GF}{1 + \tan^2 GF},$$

$$d = \frac{\Delta Y'_{WL} - \Delta Y'_{Ch}}{1 + \tan^2 GF}\tan GF$$

from the measured $\Delta Y'_{WL}$ and $\Delta Y'_{Ch}$ and with the slant angle GF. The displacement of the slice in the X-direction which is orthogonal to the picture plane in FIG. 27 is simply equal to the corresponding measured displacement of the structures $\Delta X_{WL}$ and $\Delta X_{Ch}$ along X-axis. Slight variations of the slant angle GF have only a limited impact on the computation of the displacement error $\Delta Y'$ and the thickness d. It is therefore possible to compute for example the displacement error $\Delta Y'$ with a precision below 1 nm even if the slant angle is not known with higher precision as for example 10, for example with GF=30°+/-1°.

Figure 17:
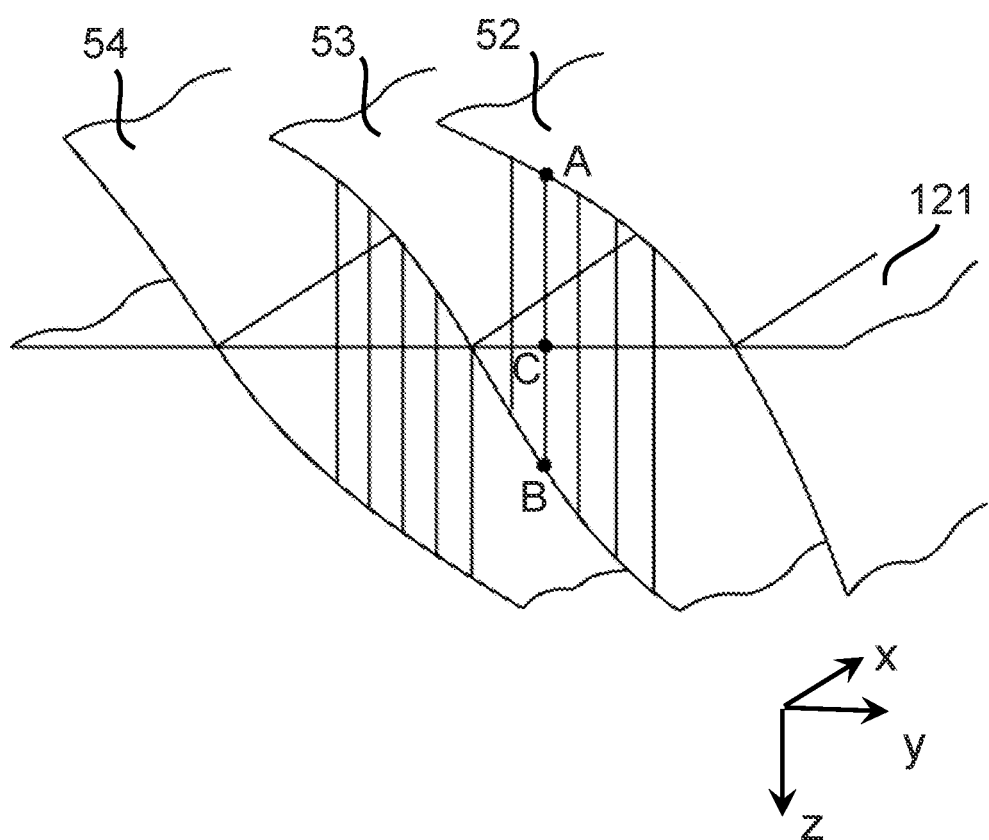
FIG. 17 illustrates an interpolation of a virtual image slice from a sequence of cross-section image slices from curved cross-section surfaces.

The plurality of cross section images slices usually do not form perfect parallel planes but have some topography, as for example illustrated in FIG. 17. To take the topography into account, the above equations can be solved locally in multiple locations of the cross-section images slices. Thus, the slice thickness d can be computed separately for multiple locations of each pair of cross section image slices. Also, the lateral displacement $\Delta X$ and $\Delta Y'$ can be computed locally, and a possible image distortion can be accounted for.

With the coarse and fine alignment method described above, a precision alignment of a plurality of cross section images slices is obtained and a 3D-volume image reconstruction with high precision below 5 nm, below 3 nm or even below 2 nm is possible.

Figure 10:
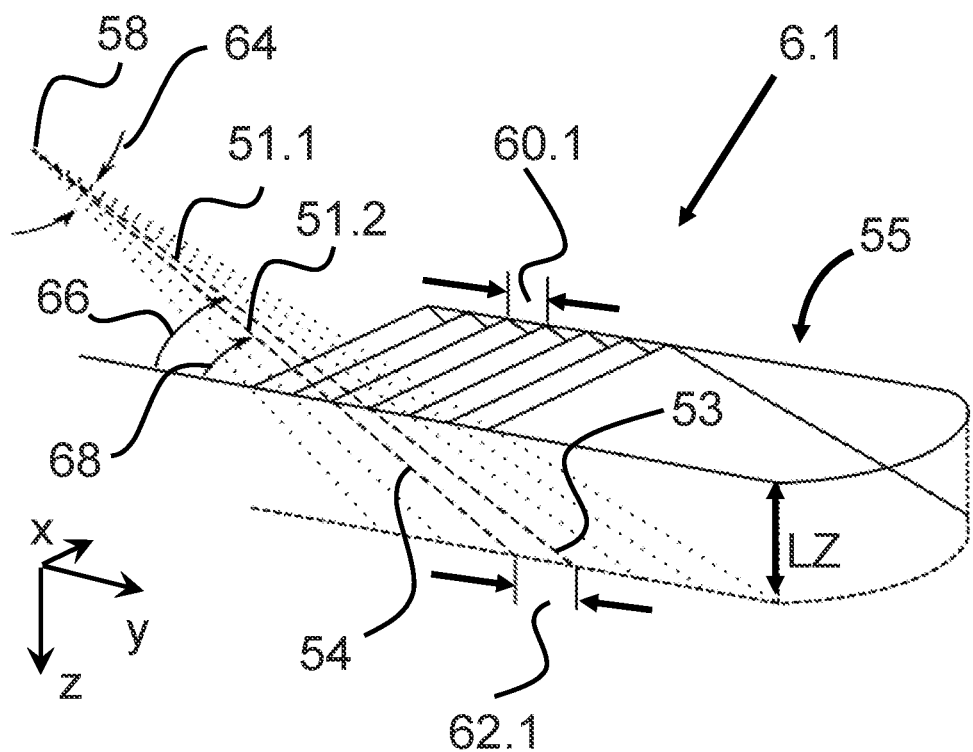
FIG. 10 illustrates a cross-section imaging technique in wedge-cut geometry with a fan-beam tomography approach.

In the method of 3D volume image generation of an inspection volume at measurement site 6.1 on a wafer, a plurality of subsequent cross-section surfaces with distance d is milled by FIB beam 51, which is configured at a predetermined angle GF to the wafer surface. In the coordinate system of the examples, FIB beam 51 is scanned in x-direction, and a cross-section surface is slanted at an angle approximately equal to GF. With "approximately equal" it is meant that the actual angle of a cross section surface can deviate from the milling angle GF by few degrees between 1° and 4° due to a beam divergency of the FIB. In an example, the generation of a plurality of subsequent cross-section surfaces with distance d below 15 nm, below 5 nm or even below can be achieved by lateral displacement of wafer stage in y-direction or in z-direction. In some embodiments, the plurality of subsequent cross-section surfaces with distance d of approximately 5 nm is obtained by milling with FIB beam 51 without lateral or vertical movement of the wafer stage. As illustrated in FIG. 10, FIB beam is scanned in x direction and in z direction around the FIB beam point of coincidence 58, while the wafer is not displaced by the wafer stage. This fan-shaped tomography approach applied to the wedge-cut geometry allows very precise and fast adjustment of the slice distance d of subsequent cross-section images slices. The angle of milling is not constant at predetermined angle GF but varies by milling angle difference 64 between a minimum milling angle and maximum milling angle around predetermined angle GF, with an angular spread GZ of about 1 mrad. Consequently, the distance between adjacent image slices is varying. As an example, the milling can be configured such that the slice distance 60.1 between two adjacent cross-section image surfaces, for example cross-section image surfaces 53 and cross-section image surface 54, is constant at the surface of the wafer 55. The slice distance 62.1 at the bottom of the inspection volume is different from slice to slice, depending of the different milling angles. For example, a first cross-section image surface 53 is milled with FIB beam 51.1 at first milling angle 66, and a second cross-section image surface 54 is milled with FIB beam 51.2 at second milling angle 68, such that the distance of the two adjacent cross-section image surfaces in wafer plane is dy1 (reference number 60.1), and the distance dy2 (reference number 62.1) of the two adjacent cross-section image surfaces at a depth LZ below wafer plane is larger than dy1. Thereby, precise control of the mutual distances of cross-section surfaces can be maintained within nm accuracy. The resulting plurality of cross-section slices is not parallel to each other in this case. The method of alignment and depth determination according to some embodiments of the disclosure described above remains equally applicable.

In an example, the method of tilting the FIB beam by the scanning unit of the FIB Column is utilized to adjust the milling angle GF. In an example, the distances between subsequent cross-section surfaces are adjustable. In an example, the distances between the plurality of cross-section surfaces are adjusted to be different for at least some of the distances of cross-section image surfaces. By the adjustment of distances and angle GF, throughput and resolution of the 3D volume image of the inspection volume is entirely or locally adjusted to the wafer inspection task.

Figure 11:
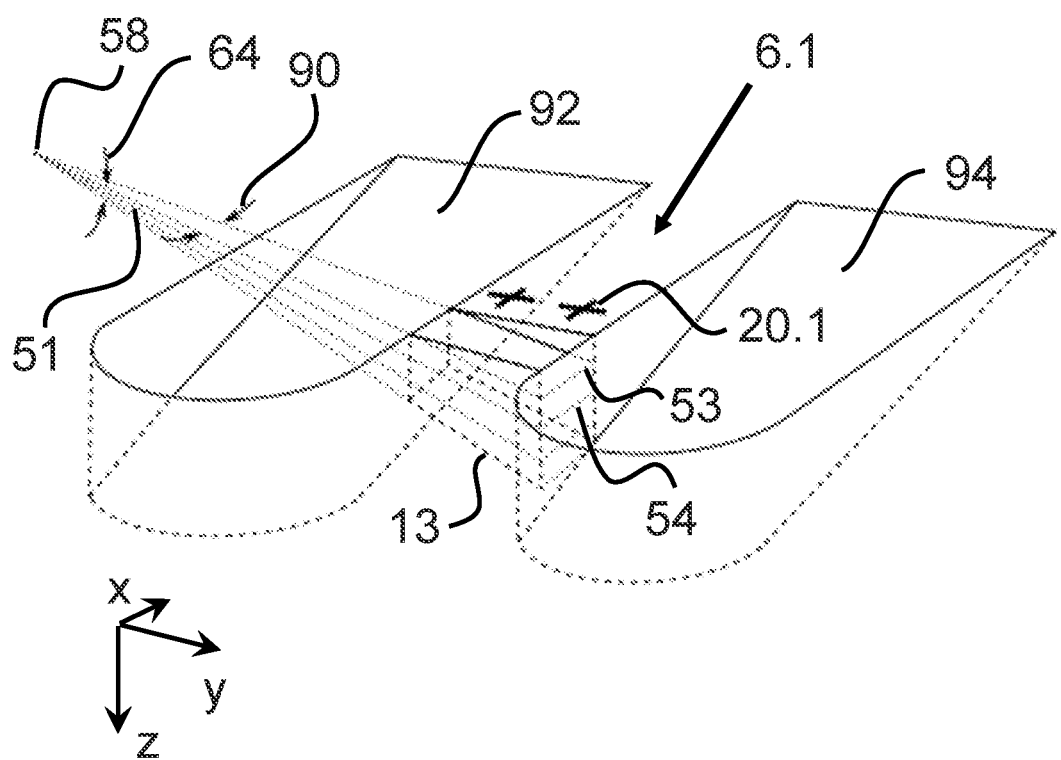
FIG. 11 illustrates a cross-section imaging technique in wedge-cut geometry with additional trenches for debris mitigation.

One of the problems is to achieve a homogeneous milling over large area of the plurality of cross-section image surfaces. In some embodiments, an arrangement and a method to avoid large deposition of debris on the sloped cross-section surfaces is disclosed. As illustrated in FIG. 11, at the measurement site 6.1, first a first, proximal trench 92 is milled into the wafer surface adjacent to the inspection volume 13, followed by milling a second, distal trench 94 into the wafer surface adjacent to the inspection volume 13, such that the inspection volume 13 is located between the first and second trench 92 and 94. The wafer is then rotated by 90°, and the plurality of cross-section image surfaces comprising cross-section image surface 53 and 54 are milled into the inspection volume 13 by FIB beam 51. FIB beam is scanned in x direction with angular spread GX (reference number 90) for each cross-section surface and tilted by scanning mechanism of the FIB column in z-direction within angular spread DZ (reference number 64). The plurality of cross-section images is obtained by charged particle imaging beam (not shown) from vertical direction, optional together with imaging of alignment features, for example alignment feature 20.1. The debris generated while FIB milling is accumulated in the distal trench 94 located on the opposite site of inspection volume 13 with respect to the FIB beam. The separation of the two trenches 92 and 94 is configured to accommodate the inspection volume 13. The width and depth of the proximal trench 92 is adjusted such that slicing angles of approximately angle GF described above is achieved. The depth of the distal trench 94 is adjusted such that slicing angles of approximately angle GF described above is achieved and deposition of debris in distal trench 94 is maintained. Thereby, the slice and image method in wedge-cut geometry is maintained with low debris and high precision. In an example, more than two trenches with different orientations and separations are configured to enable the generation of multiple sub-volumes of a desirable size and orientations for 3D-tomography. The alignment features such as alignment feature 20.1 are placed in proximity to the inspection volume 13. Similar to the example illustrated at FIG. 9, at least an alignment feature 20.1 can be fabricated at a depth DLZ.

Figure 12:
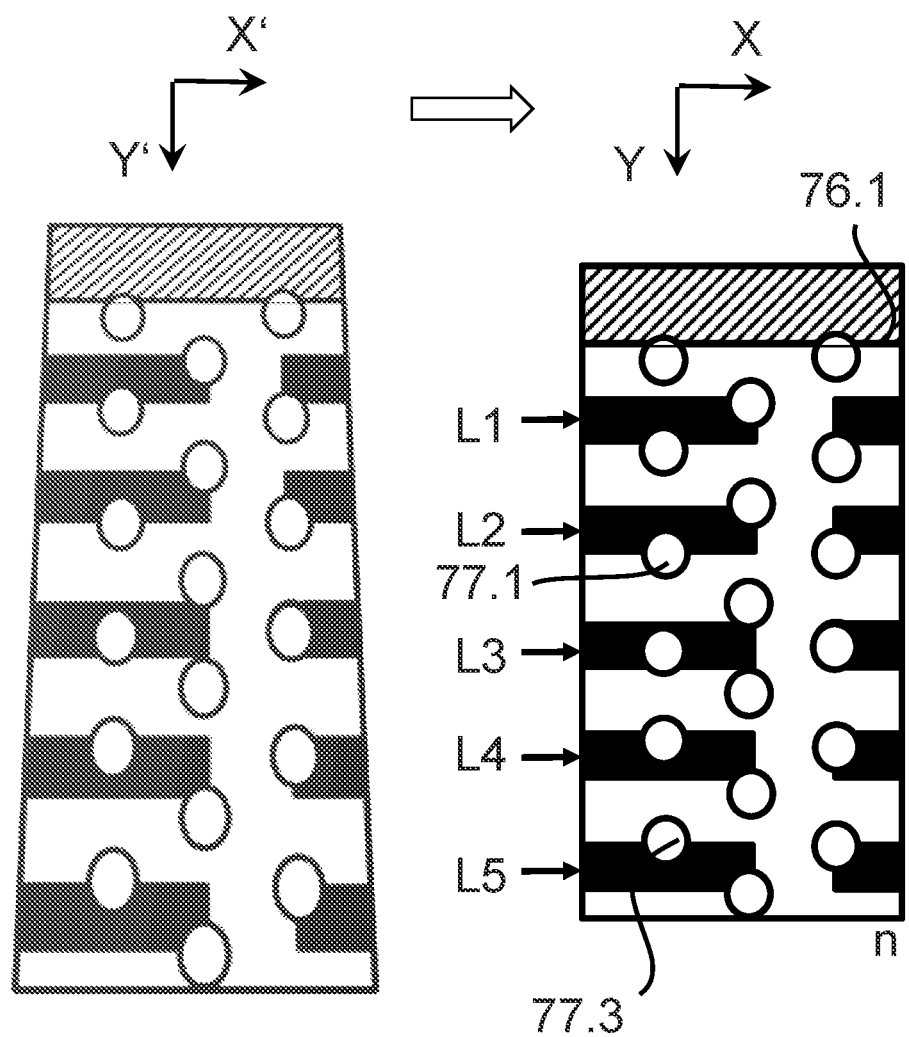
FIG. 12 illustrates a cross-section imaging technique in wedge-cut geometry with distortion compensation.
Figure 13:
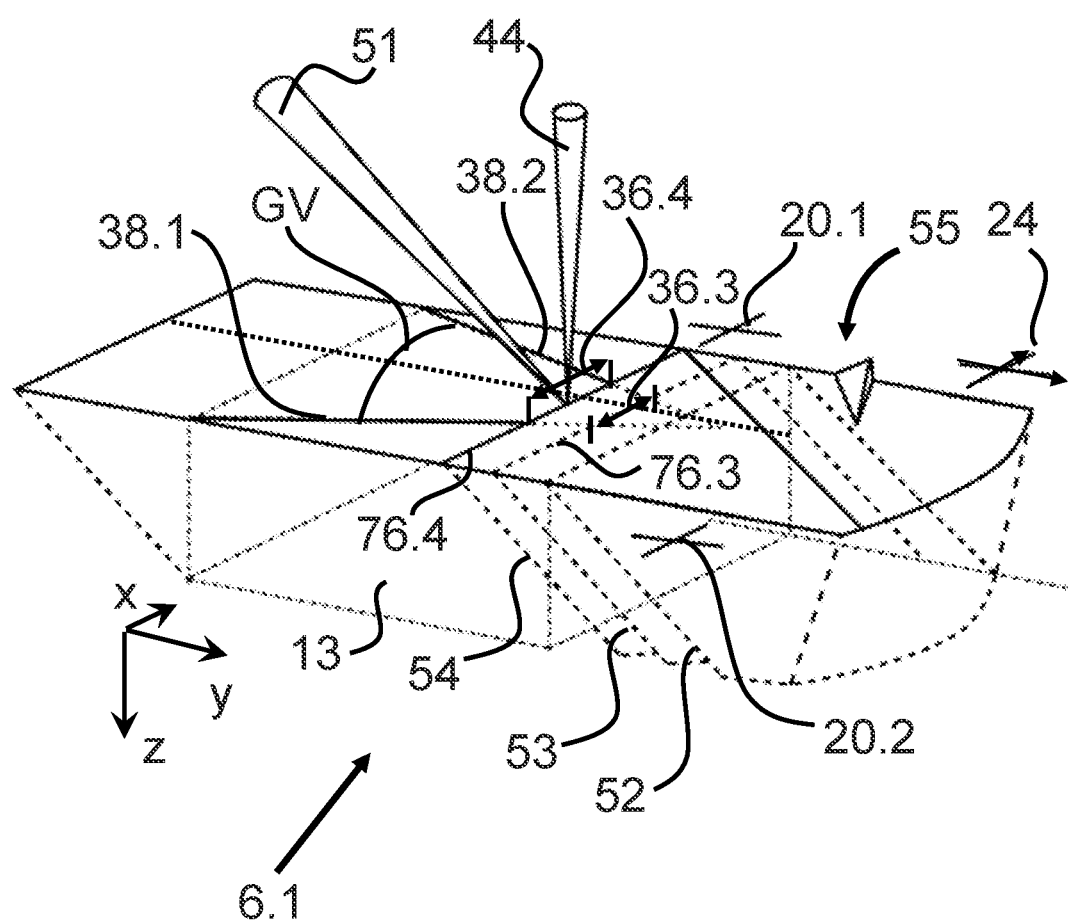
FIG. 13 illustrates a cross-section imaging technique in wedge-cut geometry with additional alignment features fabricated above the inspection volume.

In some embodiments, the imaging with imaging charged particle device is deteriorated by image distortion. The method steps of the embodiments and examples described above can be applicable to the configuration with imaging charged particle device at angle GE>0° in analogy. In an example, the optical axis of the imaging charged particle device is arranged at angle GE to the normal to the wafer surface. In this case, the imaging coordinate system (X',Y') is rotated with respect to the wafer surface by angle GE and the cross-section images are distorted in y-direction. The cross-section image slices are digitally transformed by anamorphic image transformation by application of a first image magnification in x-direction different to a second image magnification in y-direction. In an example, the scanning unit of the imaging charged particle beam device is deteriorated by distortion, for example Key stoning. The cross-section image slices are digitally transformed by distortion compensation to compensate for image distortions. The result of anamorphic image transformation and distortion compensation is illustrated in FIG. 12. The left side of FIG. 12 illustrates a cross-section image slice with image distortion resulting from image acquisition under angle GE and as an example Key stone distortion. The right side of FIG. 12 illustrates the cross-section image slice after distortion compensation with the reference numbers of FIG. 6.

In some embodiments, additional alignment features are provided on top of the inspection volume. Figure is an illustration of a distance determination between subsequent cross-section image slices inclined approximately to the predetermined main milling angle GF to the top surface of an integrated semiconductor sample. The cross-section image slices are inclined to the top surface approximately by angle GF. Additional alignment features can also be the edge of a cross-section surface with the wafer surface 55, such as edge 76.1 (see FIG. 7) between surface 52 and wafer surface 55. The edge 76.1 is removed in subsequent FIB milling of subsequent cross-section image surfaces, such as surface 53. Further edges 76.3, 76.4 however provide a measure of the slice distance d. In an example, previous to the milling, alignment features 38.1 and 38.2 are provided on the top surface of the wafer at the location of the inspection volume 13. The alignment features 38.1 and 38.2 are not parallel but inclined to one another with an angle of GV and have in at each edge of each respective cross-section image surface a different distance in x-direction, for example distance 36.4 at the edge 76.4 of the cross-section image surface 54. From the predetermined geometry and position of alignment features 38.1 and 38.2 and distance 36.4, the y-position of the edge 76.4 can be derived with high precision. In another example, from a first cross-section image surface 53 to an adjacent second cross-section image surface 54, the distance between the two cross sections with alignment features 38.1 and 38.2 changes from distance 36.3 to distance 36.4 by a value dx. At each cross-section surface, the distance of alignment features 38.1 and 38.2 is measured at the corresponding edge of the cross-section surface with wafer surface 55.

The change of distance dx is determined and the angle GV is known, so the distance dy in y direction between subsequent edges of cross-section images can be calculated by $$dy=dx/(2\cdot\tan GV/2)$$

In order to determine the distance d between the slices, the milling angle GF is considered and $$d=dy\cdot\sin(GF)=(dx\cdot\sin(GF))/(2\cdot\tan GV/2)$$

In the wedge cut geometry, any error included in dx itself or in measuring dx is now reduced by the factor sin(GF). Thus, with additional fiducials 38.1 and 38.2, the slice thickness d is derived, and the position change of y-position between second cross-section image features in adjacent cross-section image slices can be derived with high precision. Consequently, the depth of second cross-section image features and a depth map for each cross-section image slice is derived with higher precision. From the depth of second cross-section image features or the depth map, the depth of first cross-section image features is derived with high precision.

Figure 14:
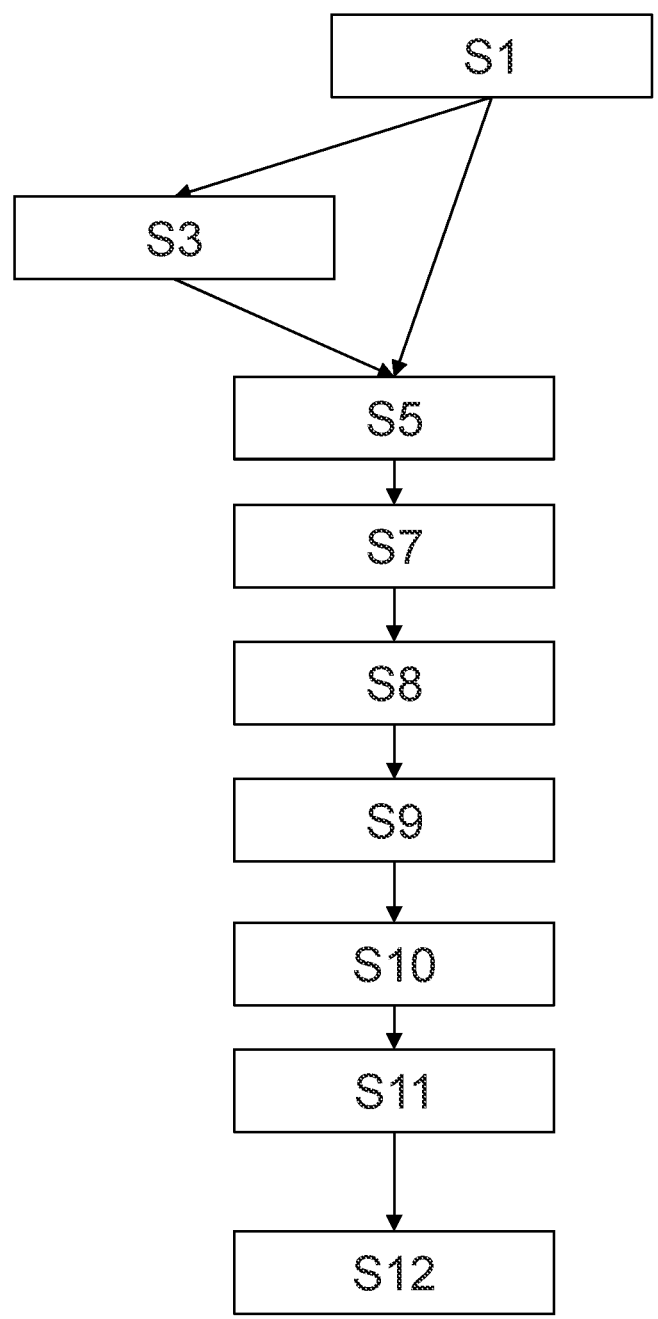
FIG. 14 illustrates certain method steps of a cross-section imaging technique in wedge-cut geometry.

In some embodiments, the method of 3D inspection of 3D inspection volumes in a wafer at at least on measurement site comprises the steps illustrated in FIG. 14. In step S1, a wafer is loaded on a wafer support table on a wafer stage into the vacuum chamber of a dual beam device. The dual beam device comprises a focused ion beam (FIB) column with a first optical axis of the FIB column arranged at an angle GF to the surface of the wafer support table or wafer surface, when loaded on the wafer support table. The measurement tool further comprises an imaging charged particle beam, for example a SEM or Helium ion microscope, with a second optical axis of the charged particle imaging device forming an angle GE with the normal to the surface of a wafer support table, arranged at an angle GFE to the FIB column and the first and second optical axes forming an intersection point.

The location of the inspection volume at a first measurement site on the wafer is determined and the wafer is placed by movement of the wafer stage such that a first measurement site is located at the intersection point of FIB column and charged particle imaging column. Optionally, the orientation of the wafer is further adjusted by rotation of the wafer support table of the wafer stage.

In an optional step S3, at least an alignment feature such as an alignment mark is fabricated in vicinity of the measurement site. In optional step S3, a coating can be deposited locally on the wafer surface at measurement site to cover the inspection volume as well as for generating an alignment mark of high imaging contrast or to achieve a high contrast between the sample surface and the cross sections uncovered in the course of the milling. The additional alignment features such as e.g. alignment mark 20.1 or alignment mark 22 in FIG. 7 are configured such that at least one of the alignment features is visible in at least two cross-section images slices, forming common cross-section image features for mutual alignment of the at least two cross-section image slices. In an example, the additional alignment features such as e.g., alignment mark 20.1 or alignment mark 22 in FIG. 7 are configured such that at least one of the alignment features is visible in all cross-section images slices for mutual alignment of all of the cross-section image slices. In an example, the alignment feature is fabricated above the inspection volume and configured for determining the position of the plurality of edges, including the first and second edge, formed by the intersection of the plurality of cross-section surfaces, including first and second cross-section surfaces, with the wafer surface.

In step S5, a first wedge is removed from the top surface of the wafer by FIB milling to expose the first cross-section surface for cross-section imaging. The FIB milling is for example monitored by the charged particle imaging beam.

In step S7, the slice and image method in wedge cut geometry is performed and a plurality of cross-section images is generated. The FIB milling of a new cross-section surface is for example monitored by the charged particle imaging beam, including monitoring of alignment features fabricated in step S3 to control the distance d between subsequent image slices. Thereby, a sequence or plurality of N cross-section images slices comprising at least a first cross-section image slice and a second cross-section image slice in the inspection volume is obtained. The obtaining of first and second cross-section image slices includes subsequently exposing at least a first and a second cross-section surface in the inspection volume by milling into the inspection volume with the FIB column approximately at angle GF and imaging the at least the first and the second cross-section surfaces with the charged particle imaging device to obtain the at least first and second cross-section image slice. Generally, the number N of cross-section images slices is at least N=10 (e.g., N>100, N≥1000).

In an example, the slice and image method is performed in the fan-shaped tomography approach, which comprises scanning of the focused ion beam of the FIB column by a scanning unit in a first direction to expose a first cross-section surface within the inspection volume, tilting the focused ion beam by the scanning unit in a second direction perpendicular to the first direction, and scanning focused ion beam by the scanning unit in the first direction to expose a second cross-section surface within the inspection volume, such that the plurality of cross-section surfaces including the first and second cross-section surfaces form different angles of at approximately slant angle GF with the wafer surface.

In step S8, cross-section image features are detected and classified, such that cross-section image features are classified into first cross-section image features and second cross-section image features and optionally an alignment feature forming a common cross-section image feature. For cross-section image feature detection and classification, known methods in the art can be applied, such as edged detection, image comparison, features extraction, object detection, including combinations thereof also known as machine learning algorithms. Thereby, optionally a common cross-section image feature is detected and classified in the first and in the second cross-section image slices.

In step S9, the plurality of cross-section images is mutually aligned such that a plurality of first cross-section image features of vertical structures such as HAR structures or vias appear at almost identical lateral coordinates, for example the x-y coordinates. In an example, at least one additional alignment feature or common cross-section image feature is utilized to align the plurality of cross-section images. A plurality of cross-section images is mutually aligned using at least one of the previously generated alignment features such that a plurality of first cross-section image features of vertical structures such as HAR structures or vias appear at similar lateral coordinates. By utilizing the at least one additional alignment feature, local lateral position errors of the first cross-section image features such as cross sections of individual HAR structures are detected. By determination of cross-sectional positions of HAR structures relative to the alignment marks, a global wiggling error of HAR structures over depth z perpendicular to the wafer surface is detected.

In an example, the mutual lateral image alignment includes subtraction or digital compensation of an image distortion deviation between the at least first and second cross-section image slices.

In step S10, a depth map $Z(x,y)$ is created from the positions $(x,y)$ of second cross-section features in each of the cross-section image slices. In an example the depth z of an arbitrary $(X,Y)$-point in a cross-section image slice is derived from the lateral displacement of a second cross-section image feature. The second cross-section image features correspond for example to the layer structure of the semiconductor devices oriented parallel to the wafer surface. In an example the depth Z of an arbitrary $(X,Y)$-point in a cross-section image slice is extrapolated from the lateral positions of a plurality of second cross-section image features, formed by a plurality of layers of the integrated semiconductor device, with layer surfaces parallel to the wafer surface.

Thereby, in step S10, a plurality of N depth maps $Z(x,y;n)$ with index $n=1 \ldots N$ of the plurality of N cross section image slices is generated.

In an example, the depth determination and depth map creation via the second cross-section image features is combined with alignment features, such as additional alignment marks or fiducial based alignment. Integrated semiconductor samples may include highly repetitive features such as gates in the gate layer, which might lead to ambiguities in the image registration of second cross-section image features. Generally, a coarse registration with alignment features or fiducials formed on top of the integrated semiconductor sample can reduce the ambiguity and increase the speed of fine image registration of the second cross-section image features used for depth determination according to various the embodiments of the disclosure.

In step S11, the depth of a first cross-section image feature in at least a cross-section image slice is derived from the depth map. In an example, step S10 and step S11 form the single step of depth determination of determining the depth of at least one first cross-section image feature from at least one of the second cross-section image feature.

In an example, the step of determining the depth of the first cross-section image feature comprises determining a lateral difference of a first position of a second cross-section image feature in a cross-section image slice and a second position of the second cross-section image feature in the second cross-section image slice.

In an example, at least two second cross-section image features are determined in a first cross-section image slice, wherein each of the second cross-section image features represent an integrated semiconductor structure at a different depth within the inspection volume. The step of determining the depth of a first cross-section image feature comprises determining lateral positions of the at least two second cross-section image features.

The depth determination of first cross-section image features via second cross-section image features includes statistical averaging and is thus more robust to e.g. image noise. Due to the typical larger number of layers, for example five, 10 or up to 100, the cross-section images comprise a plurality of second cross-section image features, and by depth determination via the plurality of second cross-section image features the statistics of the depth determination is improved. Since defects are rare, they do not affect the overall quality of depth determination method. In addition, defect candidates can be detected as outliers from the expected depths according to the statistical evaluation.

In the embodiments and examples described above, the cross-section surfaces are considered as planar surfaces, exposed by FIB milling and polishing. In a further example, at least a cross-section surface is curved due to errors or deteriorations in the milling and polishing process. Consequently, the corresponding cross-section image slice is an image of curved surface and therefore comprises distortion and artefacts. In an example, cross-section image features are used to determine the curvature of a cross-section surface and apply the determined surface curvature for correction of the distortion of the cross-section image slice.

In a step S12, a 3D volume image of the inspection volume is generated, comprising the 3D position information of the first cross-section image features. In step S12 of generating a 3D volume image of the inspection volume, the depth information of a plurality of first cross-section image features from a plurality of depth maps of each of the plurality of cross-section image slices is combined. From the depth maps together with the plurality of first cross-section image features of the plurality of cross-section image slices, a 3D volume image of the inspection volume is composed. The corresponding integrated circuit features, corresponding to the first cross-section image features, are derived to form a 3D volume image of corresponding integrated circuit features. In a further step, defects or deviations of the corresponding integrated circuit features or properties of the corresponding integrated circuit features in the 3D volume image are derived.

In an example, the second cross-section image features are analyzed and from a local variation of the width of the second cross-section image features representing structures in layers, the local cross-section surface slope can be determined. In an example, the information of local cross-section surface slopes is used for an iterative milling in a feedback loop correction. In an example, a digital image transformation is achieved by transfer from the distorted image slice to an undistorted image slice as obtained from a planar cross-section surface is performed. In an example, the cross-section surface is curved in x and y-direction. As with the previous embodiments, positions or edges of the second cross-section image features are used for distortion correction and the extraction of the corresponding z coordinate for every pixel of the corresponding cross-section image slice, including the z-positions of the first cross-section image features, is obtained.

In one aspect of the disclosure, a comparison of the detection results at different measurement sites on a wafer is performed, for example integrated circuit features and properties are derived in 3D according to the slice and image method in the wedge cut geometry at different measurement sites. Integrated circuit features and properties can for example be tilt or wiggling errors of HAR structures. The depth determination of the integrated circuit features represented by first cross-section image features utilizing second cross-section image features by the methods described above at different measurement sites allow a precise comparison including the comparison of the depth of integrated circuit features and properties. The second cross-section image features representing lines or layers parallel to the wafer surface form a common reference for depth determination at different measurement sites. Tilt and wiggling of the vertical HAR structures can thus be determined in 3D at different location or measurement sites on a wafer, without an additional common alignment reference.

Figure 15:
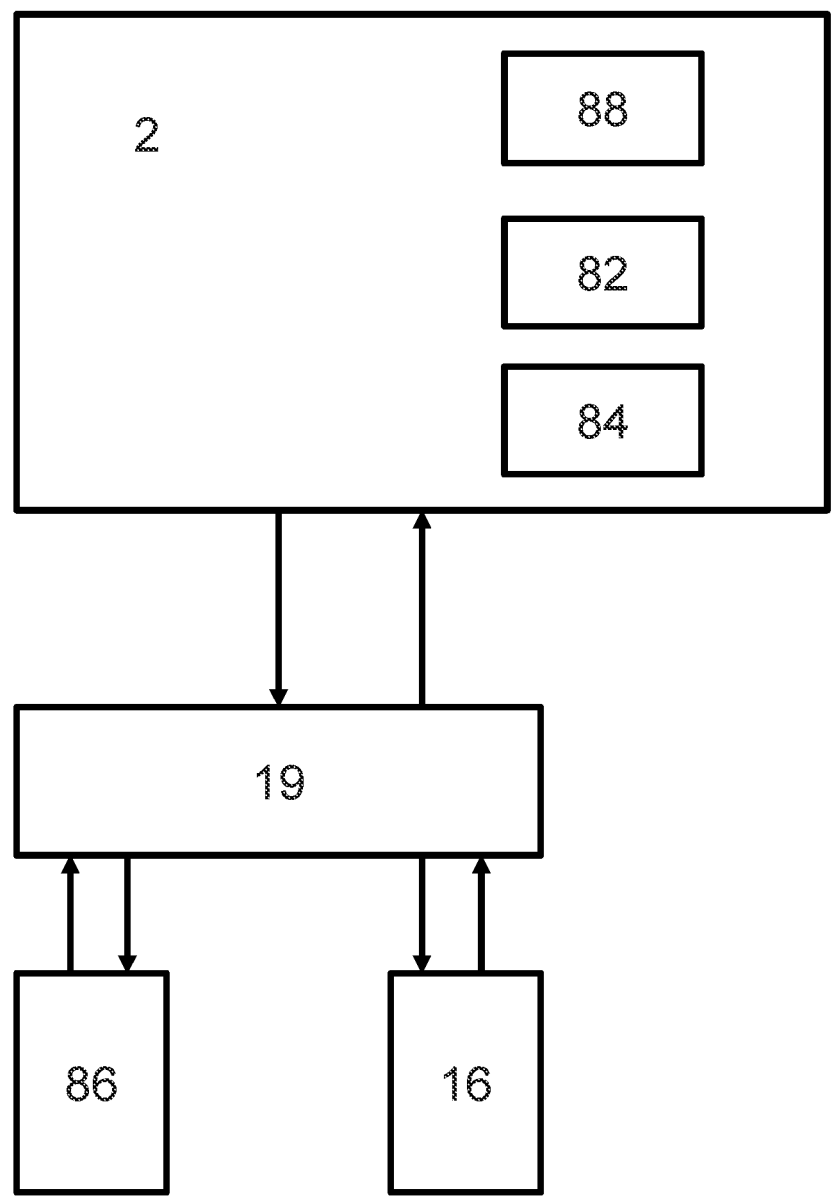
FIG. 15 schematically depicts an operation and control unit.

In some embodiments, a wafer defect inspection device is provided, which is configured for inspection of inspection volumes in wafers without extraction of samples from the wafer. Some aspects of the wafer defect inspection device are explained in conjunction with FIG. 2. The wafer defect inspection device comprises a focused ion beam column 50 configured for milling and exposing at least a first and a second cross-section image surface in an inspection volume in a wafer 8 and a charged particle imaging device 40 configured for imaging of a plurality of cross-section surfaces, comprising at least a first and a second cross-section surfaces to form a plurality of cross-section image slices, comprising a first and a second cross-section image slices. Wafer defect inspection device further comprises operation unit 2, which triggers placement and alignment for example of measurement site 6.1 of the wafer 8 at the intersection point via wafer stage movement via control unit 19 and stage control unit 16. Operation unit 2 has software operation code installed and triggers during operation the inspection of inspection volumes by the slice and image method in wedge cut geometry, comprising repeatedly operations of FIB milling, image acquisition and stage movements. Operation unit communicates with control unit 19, which is in control of the charged particle beam imaging column 40, of FIB 50 and connected to a control unit 16 to control the position of the wafer mounted on the wafer support table via the wafer stage (not shown). Further aspects of the wafer defect inspection device are illustrated in FIG. 15. In an example, control unit 19 communicates not directly with a charged particle beam column, but with a charged particle beam control unit 86, which is in control of the operation of a charged particle beam column such as the charged particle imaging device 40 or FIB 50. Operation unit 2 comprises an image processing unit 82 with a computer program and software program code installed for receiving image information from charged particle detector 17 via the control unit 19, synchronized with scan operation of the imaging charged particle beam scanned by scanning unit (not shown) of charged particle imaging device 40. Image processing unit 82 and software program code installed in the image processing unit 82 is during use configured to determine first and second cross-section image features in the at least first and second cross-section image slices by feature detection and classification as described above in step S8. Image processing unit 82 and software program code installed in the image processing unit 82 is during use further configured to determine the depth of the first and second cross-section features within the inspection volume, the first and second cross-section image features being cross sections of integrated semiconductor structures inside the inspection volume. Image processing unit 82 and software code implement image processing methods as described above, such as corner or edge detection, thresholding, or morphologic operations, or similar operations, are well known in the art. Image processing is recently improved by the increase of computation speed for example by usage of computer clusters comprising several 100s of processors in an image processing unit 82. Image processing methods to extract features or structures of integrated semiconductor samples can also involve or be replaced by Machine Learning algorithms.

In an example, integrated semiconductor structures are a priory known structures. Design information or 3D CAD information can be used to improve the edge extraction of the metal lines and HAR channels, the layer surface position extraction as well as depth determination with high precision. For example, CAD information can be used to identify locations were metal lines end and therefore should not be visible in cross-section images anymore. Thereby, outliers of the image processing methods can be reduced. Further, the depth of second cross-section image features is typically known with high precision from 3D CAD information. Image processing unit 82 and software program code installed in the image processing unit 82 enables during use the determination the depth of the second cross-section features within the inspection volume by comparison to 3D CAD information, and the depth of first cross-section image features is derived, for example according the methods described above.

The operation unit 2 further comprises a defect detection unit 84 configured to determine during use deviations from predetermined 3D properties of the semiconductor structures inside the inspection volume, for example by comparison of the first cross-section image features to 3D CAD data or to library data of predetermined 3D properties. In addition, defect candidates can be detected as outliers from the statistical evaluation.

Operation unit 2 further comprises an interface and communication unit 88, which is in communication with external input and output devices, for example a user control terminal, a tablet, a database, a wafer handler, or a fabrication operation system.

To obtain the information in an inspection volume inside a wafer, such as a defect or a deviation from desired shape of a semiconductor structure, a sequence of tilted cross sections surfaces is sequentially milled and imaged "slice-by-slice". Once a layer of material of adjustable thickness is removed by milling with the FIB, a new cross-section image slice is acquired using the vertical charged particle imaging beam. The number of N cross-section image slices acquired in this manner covers the inspection volume inside the wafer and a 3D volume image data with a lateral pixel size and distance dz between successive image slices is generated. The 3D volume image data is analyzed and used to reconstruct the properties of for example a semiconductor memory stack inside the inspection volume. With the embodiments of the disclosure described above, a reconstruction is provided which includes a recovery of the information about the mutual positions and orientations, including the depth of the individual cross-section image features of interest inside the inspection volume.

Figure 16:
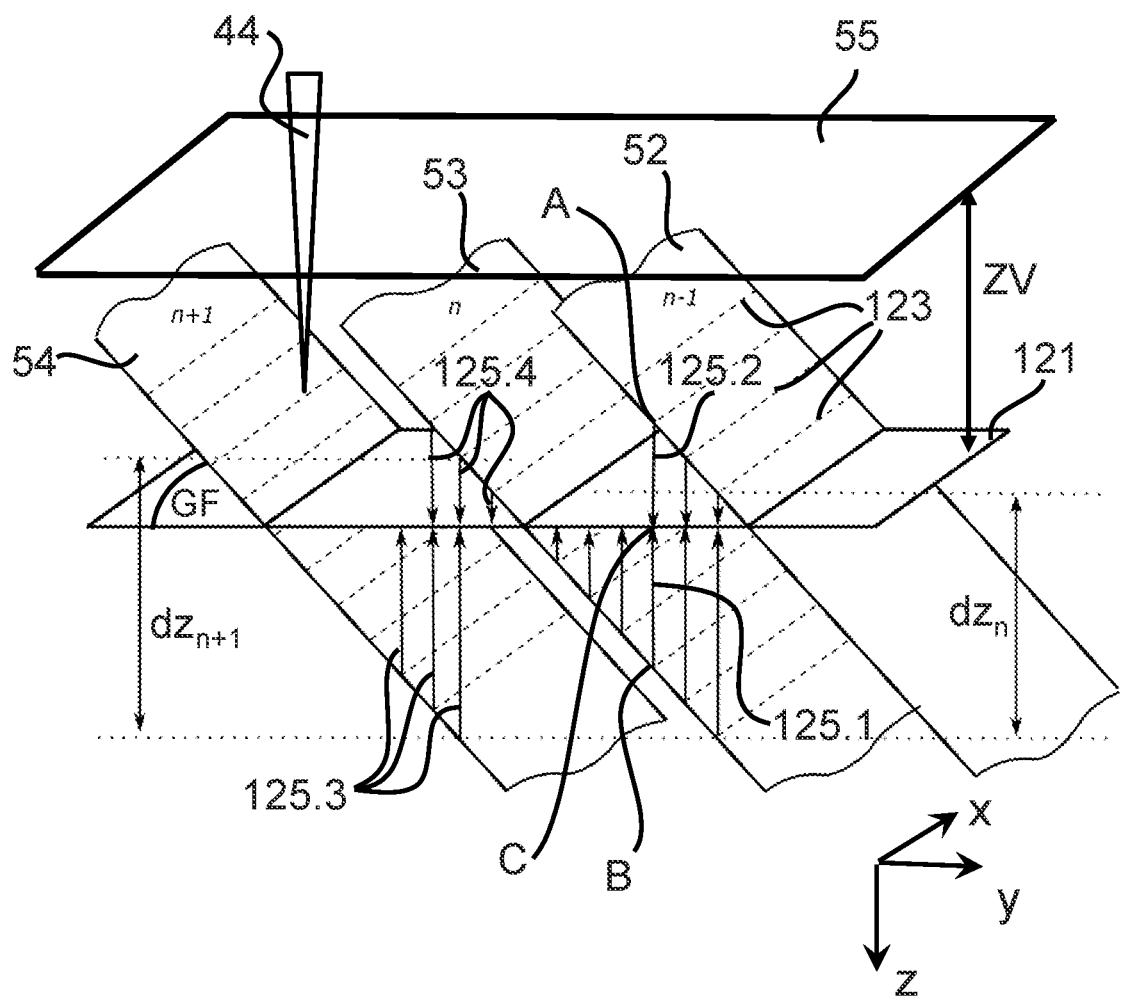
FIG. 16 illustrates an interpolation of a virtual image slice from a sequence of cross-section image slices.

In some embodiments, the 3D volume image data is generated from the sequence of N cross-section image slices by resampling or interpolation of the cross-section image slices from the slanted cross-section surfaces to a regular raster. With the interpolation method described below, interpolation artefacts for 3D volume image generation from the sequence of N cross-section image slices are reduced. The 3D volume image data generation comprises a method of obtaining at least a 2D virtual cross-section image from a set of cross-section image slices. The integrated semiconductor elements of a semiconductor device typically have a predetermined shape and orientation. They are typically arranged in layers parallel to the wafer surface or are extending perpendicular to the wafer surface. Examples of such elements are memory channels or HAR structures and layers with metal lines as described above and illustrated in FIG. 3. In the proposed method for fast 3D inspection, virtual cross-section image slices are generated in planes orthogonal to the direction of the semiconductor features of interest. An example is illustrated in FIG. 16. FIG. 16 show three representative cross-section surfaces 52, 53, 54 formed sequentially by FIB milling approximately at glancing angle GF inside an inspection volume (not shown) below the wafer surface 55. From each of the cross-section surfaces 52, 53 and 54, cross-section image slices with index n−1, n and n+1 are generated by imaging charged particle microscope, for example scanning electron microscope beam 44 or a HIM. The cross-section surfaces are milled by ion beam (not shown) under angle GF with relative distances dz in z-direction, and the z-distance is controlled for example by lateral movement of the wafer stage (not shown), or a scanning offset of the FIB in z-direction as described above in conjunction with the fan-shaped tomography approach (see FIG. 10). In this example illustrated in FIG. 16, a first distance $dz_n$ in z-direction between a first cross-section surface 52 and a second cross-section surface 53 is different from a second distance $dz_{n+1}$ in z-direction between the second cross-section surface 53 and a third cross-section surface 54. The distances dz are in a range of several nm, for example 5 nm, 6 nm, or even more, for example 10 nm. For example, $dz_n$ is about 6 nm and $dz_{n+1}$ is about 7 nm. Each cross-section image is scanned with a lateral pixel raster in x-y-plane with a pixel raster of about 2 nm, 1 nm or even less, for example 0.5 nm. The projection lines of the pixel raster in y-direction on the cross-section surfaces 52, 53 and 54 is illustrated by dashed lines 123 (index 123 shown for surface 52 only), extending in x-direction. An example of a virtual cross-section image slices 121 perpendicular to the z-axis is illustrated. The virtual image slice 121 is parallel to the wafer surface 55 at depth ZV. The pixel value at point C in the virtual cross-section image slice 121 is obtained by projecting the pixel value of an adjacent cross-section image slices in direction of the structures of interest. In this example, the structures of interest are the HAR structures oriented perpendicular to the wafer surface. The projection or interpolation direction is thus parallel to the z-axis. Several examples of interpolation directions are illustrated by arrows 125.1, 125.2, 125.3 and 125.4. In an example, the closest distance of a point C in the virtual image slice to the adjacent cross-section image surfaces is determined in projection or interpolation direction. In this example, the first cross-section surface 52 is closest to point C, and the pixel value at pixel position C of the virtual cross-section image slice 121 is selected to be identical to the pixel value at pixel A of the first cross-section image slice of the first cross-section surface 52. The pixel A of the cross-section image n−1 of the first cross-section image plane 52 and the pixel C of the virtual cross-section image slice 121 have identical x- and y-coordinates, and the distance AC in z-direction is the minimum distance of all distances in z-direction between virtual image slice 121 and each of the plurality of cross-section surfaces including cross-section surfaces 52, 53, 54.

In another example, the pixel value at pixel C of virtual cross-section image slice 121 is interpolated from the two next cross-section surfaces, here the first cross-section surface 52 and the second cross-section surface 53. The first pixel value A of the first cross-section image slice with index n−1 and the second pixel value B of the second cross-section image slice with index n are at same absolute lateral coordinates of the first and second cross-section surfaces 52 and 53 are used to compute pixel value at pixel C in the virtual cross-section image slice. The interpolation can be for example a linear interpolation, or a weighted interpolation, and a probability of a pixel value at pixel C is computed. Since it is expected that pixel value at pixel C is typically a binary result being either the pixel value of first pixel A or second pixel B, representing a measurement result of a specific material, the interpolation can be combined with a thresholding operation.

In an example, more than two pixel-values of the more than two cross-section image slices of the corresponding adjacent cross-section surfaces can be used for interpolation, for example by higher order polynomial interpolation. In the example, the pixel size on the virtual cross-section image slice 121 is selected to be equal to the pixel size of the cross-section images slices n−1, n and n+1 obtained from the plurality of cross-section surfaces 52, 53, 54. For example, the scanning of the third cross-section surface 54 by imaging charged particle microscope 44, for example electron beam 44, is adjusted in y direction accordingly, such that the third cross-section image slice with label n+1 is generated with respect to a common lateral coordinate system with identical absolute pixel coordinates with first and second cross-section image slices with labels n−1 and n. In an alternative example, the lateral pixel raster of at least one of the plurality of cross-section image slices is digitally adjusted and resampled such that the virtual cross-section 121 is achieved from at least two cross-section image slices by projection or interpolation along the z-direction. In an alternative example, the projection or interpolation direction between a first pixel location A on a first cross-section surface and a second pixel location B on a second cross-section surface is inclined to the projection direction (here the z-direction) and the pixel value at pixel location C of the virtual image slice is interpolated accordingly.

With the method of computation of at least a virtual cross-section image slice by interpolation in a predetermined projection direction, for example the z-direction perpendicular to the wafer surface 55 and parallel to the orientation of a first set of semiconductor features, interpolation artefacts are reduced, and the virtual cross-section image is a precise representation of a cross-section through the first set of semiconductor features. The method of interpolation in a projection direction parallel to the orientation of the first semiconductor features is especially interesting for the analysis of HAR structures in a wafer, where it is not possible to obtain a cross-section image perpendicular through the plurality of HAR structures by FIB milling.

For each virtual cross-section image pixel, the subset of the at least one cross-section image slice is determined by computing the distance of each of the sequence of N cross-section image slices to the virtual cross-section image pixel in the first orientation direction and selecting at least a first cross-section image slice with minimum distance. In an example, a second cross-section image slice of the subset of the at least one cross-section image slice is selected accordingly as the cross-section image slice with a second minimum distance. Further cross-section image slices of the subset of the at least one cross-section image slice can be selected accordingly in sequence of increasing distances to the virtual cross-section image pixel in the first orientation direction.

In an example, a depth map ZV(x,y) for each virtual cross-section image is generated. The depth map is generated by geometrical construction such that a virtual cross-section image is oriented perpendicular to the first orientation direction. For each of the pixel values of a virtual cross-section image, the subset of at least one cross-section image slice is selected by evaluating the distance Zrv(n)=Z(x,y;n)−ZV(x,y) and by determining the slice indices m with minimum value for with distance Zrv(m). Second and further cross-section image slices of the subset of the at least one cross-section image slice can be selected accordingly in sequence of increasing distances Zry(n) to the virtual cross-section image pixel in the Z-direction.

In an example of the method of obtaining at least a 2D virtual cross-section image, the first orientation direction is the z-direction perpendicular to the wafer surface and a virtual cross-section image slice is computed at a plane parallel to the wafer surface at a constant depth ZV below a wafer surface. For each virtual cross-section image pixel with lateral coordinate (x,y), the subset of the at least one $m^{th}$ cross-section image slices is determined by selecting at least one cross-section image slice with minimum distance to the plane at depth ZV, such that distance Zrv(m)=Z(x,y;m)−ZV is the minimum value of all depth maps Z(x,y;n) with index n=1 . . . N. Second and further cross-section image slices of the subset of the at least one cross-section image slice can be selected accordingly in sequence of increasing distances Zry(n) to the virtual cross-section image pixel in the Z-direction.

In an example, a depth map ZV(x,y) for each virtual cross-section image is generated. The depth map is generated by geometrical construction such that a virtual cross-section image is oriented perpendicular to the first orientation direction. For each of the pixel values of a virtual cross-section image, the subset of at least one cross-section image slice is selected by evaluating the distance Zrv(n)=Z(x,y;n)−ZV(x,y) and by determining the slice indices m with minimum value for with distance Zrv(m). Second and further cross-section image slices of the subset of the at least one cross-section image slice can be selected accordingly in sequence of increasing distances Zry(n) to the virtual cross-section image pixel in the Z-direction.

In an example, the pixel value of the virtual cross-section image is interpolated from the subset of at least one cross-section image slice in the first orientation direction by geometrical projection. The angle ω between the virtual cross-section and the corresponding to a multiplication of the $m^{th}$ cross-section image slice is determined, and a projected lateral coordinate in the plane of the $m^{th}$ cross-section image slice is computed from the pixel coordinate of the virtual image slice by division by cos(ω). Next, the pixel value of the pixel of the virtual image slice is computed by interpolation from the adjacent pixel values of the $m^{th}$ cross-section image slice to the projected lateral coordinate.

In an example, the optical axis of a charged particle imaging system for acquiring the sequence of N cross-section image slices is oriented perpendicular to the wafer surface, such that an angle GE=0° for the angle GE between the optical axis and the z-axis normal to the wafer surface. In this example, the lateral coordinates (x,y) of the at least one virtual cross-section image and the lateral coordinates of the sequence of N cross-section image slices can be identical, and the angle ω is approximately equal to the angle GF. This example is illustrated in FIG. 16. The method of obtaining at least a 2D virtual cross-section image can comprise the step of forming at least one alignment feature in the proximity of the inspection volume configured for forming the at least one common cross-section image feature for mutual lateral alignment of each of the cross-section image slices. The step of mutual lateral image alignment can include a subtraction of an image distortion deviation of each cross-section image slice.

In an example of the method of obtaining at least a 2D virtual cross-section image, the interpolation comprises at least one of a feature extraction, a thresholding operation, a contour interpolation or a model based interpolation. Thereby, an interpolation of the first semiconductor structures or features of interest with high precision is provided. The third cross-section image features, representing the first semiconductor structures of features oriented in the first orientation direction in the virtual cross-section image are interpolated from first cross-section image features from the subset of at least one cross-section image slice with high precision and with reduced interpolation artefacts.

With the method of obtaining at least a 2D virtual cross-section image or a set of 2D virtual cross-section images, a virtual cross-section image is computed from the set of N cross-section image slices at an arbitrary depth ZV inside the inspection volume, for example, the depth ZV is selected according to the depth of layers parallel to the wafer surface, wherein the layers are formed by second semiconductor features oriented in a second orientation direction parallel to the wafer surface. For example, a first virtual cross-section image slice is computed at a depth ZV1 between two adjacent equivalent layers such as word-lines, for example layer L2 and layer L3 of FIG. 5, and a second virtual cross-section image slice is computed at a depth ZV2 inside a layer or word-line, for example layer L4 of FIG. 5.

The depth map Z(x,y;n) of each of the cross-section image slices with index n=1 . . . N is computed from second cross-section image features in cross-section image slices, the second cross-section image features representing cross-section images through the second semiconductor features oriented in the second orientation direction parallel to the wafer surface. The method of projection or interpolation relies on the actual depth information of respective pixels of the plurality of cross-section image slices. The depth information or depth map Z(x,y; n) for each pixel of a cross-section image slice of index n is derived by the methods described in the embodiments and examples above. In the example of the analysis of HAR structures, the depth Z(x,y;n) of each pixel location in a first cross-section image corresponding to the HAR structures is derived from second cross-section image features, representing structures elongated parallel to the wafer surface, such as the plurality of layers or word-lines of 3D-memory devices, as described above.

A set of virtual images slices such as slice 121 provide a reliable representation of the cross-section images of the explored semiconductor structures or features such as HAR structures and are available for statistical analysis or defect analysis. In an example of the method of obtaining a set of 2D virtual cross-section images, a faster data acquisition is achieved and the distance dz in z-direction or the distance d perpendicular to the individual cross-section image slices is selected to be substantially larger than the pixel size of the corresponding cross-section images. The pixel size is typically below 2 nm, for example 1 nm or 0.5 nm or even 0.25 nm. For fast data acquisition, the slice distance dz perpendicular to the wafer surface is selected and adjusted to be more than 6 nm, for example 8 nm, 10 nm or even more. With the selection of the slice thickness or distance dz to be significantly larger than the image pixel size, the number of milling operations with FIB is significantly reduces and a fast 3D image acquisition of the inspection volume inside the wafer is achieved. The dimension of the voxels of the 3D volume data have substantially different extension along different axes, and the pixel size or resolution in lateral direction is different to the pixel size or resolution in depth. By this method, a plurality virtual cross-section image slices with a predefined distance in z-direction adapted to the lateral pixel spacing in x- and y-direction is achieved and isotropic 3D voxels of a 3D volume image of the inspection volume is generated. Since the interpolation is performed in the first direction of the semiconductor features of interest, such as the HAR structures, and optionally combined with a thresholding operation or other methods of contour interpolation, artefacts of the interpolation are reduced. With the method described, first cross-section images of semiconductor elements in virtual image slices are computed from the first cross-section images of a subset of the plurality of cross-section image slices with distance in depth or z, which is large compared to the lateral pixel spacing.

In an example, a predetermined set of virtual cross-section images such as virtual cross-section image 121 comprising the first cross-section images of HAR structures is derived in a reduced subset of planes orthogonal to the direction of the HAR structure. The virtual cross-section images slices are computed for a small number of z-planes parallel to the wafer surface, for example at z-spacings dz larger than the lateral pixel raster of for example 1 nm. In an example, the z-spacing of the number of virtual cross-section images is selected according the number of layers parallel to the wafer surface, and the processing time for computation is significantly reduced. The distance in z-direction between the reduced set of virtual cross-section surfaces is thus selected for example between 5 nm and 50 nm, for example 10 nm or 25 nm. In an example, the distance in z-direction can be variable and depending on the depth of layers running parallel to the wafer surface.

In an example of method of obtaining a set of 2D virtual cross-section images a plurality of N cross-section image slices is generated by scanning with the imaging charged particle microscope a plurality of N cross-section surfaces, and a set of F virtual cross-section images slices is computed, with F<N. In an example, the maximum number of layers of the semiconductor memory stack is M (see FIG. 3), and F is select to be equivalent with M, such that a virtual cross-section image slice is generated within each layer. In another example F is select to be equivalent with the number of word lines, such that a virtual cross-section image slice is generated within each word line layer and every isolation layer in between. In each example, the lateral pixel number by far exceeds the number N of cross-section image slices, the number F of virtual cross-section image slices.

With a high precision milling including a subsequent polishing of the plurality of cross-section surfaces by the FIB, a plurality of accurately planar cross-section surfaces is generated. The precision milling including polishing, however, is a time-consuming effort. In a high throughput application such as wafer inspection, higher speed of the 3D volume image acquisition of an inspection volume inside a wafer is desired. In some embodiments, if a fast milling operation is applied. After fast milling, the surface shape of each individual cross-section surface might deviate from a perfect planar surface due to the milling artefacts, for example introduced by the divergency of the FIB, imperfect FIB control or due to effects of the interaction between the FIB and the milled material inside the inspection volume. An example of such an effect is the well-known curtaining effect. A modification of the interpolation method described for generating virtual slices is illustrated in FIG. 17. The pixel value in the point C in the virtual slice 121 is obtained by an interpolation of the pixel values of pixels at points A or/and B of the cross-section image slices, which are obtained from curved cross-section surfaces 52, 53 and 54, wherein the z-coordinates of pixels Z(x,y; n) of the nth cross-section image slice are derived with the methods of the disclosure described above. The depth or z-coordinate of an image pixel of a first cross-section image representing for example a HAR structure is derived from the known depth or relative to an image pixel of a second cross-section image representing for example a word line oriented perpendicular to the HAR structure. In an example, a method of obtaining a virtual cross-section image or a sequence of virtual cross-section images, each virtual image slice comprising a plurality of virtual cross-section image pixels, from a set of cross-section image slices, comprising the step of obtaining a sequence of N cross-section image slices by alternately imaging and milling into an inspection volume inside a wafer at a slant angle GF a sequence of N cross-section surfaces, whereby for each virtual cross-section image pixel a pixel value is computed by a projection of a subset of at least one cross-section image slice of the sequence of N cross-section image slices in a first orientation direction and by an interpolation of the pixel value from the projection of the subset of at least one cross-section image slice. The number N of cross-section images slices is at least N=10 (e.g., N>100, N is about 1000 or more).

In the embodiments described above, the desired properties of the inspection task of an inspection volume with high resolution below 1 nm and large depth extension LZ in a wafer are achieved by a slice-and-image method under a wedge cut geometry with angles GF of more than 30°. As described above in conjunction with FIG. 8, with a SEM a large series of images with different focus position is obtained for a desired high-resolution. As illustrated in conjunction with FIG. 12, the examples of the embodiments utilizing a SEM for imaging further can involve image processing such as stitching and distortion compensation. In another example, the optical axis of the SEM is adjusted with the angle GE such that the angle GFE between SEM and FIB is approximately 90° (see FIGS. 2 and 4B). In the embodiments and example with a SEM, however, the image acquisition and the lateral alignment of the plurality of N cross section image slices of inspection volumes with large depth extension exceeding for example 1 µm can be time consuming and involves additional time for focus adjustment and image processing. Furthermore, the accuracy is reduced. In some embodiments, the charge particle imaging device is a Helium ion microscope (HIM) with a depth of focus of up to 10 µm. The depth of focus of a high-resolution SEM is about DOF~10-20 nm. Generally, the DoF of a charged particle imaging microscope is limited by the desired resolution. With a HIM, a resolution of below 1 nm is maintained at large depths of field of above 6 µm and reaches 10 µm or more. The HIM provides the further advantage that imaging is dominated by secondary electrons and less dominated by backscattered charged particles. The imaging contrast is therefore less susceptible to topography effects. Furthermore, with Helium ions, any charging of a wafer is always positive and contrast variations due to charging effects of a wafer surface are minimized.

Figure 18A:
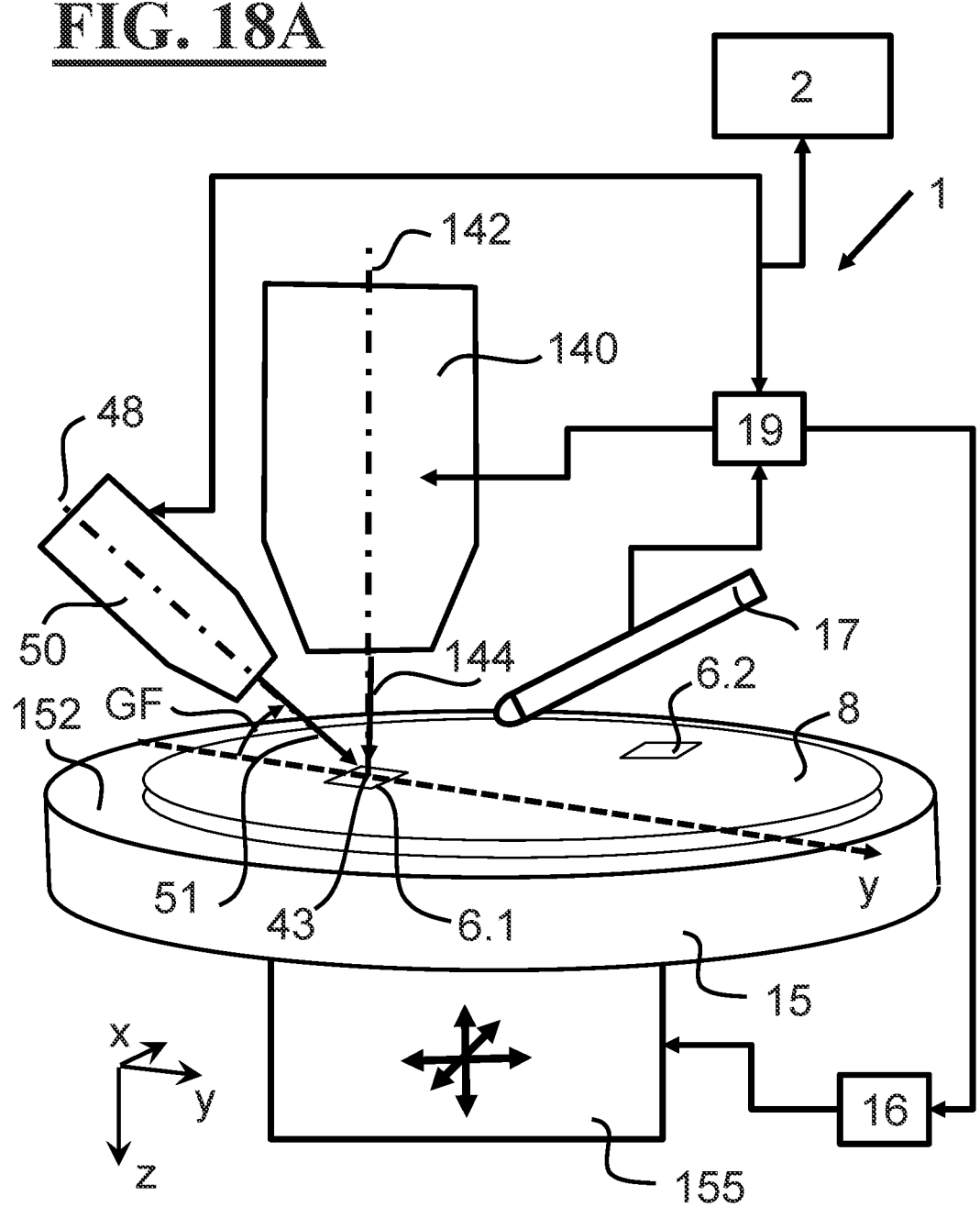
FIGS. 18A-18B illustrate a dual beam device using a helium ion microscope.
Figure 18B:
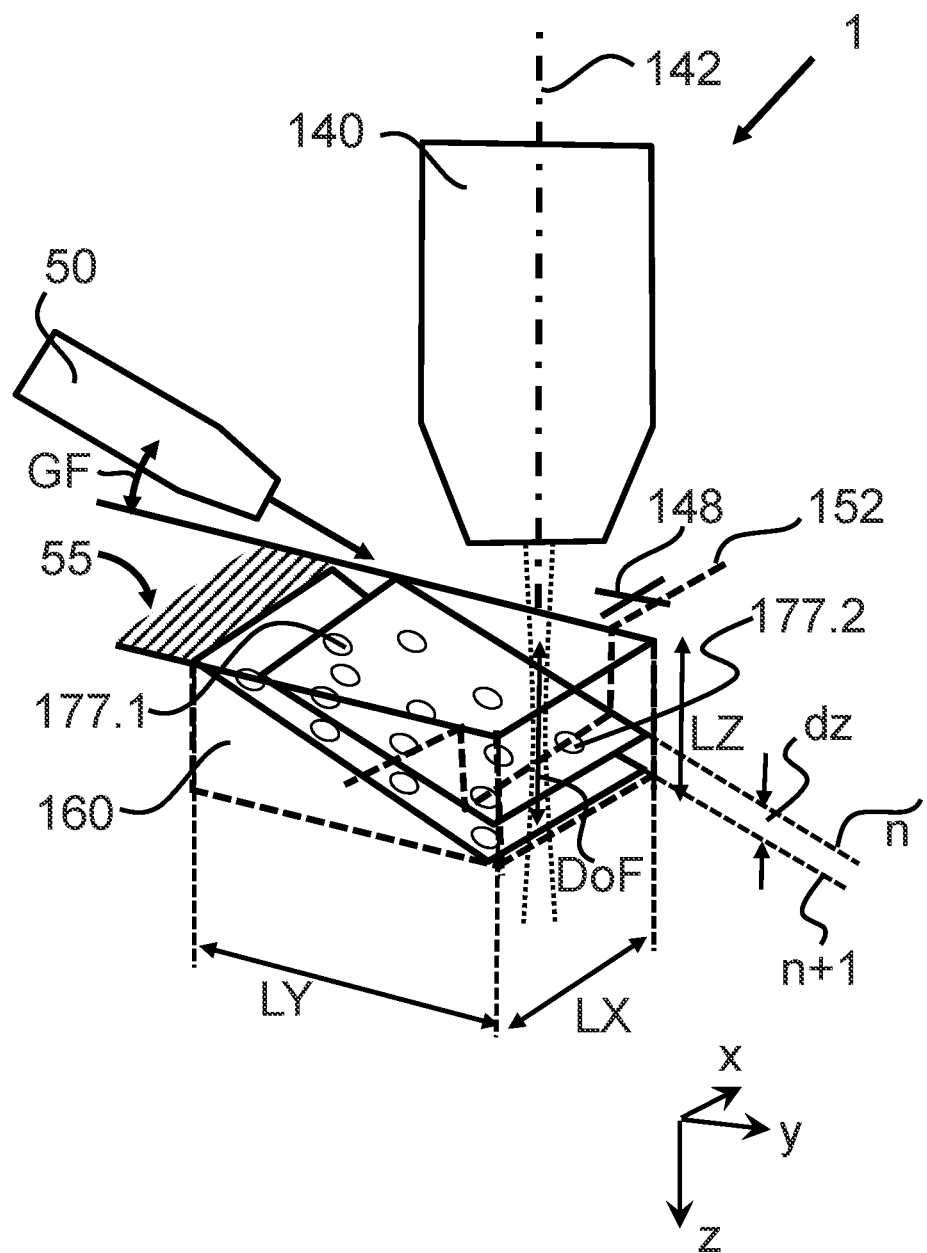

The dual beam device 1 with a HIM according to FIGS. 18A-18B therefore provides an embodiment for inspection volumes with large depth extension. A wafer inspection apparatus and a method for three-dimensional circuit pattern inspection of inspection volumes inside wafers without removal of samples from the wafer is provided, which is configured and applicable to thick or deep stacks of layers, for example with a depth extension or height of about more than 6 µm, for example 10 µm or 15 µm, below the surface of a processed semiconductor wafer. With the slice- and image approach in wedge-cut geometry, as described above, a destruction of the wafer or a removal of the inspection volume is avoided. In some embodiments, with a slant angle GF of the FIB column for milling into the wafer surface 55 of 20° (e.g., above 30°, above 35°), a lateral extension of a cross section surface below 25 μm, for example a lateral dimension LY of about 20 μm or below is achieved, and the image acquisition is performed without image stitching in a very fast and efficient manner. The challenges of the wafer inspection task are the desired high resolution, for example 2 nm, 1 nm or 0.5 nm or even below 0.5 nm, and the desired range of depths within the wafer up to 15 μm underneath the wafer top surface 55. In some embodiments, the high resolution and the desired depth of focus of a charged particle imaging beam is achieved by using a Helium-Ion microscope (HIM). The Helium Ion microscope provides the desired resolution of about 1 nm or below at the desired large depth of focus and allows an image acquisition of each of the cross-section surfaces under wedge cut geometry with desired resolution in a single image. With a "single image scan" it is meant an image acquisition scan without a change of focal plane or a challenging focus control over a large depth range or image stitching. During a single image scan, a wafer is not moved, and the focus plane of a charged particle imaging beam is not changed.

With a dual-beam apparatus for wafer inspection using a HIM, high resolution and high throughput 3D-volume inspection of inspections volumes is provided, especially of deep inspection volumes with depths larger than 100 nm and resolutions of below 1 nm, for example of depths LZ larger than 1 μm. In an example, inspection of a memory device with HAR structures extending about 6 μm in depth below a wafer top surface are provided without destruction of the wafer or removal of the inspection volume from the wafer. The HIM in the specific arrangement of the dual beam device is providing high-resolution imaging of a plurality of N cross section surfaces with depths ranges exceeding 5 μm, for example 6 μm, and generation of a plurality of N cross section image slices with resolution below 1 nm.

With the alternating slicing of the plurality of cross section surfaces with the Ga-FIB 50 approximately at 360 and imaging with the HIM, slicing and imaging is achieved down to the bottom of the HAR channels of a memory device. Details are explained in FIG. 18A and FIG. 18B. Both figures illustrate different aspects of a dual beam device 1 for inspection of deep volumes in a wafer. A Helium Ion Microscope (HIM) 140 with optical axis 142 is arranged perpendicular to a wafer support table (see FIG. 18B), which hold a wafer with wafer top surface 55 perpendicular to the optical axis 142 of the HIM 140. A Gallium-FIB column 50 is oriented at a slant angle GF of about 36° to the wafer top surface 55. A first and a second cross section surface of a plurality of N cross section surfaces are indicated with index n and (n+1) within the inspection volume of lateral extension LX times LY times LZ of about 10 μm×10 μm×6 μm. The cross-section surfaces show cross section features, in this example first cross section features of HAR structures oriented perpendicular to the wafer top surface 55. A first HAR cross section 177.1 is close to the wafer surface 55 with small depth, and a second HAR cross section 177.2 is at large depth, for example at depth LZ of about 6 μm or more. Both surface details are within the depth of field or depth of focus (DoF) of the HIM 140 of about 10 μm or more. Due to the slant angle of 36°, the lateral extension of a cross section surface LY is only about 10 μm for a depth LZ of 6 μm. In another example, a lateral extension of LY=20 μm is obtained for a depth of LZ=15 μm. For such deep structures of LZ of about LZ=15 μm, a lateral image extension of for example 15 μm is possible with a larger slant angle of for example 45°. The slicing distance dz is for example about 10 nm or selected according to the desired sampling properties, and a smaller slicing distance can be selected for large slant angles. In each case, it is possible to acquire each cross-section image surfaces with a single image scan with the HIM, without change of focus and without the need of distortion compensation or image stitching.

For alignment of the plurality of N cross section image slices, alignment marks such as alignment mark 148 are provided in the wafer top surface 55. Alignment marks on the top surface 55 of the wafer and the slanted cross section surfaces are both well within the DOF of the HIM, and the plurality of N cross section image slices can be aligned in lateral direction with high precision. For example, the second HAR cross section 177.2 at large depth and the alignment feature 148 on the surface 55 of the wafer are both crossed by a fast scanning line 152 of the HIM 140 and are both within the depth of focus or depth of field (DoF) of the HIM 140. It is a unique advantage of the large depth of field of a HIM 140 that it is possible to image structures or features at different depths within a depth range of exceedingly more than 1 μm, for example 2 μm, 5 μm or even 10 μm, together with alignment features or fiducials 148 fabricated on top of the wafer surface 55.

The Dual Beam device 1 (see FIG. 18A) for inspection of an inspection volume at an inspection site of a wafer in a wedge cut geometry comprises a six axis wafer stage 155 with a wafer support table 15 configured for holding a wafer with a wafer surface 55 on a support surface 152 of the wafer support table 15, a FIB column 50 arranged under an angle GF to the support surface 152 of wafer support table 15, a Helium ion microscope (HIM) 140 with an optical axis 142 arranged perpendicular to the support surface 152, the optical axis of the FIB column 50 and the HIM 140 forming an intersection point 43, and a stage control unit 16, configured to position during use a first measurement site 6.1 of a wafer 8 at the intersection point 43, an control unit 19 for controlling the FIB column 50 and the HIM 140, configured for alternatingly milling a plurality of N cross section surfaces in an inspection volume with the FIB beam 51 approximately at the angle GF and imaging each cross section surface by the HIM beam 144 to form a plurality N of cross section image slices of high resolution with resolution better than 2 nm, such as better than 1 nm, whereby the inspection volume has a depth extension LZ in direction of the optical axis 142 of the HIM 140 of more than 1 μm, for example 3 μm. In an example, depth extension LZ in direction of the optical axis 142 of the HIM 140 exceeds 5 μm, for example 6 μm or even 10 μm. The imaging of each cross-section surface to form a plurality N of cross section image slices of high resolution is achieved by the HIM beam 144 with a depth of focus (DOF) exceeding the depth extension LZ. Control unit 19 is configured to scan during use the HIM beam 144 over an area exceeding the lateral size LX or LY of the inspection volume of about at least 5 μm to 10 μm (LX or LY) and collecting in a time sequential manner a plurality of secondary electrons with secondary electron detector 17.

In an example, the angle GF formed between the FIB beam 51 and the support surface 152 of the wafer support table 15 is between 30° and 60°, for example 36° or 45°. In an example, the Dual Beam device 1 further comprises an operation unit 2 configured to mutually align the plurality of N cross-section image slices with at least one common cross section image feature. In an example, the control unit 19 is further configured to produce during use on a wafer surface 55 at least an alignment mark 148, forming the at least one common cross section image feature for mutual alignment of the plurality of N cross-section image slices. In an example, the operation unit 2 further comprises an image processing unit 82 (see FIG. 15) for computing during use at least a virtual cross section image slice in a plane parallel to a wafer surface 55 of the inspection volume.

With the large depth of focus and the telecentric configuration of a HIM 140, the cross-section image slices are imaged with high accuracy and free of distortion without the need of changing the focal plane of the charged particle imaging microscope. 3D information of an inspection volume inside a wafer is obtained with large depth extensions of LZ exceeding 1 µm, for example 6 µm or even up to 10 µm with an efficient and fast workflow. For example for memory devices with a plurality of HAR structures, virtual image slices can be generated in every alternating layer, such as the layers of word lines and the isolating layers between the word lines. Since the cross-section images are obtained from the slanted cross section surfaces with the HIM perpendicular to the wafer surface or parallel to the HAR structures, image processing time is reduced, and interpolation artefacts are minimized. Optional alignment structures 148, formed on the surface 55 of the wafer, are well within the depth of focus of the HIM and can be utilized for mutual alignment of the cross-section image slices.

Figure 19A:
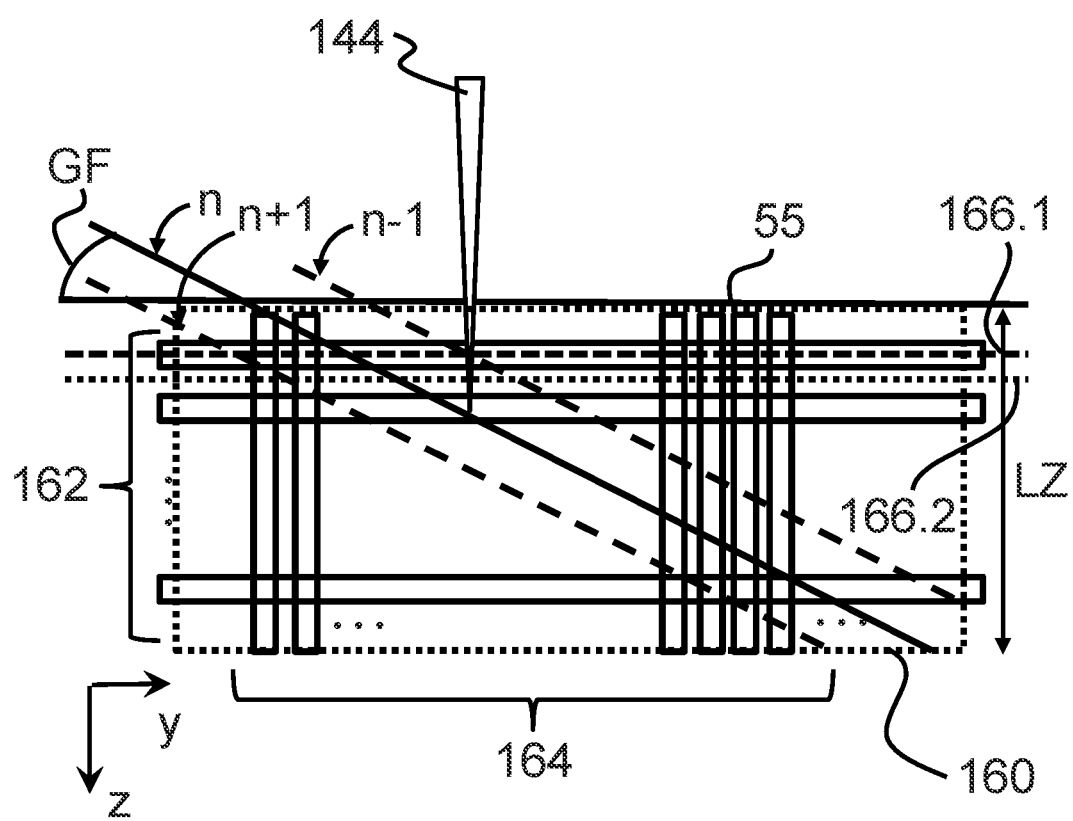
FIGS. 19A-19D illustrate a slice and imaging approach using a dual beam device according to FIGS. 18A-18B, and the result of a single scan image acquisition and virtual cross section image computation in alternating layers of a memory device.
Figure 19B:
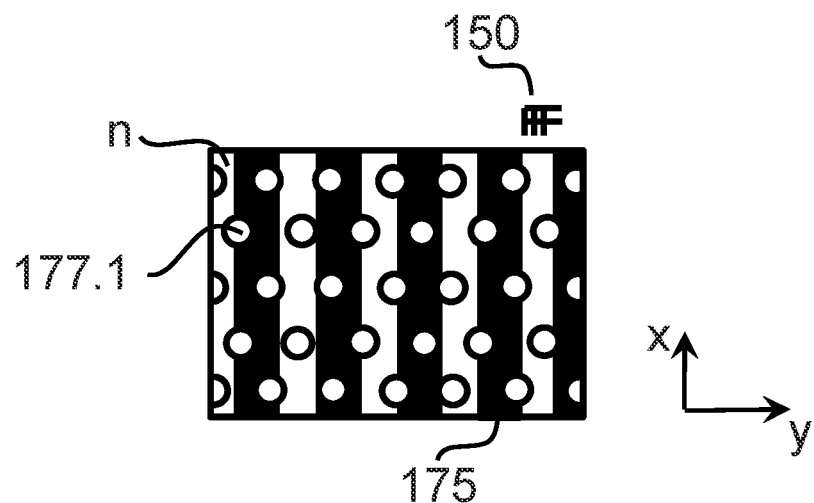
Figure 19C:
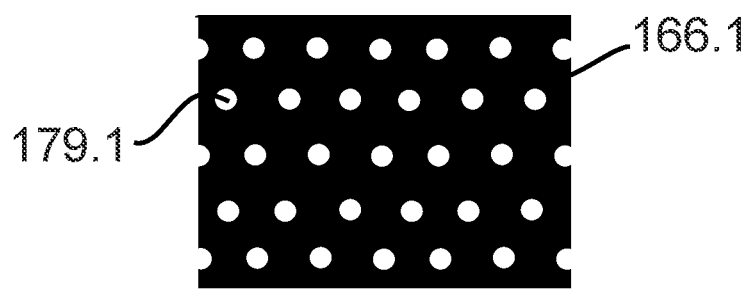
Figure 19D:
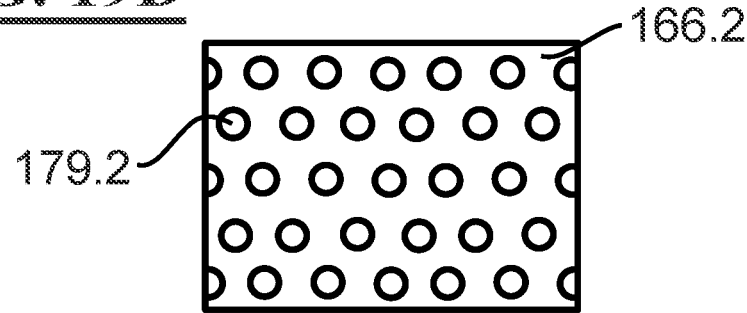

FIGS. 19A-19D illustrate some aspects for inspection volumes of large depth extension LZ. An Inspection volume 160 has a large z-extension LZ between 2 µm to 10 µm. In the inspection volume of the memory device, a plurality of alternating layers 162 is arranged parallel to a wafer surface 55. Orthogonal to the wafer surface 55 is arranged a plurality of HAR structures. In the inspection volume 160, a plurality of N cross section surfaces is formed. Illustrated are cross section surfaces with index (n−1), n and (n+1). Each cross-section surface is milled into the inspection volume approximately at slant angle GF between 30° and 60°, for example 36°. The distance between successive cross section surfaces is selected below 12 nm. By control of the slice distance, for example by smaller distance and a large slice number, accuracy of the 3D volume image acquisition can be further improved, and image processing errors are reduced. Alternating to the milling, each cross-section surface is imaged by HIM 144 and a plurality of N cross sections images slices is formed, for example cross section image slice with index n in FIG. 19B. The cross-section image slice comprise a plurality of cross section features of HAR structures, such as indicated by 177.1, and cross section features of the plurality of layers, such as conductive layer cross section 175. Each of the plurality of N cross section images slices comprises and image detail 150 representing the additional alignment feature 148 and each of the plurality of N cross section images slices is laterally aligned with the image detail 150 representing the additional alignment feature 148, which is not amended by milling of subsequent cross section image surfaces. Virtual cross sections are computed in a first, conductive layer or word-line, forming virtual cross section image 166.1, and in a second, isolating layer, forming virtual cross section image 166.2. Thereby, a plurality of virtual cross section is computed (FIGS. 19C and 19D).

Figure 20:
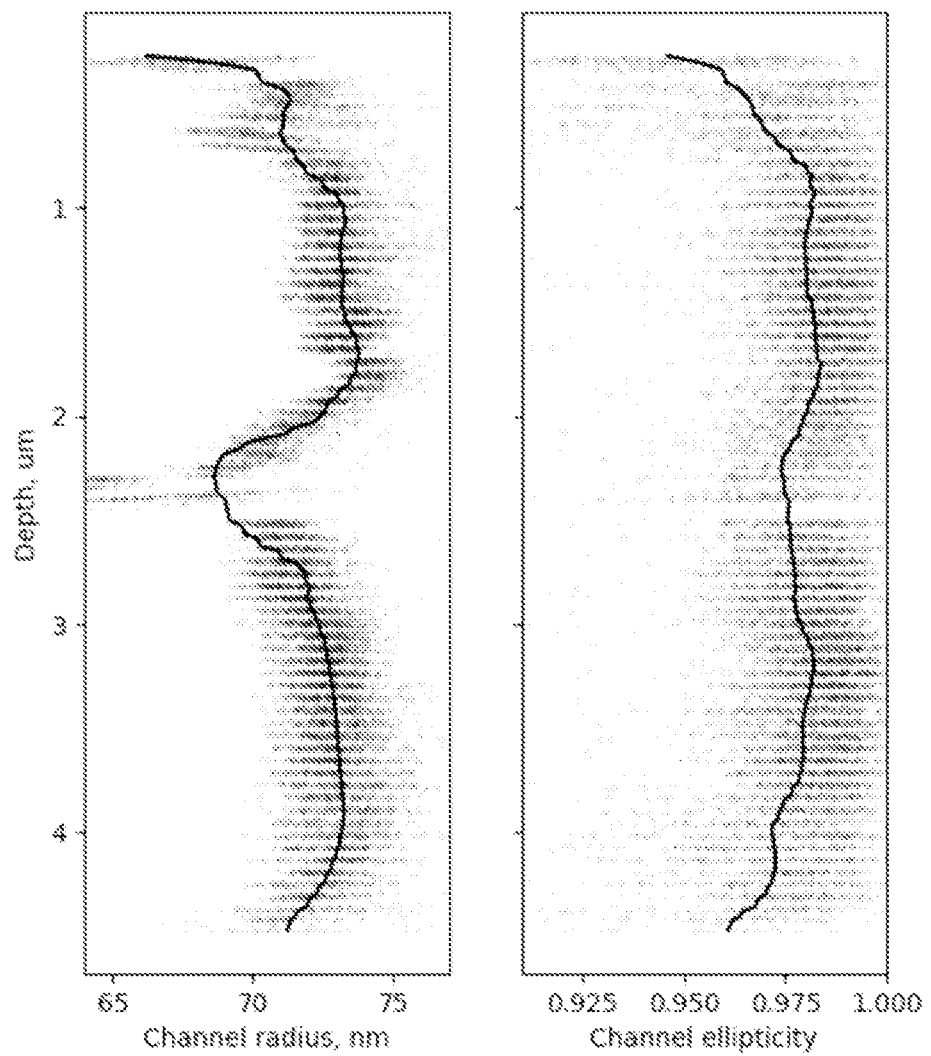
FIG. 20 illustrates statistical evaluations of a HAR features of a memory device.

Each of the plurality of cross section images or virtual cross sections is analysed by image processing and statistical features of the HAR structures are derived, as illustrated in FIG. 20. FIG. 20 shows two examples of the result of the analysis. On the left side, the distribution of the radius and the mean value of the radius of a plurality of HAR channels 164 over the depth range from 0 µm to 4.5 µm is shown. On the right side, the distribution of the ellipticity and the mean value of the ellipticity of a plurality of HAR channels 164 over the depth range from 0 µm to 4.5 µm is shown. Other parameters of the plurality of HAR channels 164 can be obtained and illustrated in analogous manner.

Figure 21:
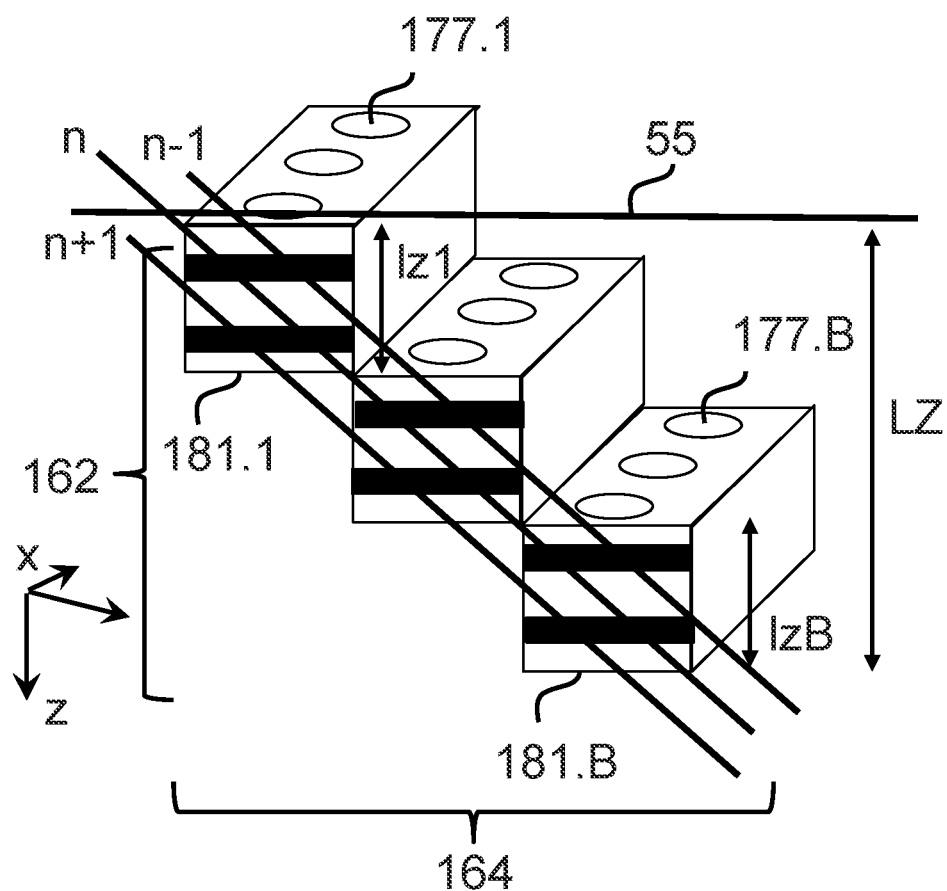
FIG. 21 illustrates a time efficient inspection method of a volume in wafer.

FIG. 21 illustrates an inspection of inspection volumes of large depth extension. The time for inspecting inspection volumes with large depth extension is reduced by separating the inspection volume in a plurality of B blocks 181.1, . . . 181.b, . . . 181.B. Three blocks are illustrated for sake of simplicity. The plurality of blocks 181 are arranged diagonal along a milling direction of the FIB beam. The plurality of cross section surfaces to be milled and image is therefore reduced to a lower number, and the time for inspection is reduced. In each block 181, a plurality of for example seventy HAR features 164 is analysed in a specific range of depths lz1 to lzB. The block size is adjusted in accordance with the milling angle GF of the cross-section surfaces, the HAR feature size and the number of HAR cross sections 177 used for statistical analysis in each depth range. A slicing distance d can therefore be below 30 nm. A plurality of virtual cross sections is computed in the different depth ranges in the plurality of layers 162. Thereby, the number of milling operations is reduced by more than a factor three and the operation time used for an inspection volume is reduced by more than a factor three. In an example, for memory devices comprising memory HAR structures, it is sufficient to provide at least three cross-section image slices per HAR structure.

Figure 22:
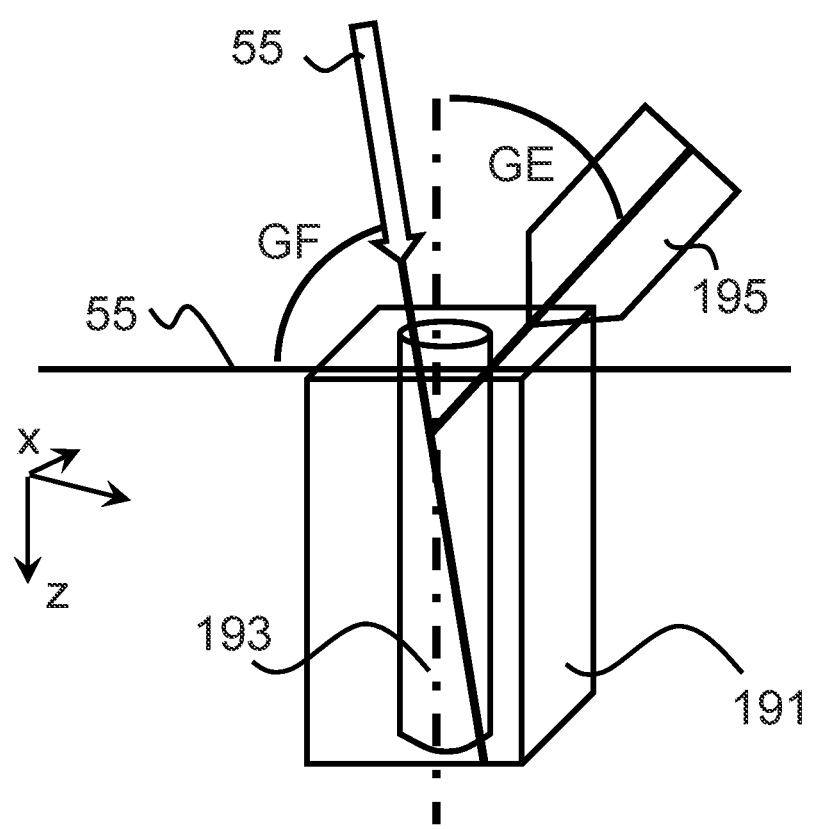
FIG. 22 illustrates an inspection of a deep inspection volume with a large milling angle GF.

FIG. 22 illustrates a dual beam device for inspection of a deep and small inspection volume 191 of large depth extension. In this example, the angle GF is selected at a large angle between 45° and 80°, for example a milling angle of about 76°, to slice a HAR feature of a memory device at a large angle DF through the entire depth range. The axis of the charged particle microscope 195 is arranged at an angle GE to the normal of the wafer surface 55, for example at an angle of 40° or more. In this example, the destruction of a wafer is minimized.

Figure 23:
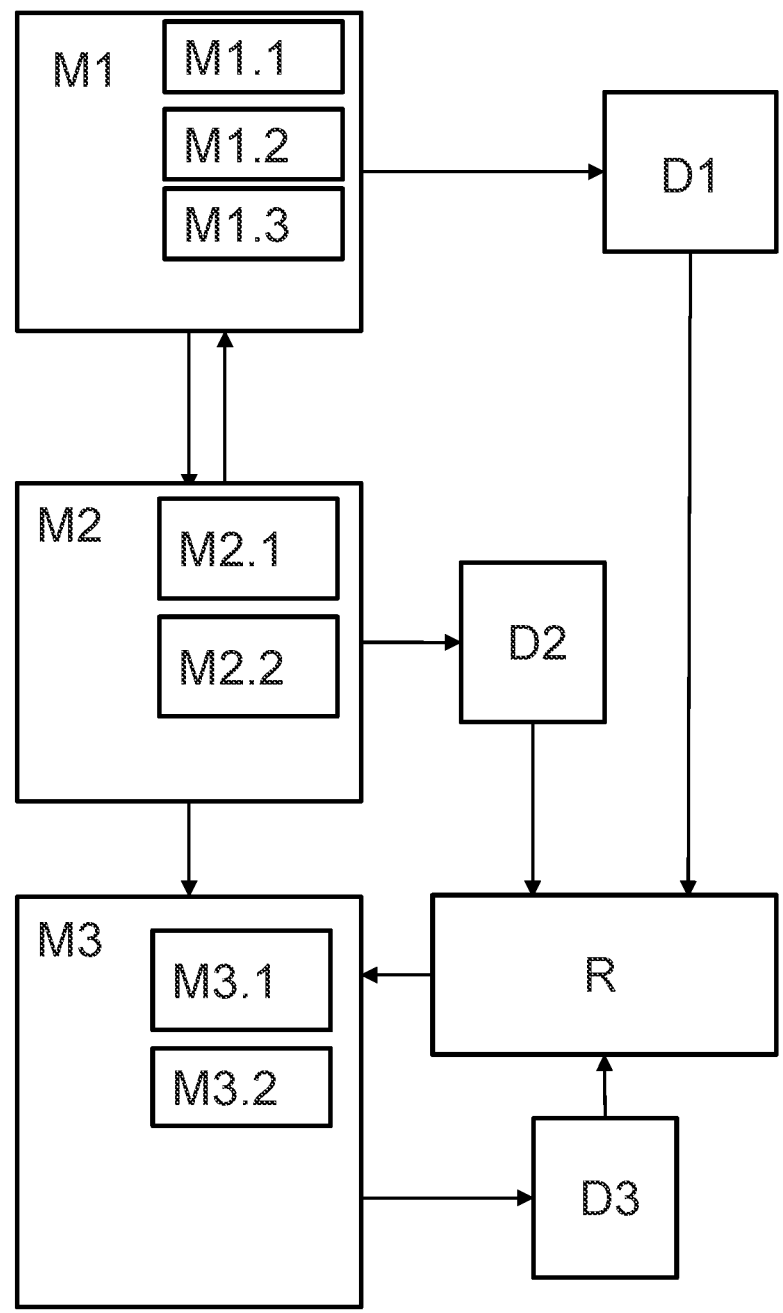
FIG. 23 illustrates a process flow for generation of a monitoring recipe for an inline wafer inspection.

Generally, a wafer inspection for monitoring and control of the high-volume manufacturing (HVM) of semiconductor features on or in semiconductor wafers involves a very high speed and high throughput. In some embodiments, the development of a monitoring recipe with a dual beam device according any of the other embodiments of the disclosure is described. See FIG. 23. The development of semiconductor devices follows roughly three phases M1 to M3. In the research and development (RnD) phase M1, a functional prototype of a new semiconductor device is developed. In step M1.1, the design of a semiconductor devices is developed. In step M1.2, functional demonstrators of the new semiconductor devices or new design features of the new semiconductor devices are fabricated, and their function is tested in step M1.3. During phase M1, new design features and new process steps are tested. 3D volume analysis of the demonstrators is performed for example according any of the embodiments described above, or with a method utilizing a sample lift-out as described in the prior art. Thereby a list of design parameters and design performance indicators D1 is determined and provided.

In phase M2, a ramp up of the fabrication processes is provided. During step M2.1, new manufacturing processes are developed, or existing manufacturing processes are improved. In step M2.2, comprehensive 3D analysis or 3D volume imaging is used, for example by any of the methods or apparatuses described in the embodiments above. For example, a new set of representative defect patterns is obtained, and a list of fabrication performance indicators D2 is generated from the representative defect patterns. If a fabrication during phase M2 can turn out to be important, the process can return to phase M1 and a design change can be performed.

In both phases M1 and M2, comprehensive 3D measurements are performed with the goal to understand the process and to identify possible defects in full depth. In step M2.2, a plurality of fabrication steps is monitored and a plurality of 3D measurements is be performed, and it is advantageous if the measurement time during step M2.2 is shorter than for example in step M1.3. A method of 3D inspection during phases M1 or M2 is the 3D volume image generation under wedge-cut geometry as described in one of the embodiments above. In the "wedge cut" approach, a 3D-memory stack is milled with a FIB at an angle to the wafer surface below 80° as illustrated FIG. 3. In the example of a memory device, the tilted cross section surface 52 of the trench contains both memory channels and word lines footprints. The cross-section surface is imaged "from top" using a vertical charged particle imaging beam (e.g., a Helium ion or electron-beam). A corresponding cross section image slice contains projections of the channel footprints at the respective depth (Z) on the XY-plane. In case of vertical memory channels of a cylindrical shape, the cross-section image slice contains circular footprints at various depths determined by the locations of the footprints on the sloped surface 52 of the trench, as for example illustrated in FIG. 6. The angle GF between the FIB beam 51 and the wafer surface (XY-plane) controls the depth range covered by the field of view of the imaging beam and the total lateral area available for the imaging. The "top-down" imaging of the sloped cross section surface involves a certain depth of focus (DoF) of the vertical beam. In case of insufficient DoF, the FoV might be split into smaller sub-fields and imaged sequentially with progressive focus adjustments, as explained with reference to FIG. 8. Alternatively, a HIM described with respect to FIGS. 18A-18B can be employed. From the measurements, a plurality of performance parameters and a statistical analysis can be performed, for example virtual cross section image slices can be generated, and evaluations can comprise such as described in FIG. 20.

Phase M3 is the high-volume manufacturing (HVM) of the semiconductor device. In the HVM phase the measurement time is reduced in favor of maximizing the throughput. In step M3.1, the fabrication process developed in phase M2 is applied and a limited number of indicator or monitoring measurements is preformed routinely in step M3.2. Based on the design performance indicators D1 and fabrication performance indicators D2 derived during the RnD phase M1 and phase M2 and described above, a measurement or monitoring recipe R is defined which is then routinely performed to monitor the fabrication process in phase M3.

From the design performance indicators D1 and fabrication performance indicators D2, a measurement or monitoring recipe R is generated for fast and high throughput monitoring of the HVM phase M3. The design performance indicators D1 and the fabrication performance indicators D2 can comprise a large amount of data, including 2D image and 3D image data, 2D virtual image slices, dimensions and statistical analysis of such data of fabricated semiconductor devices with ideal performance and of fabricated semiconductor devices with performance degradation due to typical fabrication errors. The design performance indicators D1 and the fabrication performance indicators D2 can also comprise simulations, for example CAD simulations or analysis data of other semiconductor devices, provided from a data base. Representative defect patterns and specific measurements task in inspection volumes at specific inspection sites are derived and complied in a measurement recipe R. For example, a volume effect in an inspection volume can typically be represented by a single or two representative cross section image slices through the inspection volume. From 3D volume images obtained by a slice-and-imaging method as described above, the angle and orientation of the at least one representative cross section image slices is determined, and the angles and orientations of cross section surfaces at specific inspection sites on a wafer are determined. The angles and orientations of cross section surfaces at specific inspection sites are an example of a priori information, utilizing a priori knowledge of the semiconductor structures and features in the inspection volumes.

The measurement recipe R for HVM is derived for example by help of machine learning or deep learning applied to the design performance indicators D1 and the fabrication performance indicators D2, and a set of reduced representative measurements for HVM in phase M3 is defined including a set of monitoring or HVM performance indicators D3 of the or monitoring recipe R. The measurement or monitoring recipe R is applied during HVM in step M3, and a plurality of actual values of the monitoring indicators D3 are generated. The actual values of the HVM performance indicators D3 can comprise a large amount of data, including 2D image and 3D image data, measured dimensions and statistical analysis of such data of HVM fabricated semiconductor devices with ideal performance and of fabricated semiconductor devices with performance degradation due to HVM fabrication errors. The plurality of actual values of the HVM performance indicators D3 can be feed back to the measurement or monitoring recipe generation in step R, and the measurement or monitoring recipe generation in step R can be confirmed or actualized on regular time intervals.

A method of measurement or monitoring recipe generation can therefore comprise the steps of generating of a first set of design performance indicators D1, the set of design performance indicators D1 comprising CAD image data and dimensions of design features in the inspection volume, and generating a second set of fabrication performance indicators D2, comprising 3D volume image data obtained during a fabrication process development, and deriving a measurement recipe R comprising a step for obtaining at least one of a third set of performance indicators D3, wherein the steps of generating a second set of fabrication performance indicators D2 or the monitoring recipe R are comprising the acquisition of at least a first cross section image slice of at least a first cross section surface through a representative, predetermined inspection volume with a depth extension $LZ>1$ μm underneath a wafer surface. At least one of the steps of obtaining at least one of the performance indicators D1 to D3 comprises a step of an image processing to extract a plurality of first cross section image features representing cross sections of the plurality of first semiconductor features at slant angle GF, the image processing comprising at least one of a feature extraction, an edge detection, a pattern recognition, or a pixel interpolation. At least one of the steps of obtaining at least one of the performance indicators D1 to D3 comprises the step of computing at least a descriptive parameter of at least one first semiconductor feature from at least one of a plurality of first cross section image features, with the descriptive parameter being one of a dimension, a diameter, an angle, an area, a shape or a volume. At least one of the steps of obtaining at least one of the performance indicators D1 to D3 further comprises the step of computing one of an average or a statistical deviation of the at least one descriptive parameter of the plurality of first semiconductor features. The measurement recipe R can comprise measurements according any of the embodiments described above. In HVM phase M3, a full 3D tomography may consume unacceptable amount of time whereas a single wedge cross section is possible. With a monitoring recipe generation described above, a single wedge cut can provide the information for process monitoring. In some embodiments, a way to extract 3D information from the analysis of a single wedge cut through a 3D-Memory stack is provided.

Figure 24:
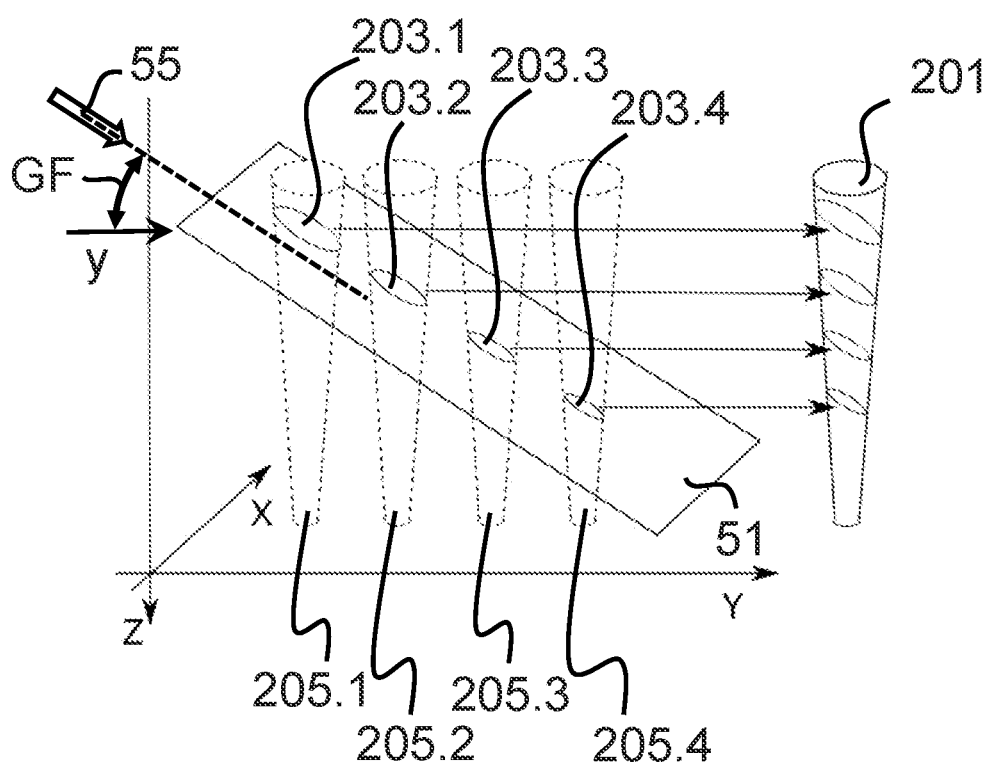
FIG. 24 illustrates an analysis of an inspection volume based on a priori information.

A single wedge-cut monitoring method can provide the information on a single tilted plane 51 within the 3D-memory stack. The information achieved from the single cut is insufficient for a full 3D-reconstruction of the stack geometry compared to, e.g., 3D-tomography using a stack of parallel slices milled and imaged sequentially. The advantage of a single wedge-cut approach over milling and imaging of multiple slices is however much shorter milling and image acquisition time. Therefore, it is advantageous to apply a single wedge cut monitoring method in the HVM phase M3. The orientation of the FIB and the imaging beam allows to mill a localized trench without introducing further damage to the wafer (no "lift-out" of a wafer sample) which can be important for wafer in-line inspection. FIG. 24 illustrates single wedge-cut monitoring method at an example of a plurality of HAR structures of a memory device. The single interface 51 is milled by FIB 55 at an angle GF to the wafer surface (not shown) parallel to the y-axis. The charged particle imaging device (not shown) is arranged in z-direction and generates a digital image of the surface 51, comprising a plurality of cross section image features 203.1 . . . 203.4 of HAR structures 205.1 . . . 205.4 oriented perpendicular to the wafer surface. A reconstruction of the representative vertical HAR profile 201 of an average HAR channel is obtained by combining the footprints 203.1 to 203.4 of the cross-section image features of individual memory or HAR channels 205.1 . . . 205.4. To reconstruct the vertical profile of the representative vertical HAR profile 201 (the diameter or, more generally, the shape of the representative vertical HAR profile as a function of Z), one can combine the imaged footprints 203.1 to 203.4 of the individual channels at slanted angle corresponding to angle GF to form the representative vertical HAR profile 201 as illustrated in FIG. 24. The Z-coordinates of the image pixels of the digital image can for example be reconstructed from their X-Y-coordinates on the top-down image using a method described above, utilizing the cross-section image features of word lines in the sloped surface 51 as illustrated for example in FIGS. 5, 6, 12 and 19B. The method applies a priori information generated in phase M2, for example information that all channels within the field of view ideally have identical vertical profile or a predefined variation of vertical profiles. In a single cross section surface, the cross sections of HAR structures are located at different depths, and the properties of the HAR channels depending on depth can be trained or learned from 3D volume inspections in phase M2. In a simple example, the diameter of a HAR channel is assumed to be constant with Z and that the axes of all HAR channels are parallel to each other. If a more complex vertical profile of the average channel is predicted from 3D volume inspections during phase M2, the assumed profile can be applied to correct the measured critical dimensions and proximities at different depths.

The wedge-cut data also allows a reconstruction of the lateral displacement of an averaged channel 201 as a function of Z (so-called "tilt" or "wiggling") if one assumes that the channels form a regular grid in the XY-plane. In an example, the memory channels are designed in step M1 to form a hexagonal grid in the lateral plane. For each channel footprint, comprising footprints or cross sections image segments 203.1 to 203.4 in the image, the centroid $(x^i, y^i)$ is measured (with index i for the plurality of i=1 . . . N cross section image segments of HAR channels). As described above, the Z-coordinate, $z^i$, of a footprint centroid can be determined for any pair of $(x^i, y^i)$ using utilizing the word lines. If all channels in the FoV have the same shape and orientation, the lateral position of a channel footprint centroid $(x^i, y^i)$ at a given z can be defined as $$x^i = x_{ref}^i + \hat{x}(z),$$

and $$y^i = y_{ref}^i + \hat{y}(z),$$

where $\hat{x}(z)$ and $\hat{y}(z)$ describe the lateral displacement of an averaged channel with depth; $x_{ref}^i$ and $y_{ref}^i$ describe the ideal lateral position of the channels at a certain reference depth $z_{ref}$. With this reconstruction the functions $\hat{x}(z)$ and $\hat{y}(z)$ the tilt and "wiggling" of an averaged channel in the FoV is determined. This can be done by solving the following overdetermined system of equations (e.g., by $\chi^2$-minimization).

$$\begin{cases} \hat{x}(z^i) = x^i - x_{ref}^i, \\ \hat{y}(z^i) = y^i - y_{ref}^i. \end{cases}$$

For $x_{ref}^i$ and $y_{ref}^i$, it is assumed that they form a predefined regular grid of for example a hexagonal grid. Thus, for a sufficient number of measured channel centroids, the system of equations can be solved to find $\hat{x}(z)$ and $\hat{y}(z)$.

Figure 25A:
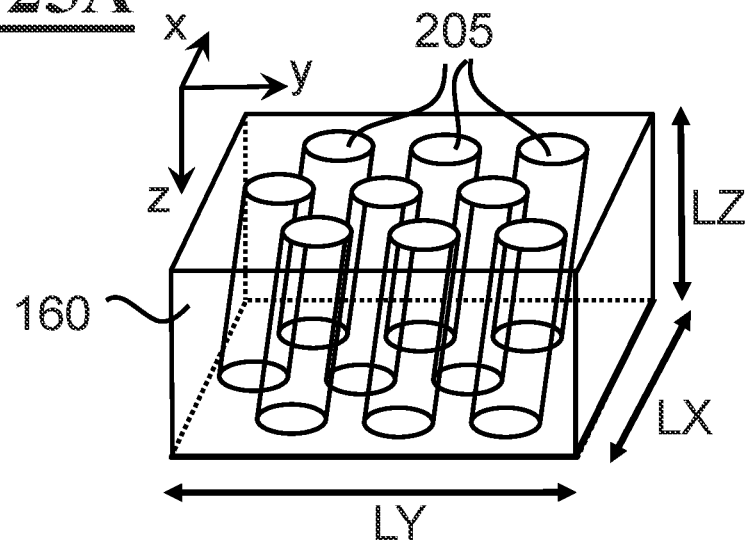
FIGS. 25A-25C illustrate a monitoring recipe to analyze a tilt of HAR structures.
Figure 25B:
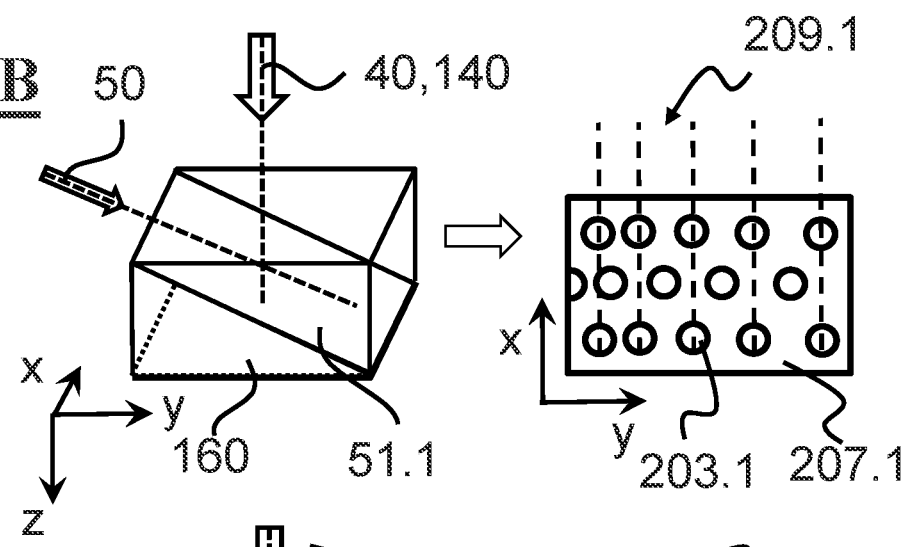
Figure 25C:
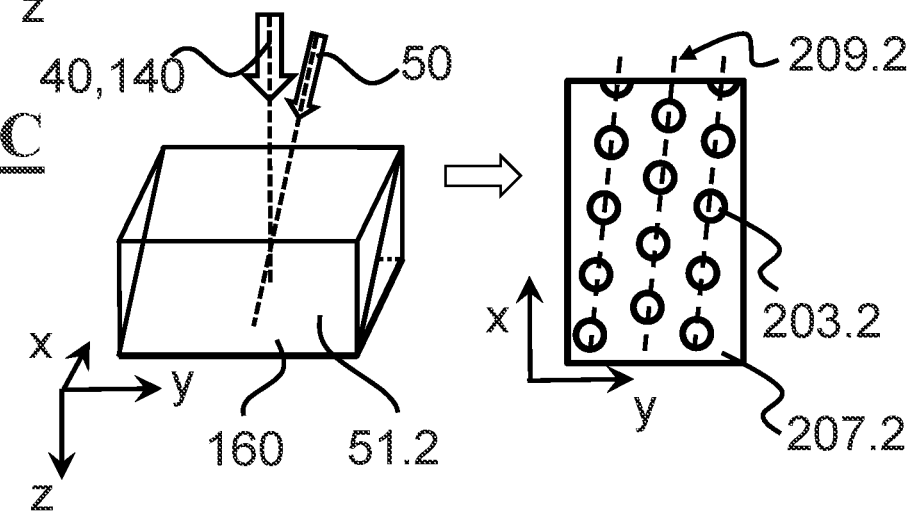

The digital image can therefore be used to reconstruct the 3D-geometry of a 3D-memory stack under certain statistical assumptions or under a priory information obtained in the 3D volume inspections during phases M1 and M2. For example, a defect type or defect signature can be identified from the digital image of the single surface 51 by with a priori information or with the methods of machine learning. A set of representative digital images of single surfaces from the 3D volume images of typical defects is obtained in phases M1 and M2 and is used to train the machine learning algorithm. From a single surface and by analysis according a priori information or machine learning algorithm, a 3D volume defect type is determined from a digital image of the single intersection surface 51. A simplified example is illustrated in FIGS. 25A-25C. FIG. 25A illustrates a plurality of HAR structures (three indicated by reference number 205) in an inspection volume 160 of lateral LX and LY extension and a corresponding depth range LZ. The plurality of HAR structures is tilted with respect to the z-axis. FIG. 25B illustrates a first wedge cut by milling with FIB 50 oriented in the local wafer coordinate system in the y-z-plane a first cross section surface 51.1. A first digital image 207.1, obtained by charged particle imaging device 40 or 140 is illustrated on the right side of FIG. 25B, with a plurality of cross section image features 203.1 representing the cross sections of the plurality of HAR structures 205. The spacings between the plurality of lines 209.1 through parallel rows of HAR structures parallel to the x-direction changes over the digital image of the cross-section surface 51.1, from which together with the priori information about the design distance of HAR channels a tilt of the plurality of HAR channels 205 is derived.

For further analysis of a tilt of the channels, a second cross section surface 51.2 is generated and imaged, wherein the orientation of the wedge cut is changed between the first and second cross section surface. For example, two intersection surfaces 51.1 and 51.2 are etched and imaged with a rotation of the wafer around the wafer normal or z-axis between the first intersection surface generation and first digital image generation and the second intersection surface generation and second digital image generation. Thereby, two intersection surfaces are formed, with first intersection surfaces related to the second intersection surface by a rotation angle of for example 90°. The result of a second intersection surface generation and second digital image generation is illustrated in FIG. 25C in local wafer coordinate systems. For sake of illustration, the wafer is not rotated, but the orientation of the imaging device is rotated, such that the FIB column 50 is now oriented in a x-y-plane of the local wafer coordinate system. The second cross section surface 51.2 is again generated under angle GF, but rotated with respect to the first cross section surface 51.1 by a predetermined angle around the z-axis. In this example, the predetermined angle is 90°, but other angles are possible as well. The corresponding second digital image 207.2 of the second cross section surface 51.2 is again obtained by charged particle imaging device 40 or 140, and comprises a plurality of cross section image features 203.2 representing cross sections through the plurality of HAR structures at different depth. Lines 209.2 through parallel rows of HAR structures are now tilted with respect to the x-axis, from which together with the priori information about the design distance of HAR channels a tilt of the plurality of HAR channels 205 is derived. With the first and second inspections under wedge cut-geometry, a comprehensive determination of the tilt angle and orientation of the plurality of HAR structures in the inspection volume 160 is possible from only two cross section measurements.

In an example, a tilt of the HAR channels 205 can be a result of a misaligned etching process and the tilt angle of the HAR structures depend on the position on a wafer, for example with increasing radial tilt angle with increasing distance to a center of the wafer. Other examples are a systematic error in an alignment, according to which all HAR structures are still parallel with equal tilt angles in one direction. With the generation of a few representative cross section surfaces milled and imaged at predefined positions of the wafer, a signature or an origin of a defect can be derived.

In the example above the plurality of HAR structures in an inspection volume is tilted and parallel. The cross sections of the HAR structures thus show different different pitch in x and y direction. In other examples, for example if HAR structures are tilted with respect to a common center of all HAR axes, or a random tilt, the signature of all tilts can be evaluated by at least two cross section surfaces generated at different orientation, for example via a rotation of the wafer between first and second cross section image generation.

The channel footprints detected in the top-down image of the wedge-cut cross section can be used to investigate the lateral variations of channel diameters (CD-uniformity) and proximities of the neighboring channels, as described in German patent application 102019006645.6, filed on Sep. 20, 2019, and PCT application PCT/EP2020/000101, filed on May 15, 2020, which are hereby both incorporate by reference.

A method of wafer inspection of at least a first inspection volume in a wafer according a monitoring recipe is therefore comprising the steps of loading the wafer on a wafer support table in the dual beam device, movement of the wafer support table to bring a first measurement site on the wafer in coincidence with an intersection point of the dual beam device, milling a first cross section surface at a slanted angle in the first inspection volume with the FIB column, generating a first cross section image slice of the first cross section surface with the charged particle imaging device, and obtaining a performance indicator of a plurality of first semiconductor features in the first inspection volume comprising the step of analyzing the first cross section image slice with a priori information about the plurality of first semiconductor features. The step of analyzing can comprise a step of an image processing to extract a plurality of first cross section image features representing cross sections of the plurality of first semiconductor features at slant angle GF, the image processing comprising at least one of a feature extraction, an edge detection, a pattern recognition, or a pixel interpolation. The step of obtaining a performance indicator can further comprise the step of computing at least a descriptive parameter of a first semiconductor feature from at least one of the plurality of first cross section image features, with the descriptive parameter being one of a dimension, a diameter, an angle, an area, a shape or a volume. It further can comprise the step of computing one of an average or a statistical deviation of the at least one descriptive parameter of the plurality of first semiconductor features. The step of analyzing can further comprise generating a depth map Z(x,y) of the first cross section image slice according. For generating the depth map, the method can further comprise (1) determining at least two second cross section image features in the first cross section image slice and (2) determining the depth map Z(x,y) from a lateral positions of the at least two second cross section image features, with the at least two second cross section image features represents integrated semiconductor structure at a different depth within the inspection volume. In an example, the step of obtaining a performance indicator comprises the derivation of a tilt angle deviation of the plurality of first semiconductor features from the lateral positions of the plurality of first cross section image features, the tilt angle deviation being an angle of a first semiconductor feature with respect to an axis normal of the wafer surface. A 3D representative of the first plurality of semiconductor features can be generated from the plurality of first cross sections image features arranged at the slant angle GF and the depth map Z(x,y). The first cross section image slice can be compared with a 2D digital image slice through an inspection volume of a reference wafer or die, wherein the 2D digital image slice is a cross section image slice obtained in a previous measurement of a reference wafer or die and stored in a memory or a virtual cross section image slice, and wherein the virtual cross section image slice is generated from a 3D volume image data stored in a memory. The 3D volume image data is obtained in a previous slice and image measurement of an inspection volume of a reference wafer or die and stored in the memory, for example obtained during phase M2.

The previous slice and image measurement can performed with a second dual beam device comprising at least a second FIB column and a second charged particle imaging device, or with the same or first dual beam device.

In an example of the monitoring recipe R, the recipe comprises a movement of the wafer support table to bring a second measurement site of the wafer in coincidence with an intersection point of the first dual beam device, milling a second cross section surface at the slanted angle GF in a second inspection volume, and generating a second cross section image slice of the second cross section surface with the charged particle imaging device. In an example, the movement or the wafer comprises a rotation of the wafer support table with respect to an axis normal to the wafer support surface. The performance indicator is obtained of the plurality of first semiconductor features in the first and second inspection volumes by analyzing the first and the second cross section image slices with a priori information about the plurality of first semiconductor features. In an example, a tilt angle deviation of the plurality of first semiconductor features comprises an analysis of the first and second cross section image slices.

A wafer defect inspection device comprises a focused ion beam (FIB) column configured for milling and exposing at least a first cross section surface at a slant angle GF through a first inspection volume in a wafer and a charged particle imaging device configured for imaging of the at least first cross section surface to form a first cross section image slice. It further comprises an image processing unit with a software code installed configured to determine a plurality of cross section image features in the at least first cross section image slice and to determine the depth of the plurality of cross section features within the inspection volume, the plurality of cross section image features being cross sections of semiconductor structures at the slant angle GF inside the inspection volume and a defect detection unit configured to determine from the plurality of cross section image features deviations from predetermined properties of the semiconductor structures inside the inspection volume. The wafer defect inspection device is configured to inspect the inspection volume in the wafer, while the inspection volume is not extracted from the wafer. The wafer defect inspection device comprises a memory for storing a priori information.

The FIB for milling the slanted cross section surfaces into a wafer is described in some examples as a Gallium FIB, which is a common FIB used for milling. Other examples of FIB for milling can utilize other materials, such as gases produced in a gas field ion source (GFIS) such as Hydrogen, Helium or Neon. In an example, the dual beam device of the disclosure comprises a FIB for milling and a charged particle imaging beam for imaging, both utilizing noble gases such as He and Ne for milling as well as for imaging.

The above-described embodiments and examples are intended to be examples of the disclosures only. Despite the embodiments are described at the example of semiconductor structures as probes, the methods and apparatuses of at least some of the embodiments may as well be applied to materials or probes of comparable structures which allow depth determination from second cross-section image features representing layers or of known depth in a sample. Alterations, modifications, variations and combinations can be effected to the particular embodiments and example by those of skill in the art without departing from the scope, which is defined by the clauses appended hereto.

The disclosure is further described by following sets of clauses:

Clause 1: A method of wafer inspection of at least a first inspection volume in a wafer with a first dual beam device, comprising: loading the wafer on a wafer support table in the dual beam device, the dual beam device comprising at least a FIB column and a charged particle imaging device, with a first optical axis of the FIB column forming the slanted angle GF with a surface of the wafer support table, and a second optical axis of the charged particle imaging device forming an angle GE with the normal to the surface of a wafer support table, the first and second optical axes forming an intersection point; moving the wafer support table to bring a first measurement site on the wafer in coincidence with an intersection point of the dual beam device; milling a first cross section surface at a slanted angle GF in the first inspection volume with the FIB column; generating a first cross section image slice of the first cross section surface with the charged particle imaging device; and obtaining a performance indicator of a plurality of first semiconductor features in the first inspection volume comprising the step of analyzing the first cross section image slice with a priori information about the plurality of first semiconductor features.

Clause 2: The method of clause 1, wherein the first semiconductor feature is one of a via, a HAR structure, or a HAR channel.

Clause 3: The method of any of the clauses 1 or 2, wherein the step of analyzing comprises a step of an image processing to extract a plurality of first cross section image features representing cross sections of the plurality of first semiconductor features at slant angle GF, the image processing comprising at least one of a feature extraction, an edge detection, a pattern recognition, or a pixel interpolation.

Clause 4: The method of clauses 3, wherein the step of obtaining a performance indicator further comprises the step of computing at least a descriptive parameter of a first semiconductor feature from at least one of the plurality of first cross section image features, with the descriptive parameter being one of a dimension, a diameter, an angle, an area, a shape or a volume.

Clause 5: The method of clause 4, wherein the step of obtaining a performance indicator further comprises the step of computing one of an average or a statistical deviation of the at least one descriptive parameter of the plurality of first semiconductor features.

Clause 6: A method according any of the clauses 3 to 5, wherein the step of analyzing further comprises generating a depth map $Z(x,y)$ of the first cross section image slice.

Clause 7: A method of clause 6, wherein the step of generating the depth map further comprises: determining at least two second cross section image features in the first cross section image slice; and determining the depth map $Z(x,y)$ from a lateral positions of the at least two second cross section image features.

Clause 8: The method of clause 7, wherein each of the at least two second cross section image features represents integrated semiconductor structure at a different depth within the inspection volume.

Clause 9: The method according clauses 7 or 8, wherein each of the plurality of first semiconductor features is extending in a direction perpendicular to the wafer surface, and the second cross section image features comprise cross sections of semiconductor structures extending in a direction parallel to the wafer surface.

Clause 10: The method of any of the clauses 7 to 9, wherein the second cross section image features comprise at least cross sections of one of an isolator line or layer, a metal line or layer, a semiconductor line or layer.

Clause 11: The method of any of the clauses 6 to 10, wherein the step of obtaining a performance indicator comprises the derivation of a tilt angle deviation of the plurality of first semiconductor features from the lateral positions of the plurality of first cross section image features, the tilt angle deviation being an angle of a first semiconductor feature with respect to an axis normal of the wafer surface.

Clause 12: The method of any of the clauses 4 to 11, further comprising the step of deriving a 3D representative of the first plurality of semiconductor features from the plurality of first cross sections image features arranged at the slant angle GF and the depth map $Z(x,y)$.

Clause 13: The method of any of the clauses 1 to 12, wherein the step of analyzing further comprises comparing the first cross section image slice with a 2D digital image slice through an inspection volume of a reference wafer or die.

Clause 14: The method of clause 13, wherein the 2D digital image slice is a cross section image slice obtained in a previous measurement of a reference wafer or die and stored in a memory.

Clause 15: The method of clause 13, wherein the 2D digital image slice is a virtual cross section image slice, and wherein the virtual cross section image slice is generated from a 3D volume image data stored in a memory.

Clause 16: The method of clause 15, wherein the 3D volume image data is obtained in a previous slice and image measurement of an inspection volume of a reference wafer or die and stored in the memory.

Clause 17: The method of clause 16, wherein the previous slice and image measurement is performed with a second dual beam device comprising at least a second FIB column and a second charged particle imaging device.

Clause 18: The method of clauses 16 or 17, wherein the previous slice and image measurement is performed by the first dual beam device.

Clause 19: The method of any of the clauses 1 to 18, further comprising; moving the wafer support table to bring a second measurement site of the wafer in coincidence with an intersection point of the first dual beam device; milling a second cross section surface at the slanted angle GF in a second inspection volume with the FIB column; generating a second cross section image slice of the second cross section surface with the charged particle imaging device; and obtaining the performance indicator of the plurality of first semiconductor features in the first and second inspection volumes by analyzing the first and the second cross section image slices with a priori information about the plurality of first semiconductor features.

Clause 20: The method of clause 19, wherein between the milling of the first cross section surface in the first inspection volume and the milling of the second cross section surface in the second inspection volume, the wafer support table is rotated with respect to an axis normal to the wafer support surface.

Clause 21: The method of any of the clauses 19 to 20, further comprising the step of derivation of a tilt angle deviation of the plurality of first semiconductor features comprises an analysis of the first and second cross section image slices.

Clause 22: The method of any of the clauses 1 to 21, wherein the slant angle GF of the FIB column is between 30° and 80°, such as between 30° an 45°.

Clause 23: The method of any of the clauses 1 to 22, wherein the charged particle imaging device is oriented perpendicular to the wafer surface with GE=0°.

Clause 24: The method of any of the clauses 1 to 23, wherein the charged particle imaging device is a Helium Ion Microscope (HIM).

Clause 25: The method of clause 24, wherein the first cross section image slice is obtained by obtaining an image of the first cross section surface through the inspection volume in a single image scan.

Clause 26: A method of inspection of a wafer with a dual beam device, the dual beam device comprising a focused ion beam column (FIB) with on optical axis arranged under an angle GF between 30° and 45° to a support surface of wafer support table and a Helium ion microscope (HIM) with an optical axis arranged perpendicular to the support surface, the optical axis of the FIB column and the HIM forming an intersection point, comprising the steps of: positioning a first measurement site of a wafer with a wafer stage with a wafer support table configured for holding the wafer at the intersection point; milling with the FIB column a first cross section surfaces approximately at the angle GF through a first inspection volume with a depth extension LZ below a wafer surface of more than 1 µm; and imaging the first cross section surface with a single image scan with the Helium ion microscope to form a high-resolution cross section image slice.

Clause 27: The method of clause 26, wherein the first inspection volume has a depth range of more than 2 µm, more than 6 µm or even 10 µm.

Clause 28: The method of any of the clauses 26-27, wherein in the step of imaging, the HIM is configured for generating an image with a lateral resolution of below 2 nm (e.g., below 1 nm, below 0.5 nm).

Clause 29: A Computer program product with a program code for executing the method according to any one of the clauses 1 to 28.

Clause 30: A dual beam device, configured to perform any of the methods according to any one of clauses 1 to 28.

Clause 31: A wafer defect inspection device comprising: a focused ion beam (FIB) column configured for milling and exposing at least a first cross section surface at a slant angle GF through a first inspection volume in a wafer; a charged particle imaging device configured for imaging of the at least first cross section surface to form a first cross section image slice; an image processing unit with a software code installed configured to determine a plurality of cross section image features in the at least first cross section image slice and to determine the depth of the plurality of cross section features within the inspection volume, the plurality of cross section image features being cross sections of semiconductor structures at the slant angle GF inside the inspection volume; and a defect detection unit configured to determine from the plurality of cross section image features deviations from predetermined properties of the semiconductor structures inside the inspection volume, wherein the wafer defect inspection device is configured to inspect the inspection volume in the wafer, while the inspection volume is not extracted from the wafer.

Clause 32: The device of clause 31, wherein the image processing unit with a software code installed is further configured for computing a 3D representative of the plurality of first semiconductor structures from the plurality of first cross sections image features arranged at the slant angle GF.

Clause 33: The device of clause 31 or 32, further comprising a memory for storing a priori information Clause 34: The device of any of the clauses 31-33, wherein the charged particle imaging device further comprises a wafer support table.

Clause 35: The device of clause 34, wherein an optical axis of the FIB column is arranged at the slant angle GF to the wafer support table, the slant angle being between 30° and 80°, such as between 30° an 45°.

Clause 36: The device of clause 34 or 35, wherein an optical axis of the charged particle imaging device is arranged at an angle perpendicular to the wafer support table.

Clause 37: The device of any of the clauses 31 to 36, wherein the charged particle imaging device is a Helium Ion Microscope (HIM).

Clause 38: The device of clause 37, whereby the inspection volume has a depth extension LZ below the wafer surface of more than 1 µm, such as more than 2 µm, and the HIM is configured with a depth of focus (DOF) exceeding the depth extension LZ, such that cross section image slices is obtained by a single image scan with the HIM beam.

Clause 39: The device of any of the clauses 31 to 38 with a control unit with software code installed to perform any of the methods of clauses 1 to 28.

Clause 40: A method of measurement recipe generation for inspection of representative inspection volumes in wafers, comprising the steps of: generating of a first set of design performance indicators D1, the set of design performance indicators D1 comprising CAD image data and dimensions of design features in the inspection volume; generating a second set of fabrication performance indicators D2, comprising 3D volume image data obtained during a fabrication process development; deriving a measurement recipe R comprising a step for obtaining at least one of a third set of performance indicators D3; and generating a second set of fabrication performance indicators D2 and the process recipe R comprising acquiring at least a first cross section image slice of at least a first cross section surface through the representative inspection volume with a depth extension LZ>1 µm underneath a wafer surface.

Clause 41: The method of clause 41, wherein at least one of the steps of obtaining at least one of the performance indicators D1 to D3 comprises a step of an image processing to extract a plurality of first cross section image features representing cross sections of the plurality of first semiconductor features at slant angle GF, the image processing comprising at least one of a feature extraction, an edge detection, a pattern recognition, or a pixel interpolation.

Clause 42: A method of clause 41, wherein at least one of the steps of obtaining at least one of the performance indicators D1 to D3 comprises the step of computing at least a descriptive parameter of at least one first semiconductor feature from at least one of a plurality of first cross section image features, with the descriptive parameter being one of a dimension, a diameter, an angle, an area, a shape or a volume.

Clause 43: The method of clause 42, wherein at least one of the steps of obtaining at least one of the performance indicators D1 to D3 further comprises the step of computing one of an average or a statistical deviation of the at least one descriptive parameter of the plurality of first semiconductor features.

Clause 44: The method of any of the clauses 41 to 43, wherein at least one of the steps of obtaining at least one of the performance indicators D1 to D3 comprises any of the method steps of clauses 1 to 28.

Clause 45: A method of inspection of an inspection volume in a wafer with a dual beam device, the dual beam device comprising at least a FIB column and a charged particle imaging device, with a first optical axis of the FIB column forming a slanted angle GF with a surface of a wafer support table, and a second optical axis of the charged particle imaging device forming an angle GE with the normal to the surface of a wafer support table, the first and second optical axes forming an intersection point, the method comprising the steps of: loading the wafer on the wafer support table in the dual beam device; moving the wafer support table to bring a first measurement site on the wafer in coincidence with the intersection point; obtaining a sequence of N cross section images slices comprising at least a first cross section image slice and a second cross section image slice in the inspection volume, wherein obtaining the first and second cross section image slices includes subsequently exposing at least a first and a second cross section surface in the inspection volume by milling into the inspection volume with the FIB column approximately at angle GF, and imaging the at least first and the second cross section surfaces with the charged particle imaging device to obtain the at least first and second cross section image slice; determining at least one first cross section image feature in the first and in the second cross section image slice; determining at least one second cross section image feature in the first and in the second cross section image slice; and determining the depth of the at least one first cross section image feature in the first cross section image slice from a lateral position of the at least one second cross section image feature in the first cross section image slice.

Clause 46: The method of clause 45, further comprising the step of performing a mutual lateral alignment of the first and the second cross section image slices with at least one common cross section image feature.

Clause 47: The method of clause 46, wherein the step of mutual lateral image alignment includes the subtraction of an image distortion deviation between the at least first and second cross section image slices.

Clause 48: The method according any of the clauses 45 to 47, wherein the step of determining the depth of the at least one first cross section image feature comprises determining at least one lateral difference of at least a first position of at least one of the second cross section image feature in the first cross section image slice and at least a second position of the second cross section image feature in the second cross section image slice.

Clause 49: The method of any of the clauses 45 to 48, wherein in the step determining at least one second cross section image feature, at least two second cross section image features are determined in the first cross section image slice, wherein each of the second cross section image features represent an integrated semiconductor structure at a different depth within the inspection volume.

Clause 50: The method of clause 49, wherein the step of determining the depth of the at least one first cross section image feature comprises determining the depth of the at least one first cross section image feature in the first cross section image slice from the lateral positions of the at least two second cross section image features.

Clause 51: The method according any of the clauses 45 to 50, wherein the optical axis of the charged particle imaging device is arranged perpendicular to the wafer.

Clause 52: The method according any of the clauses 45 to 51, wherein the charged particle imaging device is a scanning Helium ion microscope.

Clause 53: The method according any of the clauses 45 to 52, comprising further the step of forming at least one alignment feature in the proximity of the inspection volume configured for mutual lateral alignment of the first and the second cross section image slices.

Clause 54: The method of clause 53, wherein the alignment feature is fabricated above the inspection volume and configured for determining the position of the first and second edge formed by the intersection of the first and second cross section surfaces with the wafer surface.

Clause 55: The method of clause 53, wherein the first cross section surface is formed within the wafer with a larger extension in an x-direction perpendicular to the FIB beam compared to the second cross section surface, such that after forming the second cross section surface a parallel surface segment of the first surface segment is remaining, and forming the at least one alignment feature on the remaining parallel surface segment of the first surface segment.

Clause 56: The method according any of the clauses 45 to 55, wherein the slanted angle GF of the first optical axis of the FIB column with a surface of a wafer support table is in a range from 8° to 45° (e.g., in a range from 8° to 30°, in a range from 8° to 15°).

Clause 57: The method according any of the clauses 45 to 55, wherein the slanted angle GF of the first optical axis of the FIB column with a surface of a wafer support table is between 250 and 60° (e.g., in a range from 25° to 45°, between 30° and 40°).

Clause 58: The method according any of the clauses 45 to 57, wherein the step of obtaining the at least first and second cross section image slices in the inspection volume comprises scanning of the focused ion beam of the FIB column by a scanning unit in a first direction to expose the first cross section surface within the inspection volume, tilting the focused ion beam by the scanning unit in a second direction perpendicular to the first direction, and scanning focused ion beam by the scanning unit in the first direction to expose a second cross section surface within the inspection volume, such that the first and second cross section surfaces form different angles of at approximately slant angle GF with the wafer surface.

Clause 59: The method of clause 59, wherein during the step of obtaining at least the first cross section image slice and the second cross section image slice in the inspection volume, the wafer is not moved.

Clause 60: The method according any of the clauses 45 to 59, wherein the first cross section image features comprise at least cross sections of a semiconductor structure extending in a direction parallel to an axis normal to the wafer surface, and second cross section image features comprise at least cross sections of a semiconductor structure extending in a direction parallel to the wafer surface.

Clause 61: The method according any of the clauses 45 to 60, wherein the first common cross section image features comprise at least cross sections of one of a via, a HAR structure, or a HAR channel of the integrated semiconductor circuit.

Clause 62: The method according any of the clauses 45 to 61, wherein second cross section image features comprise at least cross sections of one of an isolator line or layer, a metal line or layer, or a semiconductor line or layer of the integrated semiconductor circuit.

Clause 63: The method according to any one of the clauses 45 to 62, wherein the number N of cross section images slices is at least N=10 (e.g., N>100, N is about 1000 or more).

Clause 64: A Computer program product with a program code for executing the method according to any one of the clauses 45 to 63.

Clause 65: A dual beam device, configured to perform any of the methods according to any one of clauses 45 to 63.

Clause 66: The wafer defect inspection device configured to perform a method according to any of the clauses 45 to 63, comprising: a focused ion beam column configured for milling and exposing at least a first and a second cross section image surface in an inspection volume in a wafer; a charged particle imaging device configured for imaging of the at least first and second cross section surfaces to form first and second cross section image slices; an image processing unit with a software code installed configured to determine cross section image features in the at least first and second cross section image slices and to determine the depth of the cross section features within the inspection volume, the cross section image features being cross sections of semiconductor structures inside the inspection volume; and a defect detection unit configured to determine from the cross section image features deviations from predetermined properties of the semiconductor structures inside the inspection volume; wherein the wafer defect inspection device is configured to inspect the inspection volume in the wafer, while the inspection volume is not extracted from the wafer.

Clause 67: A dual beam device (1) for inspection of an inspection volume underneath a wafer surface (55) of a wafer (8), comprising: a wafer stage (155) with a wafer support table (15) configured for holding during use the wafer (8) on a support surface (152) of the wafer support table 15; a focused ion beam column (FIB) (50) with an optical axis arranged under an angle GF exceeding 30° to the support surface (152) of wafer support table (15); a Helium ion microscope (HIM) (140) with an optical axis (142) arranged perpendicular to the support surface (152), the optical axis of the FIB column (50) and the HIM (140) forming an intersection point (43); a stage control unit (16), configured to position during use a first measurement site (6.1) of a wafer (8) at the intersection point (43); and a control unit (19) for controlling the FIB column (50) and the HIM (140), configured for alternatingly milling a plurality of N cross section surfaces in the inspection volume with the FIB beam (51) approximately at the angle GF and imaging each cross section surface by scanning with the HIM beam (144) to form a plurality of N high-resolution cross section image slices, whereby the inspection volume has a depth extension LZ below the wafer surface (55) of more than 1 µm, such as more than 2 µm.

Clause 68: The Dual Beam device (1) according clause 67, wherein the depth extension LZ in direction exceeds 5 µm, for example 6 µm or 10 µm.

Clause 69: The Dual Beam device (1) according any of the clauses 67 to 68, wherein the control unit (19) is further configured to scan during use the HIM beam (144) over an area exceeding the lateral size LX or LY of the inspection volume of about 5 µm to 10 µm (LX or LY) and collecting in a time sequential manner a plurality of secondary electrons with a secondary electron detector (17).

Clause 70: The Dual Beam device (1) according any of the clauses 67 to 69, wherein the HIM (140) is configured with a depth of focus (DOF) exceeding the depth extension LZ, such that each of the plurality of N high-resolution cross section image slices is obtained by a single image scan with the HIM beam (144).

Clause 71: The Dual Beam device (1) according any of the clauses 67 to 70, further comprising an image processing unit with a software code installed configured to determine from the plurality of N cross-section image slices at least a first virtual cross-section image, wherein the first virtual cross-section image is oriented parallel to the surface (55) of the wafer (8).

Clause 72: A method of inspection of an inspection volume underneath a wafer surface (55) of a wafer (8) with a dual beam device, the dual beam device comprising a focused ion beam column (FIB) (50) with on optical axis arranged under an angle GF exceeding 30° to a support surface (152) of wafer support table (15) and a Helium ion microscope (HIM)(140) with an optical axis (142) arranged perpendicular to the support surface (152), the optical axis of the FIB column (50) and the HIM (140) forming an intersection point (43), comprising the steps of: positioning a first measurement site (6.1) of a wafer (8) with a wafer stage (155) with a wafer support table (15) configured for holding the wafer (8) at the intersection point (43); alternately milling with the FIB column (50) a plurality of N cross section surfaces approximately at the angle GF in the inspection volume with a depth extension LZ below a wafer surface (55) of more than 1 µm; and imaging each cross section surface with a single image scan with the Helium ion microscope (140) to form a plurality of N high-resolution cross section image slices.

Clause 73: The method of Clause 72, whereby the milling of the plurality of N cross section surfaces has a depth extension LZ below the wafer surface (55) of more than 2 µm (e.g., more than 6 µm, more than 10 µm).

Clause 74: The method of clauses 72 or 73, further comprising
computing at least a virtual cross-section image parallel to the wafer surface (55) from a plurality of N cross-section image slices.

Clause 75: The method of Clause 74, wherein a first virtual cross-section image is computed in a conducting layer or a word-line.

Clause 76: The method of any of the clauses 74 or 75, wherein a second virtual cross-section image is computed in an isolating layer.

Clause 77: The method of any of the clauses 72 or 76, further comprising the step of performing a mutual lateral alignment of each of the sequence of N cross-section image slices with at least one common cross-section image feature.

Clause 78: The method of any of the clauses 72 or 77, further comprising: forming at least one alignment feature in the proximity of the inspection volume configured for forming the at least one common cross-section image feature; and performing a mutual lateral alignment of the sequence of N cross-section image slices with the at least one common cross-section image feature.

Clause 79: The method of any of the clauses 72 or 78, further comprising loading the wafer on the wafer support table in the dual beam device.

Clause 80: The method of any of the clauses 72 or 79, further comprising generating, for each of the sequence of N cross-section image slices, a depth map $Z(x,y;n)$ with index $n=1 \ldots N$ for each of the N cross-section image slices.

Clause 81: The method of clause 80, further comprising determining at least one second cross-section image feature in each of the sequence of N cross-section image slices, the at least one second cross-section image feature representing a cross section through second semiconductor features oriented in parallel to the wafer surface 55.

Clause 82: The method of clause 81, wherein the depth map $Z(x,y;n)$ of each of the cross-section image slices with index $n=1 \ldots N$ is generated from the lateral positions of the at least one second cross-section image feature.

Clause 83: The method of any of the clauses 72 or 82, wherein the number N of cross-section images slices is at least N=10 (e.g., N>100, N is about 1000 or more).

Clause 84: The method of any of the clauses 72 or 82, wherein the number N of milling surfaces is below 50, such as below 20, and the inspection volume is separated in a plurality of B blocks 181.1 . . . 181.B arranged diagonal through the inspection volume.

Clause 85: A method of obtaining at least a virtual cross-section image from a set of cross-section image slices, comprising the steps of: obtaining a sequence of N cross-section image slices by alternately imaging and milling into an inspection volume inside a wafer at a slant angle GF a sequence of N cross section surfaces; determining a first orientation direction of first semiconductor features, the first semiconductor features forming a first plurality of first cross-section image features in the sequence of N cross-section image slices; and computing a virtual cross-section image perpendicular to the first orientation direction, the virtual cross-section image comprising a plurality of virtual cross-section image pixels, whereby for each virtual cross-section image pixel a pixel value is computed by a projection of a subset of at least one cross-section image slice of the sequence of N cross-section image slices in the first orientation direction and by an interpolation of the pixel value from the projection of the subset of at least one cross-section image slice.

Clause 86: The method of clause 85, wherein for each virtual cross-section image pixel, the subset of at least one cross-section image slice is selected by evaluating the distance of each of the sequence of N cross-section image slices to the virtual cross-section image pixel in the first orientation direction and selecting at least a first cross-section image slice with minimum distance.

Clause 87: The method of clause 86, wherein a second cross-section image slice of the subset of at least one cross-section image slice is selected accordingly as the cross-section image slice with a second minimum distance.

Clause 88: The method of any of the clauses 86 to 87, wherein further cross-section image slices of the subset of at least one cross-section image slice are selected in sequence of increasing distances to the virtual cross-section image pixel in the first orientation direction.

Clause 89: The method of any of the clauses 85 to 88, wherein the step of the projection of the subset of at least one cross-section image slice and interpolation of the pixel value from the projection of the subset of at least one cross-section image slice comprises projection and interpolation of at least a subset of the first plurality of first cross-section image features to form a third plurality of first cross-section image features in the virtual image slice.

Clause 90: The method of any of the clauses 85 to 89, wherein the step of projection and interpolation is combined with at least one of a feature extraction, a thresholding operation, a contour interpolation or a model-based interpolation.

Clause 91: The method of any of the clauses 85 to 90, further comprising generating, for each of the sequence of N cross-section image slices, a depth map $Z(x,y;n)$ with index $n=1 \ldots N$ for each of the N cross-section image slices.

Clause 92: The method of clause 91, wherein the depth map $Z(x,y;n)$ of each of the cross-section image slices with index $n=1 \ldots N$ is generated from a plurality of second cross-section image features, the plurality of second cross-section image features representing cross sections through second semiconductor features oriented in a second orientation direction, the second orientation direction being perpendicular to the first orientation direction.

Clause 93: The method of clauses 91 to 92, wherein the depth map $Z(x,y;n)$ of each of the cross-section image slices with index $n=1 \ldots N$ is generated by determining the depth of a first cross-section image feature in a cross-section image slice from the lateral positions of at least two second cross-section image features.

Clause 94: The method of any of the clauses 85 to 93, wherein the first semiconductor features comprises at least of one of a via, a HAR structure, or a HAR channel of an integrated semiconductor circuit inside the inspection volume of the wafer.

Clause 95: The method of clause 94, wherein the second semiconductor features comprise at least one of an isolator line or layer, a metal line or layer, or a semiconductor line or layer of an integrated semiconductor circuit inside the inspection volume of the wafer.

Clause 96: The method of any of the clauses 93 to 95, further comprising: determining at least one first cross-section image feature in each of the sequence of N cross-section image slices; and determining at least one second cross-section image feature in each of the sequence of N cross-section image slices.

Clause 97: The method of any of the clauses 85 to 96, wherein the first orientation direction is the z-direction perpendicular to the wafer surface and the virtual cross-section image slice is computed in a plane parallel to the wafer surface at a depth ZV below a wafer surface.

Clause 98: The method of clause 97, wherein for each virtual cross-section image pixel coordinate (x,y), the subset of at least one cross-section image slices is determined by selecting at least the mth cross-section image slice with minimum distance to the depth ZV, such that distance Zrv(m)=Z(x,y;m)−ZV is the minimum value of all depth maps Z(x,y;n) with index n=1 . . . N.

Clause 99: The method of clause 98, wherein a second and further cross-section image slices of the subset of at least one cross-section image slice is selected in sequence of increasing distances Zrv(n) to the virtual cross-section image pixel in the Z-direction.

Clause 100: The method of any of the clauses 97 to 99, wherein the depth ZV is adjusted according the depth of layers parallel to the wafer surface, wherein the layers are formed by second semiconductor features oriented in a second orientation direction parallel to the wafer surface.

Clause 101: The method of any of the clauses 97 to 100, wherein a first virtual cross-section image slice is computed at a depth ZV1 in an isolation layer between two adjacent metal layers or word-lines.

Clause 102: The method of any of the clauses 97 to 101, wherein a second virtual cross-section image slice is computed at a depth ZV2 inside a metal layer of word-line.

Clause 103: The method of any of the clauses 85 to 102, wherein an optical axis of a charged particle beam imaging system for acquiring the sequence of N cross-section image slices is oriented perpendicular to the wafer surface, such that an angle GE=0° for the angle GE between the optical axis and the z-axis normal to the wafer surface.

Clause 104: The method of any of the clauses 85 to 103, further comprising the step of performing a mutual lateral alignment of each of the sequence of N cross-section image slices with at least one common cross-section image feature.

Clause 105: The method of any of the clauses 85 to 104, comprising further the step of forming at least one alignment feature in the proximity of the inspection volume configured for forming the at least one common cross-section image feature for mutual lateral alignment.

Clause 106: The method of any of the clauses 104 to 105, wherein the step of mutual lateral image alignment includes subtraction of an image distortion deviation.

Clause 107: The method of any of the clauses 85 to 106, wherein the number N of cross-section images slices is at least N=10 (e.g., N>100, N is about 1000 or more).

Clause 108: The method of any of the clauses 85 to 107, further comprising: loading the wafer on a wafer support table in a dual beam device, the dual beam device comprising at least a FIB column and a charged particle imaging device, with a first optical axis of the FIB column forming the slanted angle GF with a surface of the wafer support table, and a second optical axis of the charged particle imaging device forming an angle GE with the normal to the surface of a wafer support table, the first and second optical axes forming an intersection point; and moving the wafer support table to bring a first measurement site on the wafer in coincidence with an intersection point of the dual beam device.

Clause 109: The method of clause 108, wherein during the step of obtaining the sequence of N cross-section image slices in the inspection volume, the wafer is not moved.

Clause 110: A Computer program product with a program code for executing any of the methods according to any one of the clauses 85 to 109.

Clause 111: A dual beam device, configured to perform any of the methods according to any one of clauses 85 to 109.

Clause 112: The wafer defect inspection device configured to perform a method according to any of the clauses 85 to 109, comprising: a wafer stage for holding a wafer; a focused ion beam (FIB) column configured for milling and exposing a sequence of N cross-section surface in an inspection volume inside the wafer at a slant angle GF to a surface of the wafer; a charged particle imaging device configured for imaging a sequence of N cross-section surfaces to form a sequence of N cross-section image slices; and an image processing unit with a software code installed configured to determine from the sequence of N cross-section image slices a virtual cross-section image, wherein the virtual cross-section image is oriented parallel to the surface of the wafer.

Clause 113: The wafer defect inspection device of clause 112, wherein the slant angle GF of the FIB column is between 30° and 80°, such as between 30° an 45°.

Clause 114: The wafer defect inspection device of clause 112 or 113, wherein the charged particle imaging device is oriented perpendicular to the wafer surface.

Clause 115: The wafer defect inspection device of any of the clauses 112 to 114, wherein the charged particle imaging device is a Helium Ion Microscope (HIM).

Clause 116: A dual beam device for wafer inspection, comprising: a wafer stage for supporting a wafer; a Gallium FIB column arranged at an angle GF to a support surface of the sample support stage, configured for milling at least a cross section surface into a wafer at the angle GF; a Helium Ion beam column arranged perpendicular to the support surface of the wafer stage, configured for generating an cross section image slice of the cross section surface by a single image scan; a secondary electron detector, configured to collect a plurality of secondary electrons during the single image scan; and an operation unit configured for operation control of the dual beam device during use.

Clause 117: The dual beam device of clause 116, wherein the FIB is configured to mill the cross section surface into a depth range below the wafer surface extending over more than 1 μm, more than 2 μm or even more than 6 μm.

Clause 118: The dual beam device of any of the clauses 116 to 17, wherein the operation unit further comprises an image processing unit for performing at least one of a feature extraction, edge detection, pattern recognition, or pixel interpolation.

Clause 119: The dual beam device of clause 118, wherein the image processing unit if further configured for computing one of a depth map, a 3D volume image, or a virtual cross section image.

Clause 120: The dual beam device of any of the clauses 118 to 19, wherein the operation unit further comprises a defect detection unit for computing one of a dimension, an area, a diameter, an angle or a shape of a semiconductor feature.

Clause 121: The dual beam device of clause 120, wherein the defect detection unit is further configured for computing one of an average, a statistical deviation of plurality of semiconductor features.

Clause 122: A wafer inspection method for 3D inspection of an inspection volume in a wafer, the inspection volume having a depth range of more than 1 µm (e.g., more than 2 µm, more than 6 µm, 10 µm), generating by the 3D inspection an image with a lateral resolution of below 2 nm (e.g., below 1 nm, below 0.5 nm), wherein the 3D inspection of the inspection volume is performed at the wafer.

Clause 123: The method of clause 122, wherein the image is a 3D image.

Clause 124: The method of any of the clauses 122 or 123, comprising further a step of milling at least a cross section surface through the depth range of the inspection volume with a FIB column.

Clause 125: The method of clause 124, wherein the image is obtained by obtaining at least an image of the at least one cross section surface through the inspection volume with a Helium Ion microscope in a single image scan.

Clause 126: The method of any of the clauses 122 or 125, further comprising an image processing, performing at least one of a feature extraction, edge detection, pattern recognition, or pixel interpolation.

Clause 127: The method of any of the clauses 122 or 126, further comprising the step of computing one of a depth map, a 3D volume image, or a virtual cross section image.

Clause 128: The method of any of the clauses 122 or 127, further comprising the step of computing one of a dimension, an area, a diameter, an angle or a shape of a semiconductor feature.

Clause 129: The method of any of the clauses 122 or 128, further comprising the step of computing one of an average, a statistical deviation of plurality of semiconductor features.

Clause 130: A method of forming a 3D volume image from a sequence of cross section image slices, comprising: obtaining the sequence of N cross section images slices comprising at least a first cross section image slice and a second cross section image slice of an inspection volume, wherein obtaining the first and second cross section image slices includes subsequently exposing at least a first and a second cross section surface in the inspection volume by milling into the inspection volume with a FIB column approximately at an angle GF, and imaging the at least first and the second cross section surfaces with the charged particle imaging device to obtain the at least first and second cross section image slice, wherein the first cross section image surface is milled with a larger extension in a direction perpendicular to the FIB beam compared to the second cross section surface, such that after forming the second cross section surface a parallel surface segment of the first cross section surface is remaining.

Clause 131: A method according to clause 130, further comprising the step of forming at least one alignment feature on the parallel surface segment of the first cross section surface for a first mutual lateral alignment of the first and the second cross section image slices.

Clause 132: A method according to clause 132, further comprising the steps of: determining at least one first cross section image feature in the first and in the second cross section image slice; and performing a second mutual lateral alignment of the first and the second cross section image slices based on the first mutual lateral alignment to achieve a predefined mutual position accuracy of the first and second cross section image slices.

Clause 133: The method of clause 133, wherein the first cross section image feature is a cross section of a via, a HAR structure, or a HAR channel.

Clause 134: A method according to clause 132 or 133, further comprising the steps of: determining at least one second cross section image feature in the first and in the second cross section image slice; determining the depths of the at least one first cross section image feature in the first cross section image slice from a lateral position of the at least one second cross section image feature in the first cross section image slice; determining the depths of the at least one first cross section image feature in the second cross section image slice from a lateral position of the at least one second cross section image feature in the second cross section image slice; and considering the depths in the second mutual lateral alignment to achieve a mutual position accuracy of the at least first and second cross section image slices below 5 nm, below 3 nm or even below 2 nm.

Clause 135: The method of clause 134, wherein the at least one second cross section image features are formed by cross sections of one of an isolator line or layer, a metal line or layer, a semiconductor line or layer.

Clause 136: A method according to clauses 134 or 135, further comprising: the computation of a first displacement $\Delta Y'_{Ch}$ of the first cross section image feature between the first cross section image slice and the second cross section image slice; the computation of a second displacement $\Delta Y'_{WL}$ of the second cross section image feature between the first cross section image slice and the second cross section image slice; the determination of a distance d between the first and second cross section image slice; and the determination of a mutual lateral displacement vector $\Delta Y'$ between the first and second cross section image slice.

Clause 137: A method according to any of the clauses 130 to 136, wherein the slant angle GF is adjusted between 250 and 45°, or between 30° and 36°.

Clause 138: A method of forming a precision alignment of a plurality of cross section image slices, obtained from within an inspection volume below a wafer surface, the method comprising: obtaining a sequence of cross section image slices form a sequence of cross section image surfaces formed by consecutively milling the sequence of cross section surfaces with a FIB column arranged under a slant angle GF to a wafer surface and imaging each of the cross section surfaces with a charged particle imaging column arranged under an angle GE to the normal to the wafer surface for acquiring the sequence of cross section image slices, the sequence of cross section image slices comprise a first and a second cross section image slice; performing a first, coarse alignment of the first and second cross section image slice to obtain a mapping of cross section image features in the first and second cross section image slice; and performing a second, precision alignment of the first and second cross section image slice to achieve a mutual position accuracy with an accuracy below 5 nm, 3 nm or even below 2 nm.

Clause 139: A method according clause 138, further the steps of: forming the first cross section surface by milling with a larger extension in a direction perpendicular to the FIB beam compared to the second cross section surface, such that after forming the second cross section surface a parallel surface segment of the first cross section surface is remaining; and forming at least one alignment feature on the parallel surface segment of the first cross section surface for the first mutual lateral alignment of the first and the second cross section image slices.

Clause 140: A method according to clause 138 or 139, further comprising the steps of: determining at least one first cross section image feature in the first and in the second cross section image slice; determining at least one second cross section image feature in the first and in the second cross section image slice; determining the depths of the at least one first cross section image feature in the first cross section image slice from a lateral position of the at least one second cross section image feature in the first cross section image slice; determining the depths of the at least one first cross section image feature in the second cross section image slice from a lateral position of the at least one second cross section image feature in the second cross section image slice; and considering the depths in the second precision alignment.

Clause 141: A method according to clause 140, further comprising: the computation of a first displacement $\Delta Y'_{Ch}$ of the first cross section image feature between the first cross section image slice and the second cross section image slice; the computation of a second displacement $\Delta Y'_{WL}$ of the second cross section image feature between the first cross section image slice and the second cross section image slice; the determination of a distance d between the first and second cross section image slice; and the determination of a mutual lateral displacement vector $\Delta Y'$ between the first and second cross section image slice.

Clause 142: The method of any of the clauses 140 to 141, wherein the at least one first cross section image feature is a cross section of a via, a HAR structure, or a HAR channel.

Clause 143: The method of any of the clauses 140 to 142, wherein the at least one second cross section image features are formed by cross sections of one of an isolator line or layer, a metal line or layer, a semiconductor line or layer.

Clause 144: A method according to any of the clauses 138 to 143, wherein the slant angle GF is adjusted between 250 and 45°, such as between 30° and 36°.

Clause 145: A method according to any of the clauses 140 to 144, wherein the angle GE is adjusted to be 0°.

Clause 146: A Computer program product with a program code for executing any of the methods according to any one of the clauses 130 to 146.

Clause 147: A dual beam device, configured to perform any of the methods according to any one of clauses 130 to 146.

LIST OF REFERENCE NUMBERS

1 Dual Beam device
2 Operation Unit
4.1, 4.2, 4.3 first cross section image features
6.1, 6.2 measurement sites
8 wafer
10 semiconductor sample
11 cross section surface
13 inspection volume
15 wafer support table
16 stage control unit
17 Secondary Electron detector
19 Control Unit
20 alignment mark
22 alignment trench or edge
23 parallel surface segment of the first cross section surface
24 alignment mark
25 integrated circuit feature
26.1, 26.2, 26.3 image segment
28 image segment
30 depth extension
32.1, 32.2, 32.3 alignment features
34 depth level DLZ
36 distance of alignment features
38 alignment features
40 charged particle beam (CPB) imaging system
42 Optical Axis of imaging system
43 Intersection point
44 Electron beam
46 scanning imaging lines
48 Fib Optical Axis
50 FIB column
51 focused ion beam
52 cross section surface
53 cross section surface
54 cross section surface
55 wafer top surface
58 FIB beam point of coincidence
60 slice distance at wafer surface
62 slice distance at the bottom of the inspection volume
64 angular spread GZ
66 first milling angle
68 second milling angle
72 lower surface of Layer L1
73.1, 73.2, 73.3 second cross section image feature
74 upper boundary of Layer L4
75 pillar like HAR structure
76.1, 76.2 top edge of cross section surfaces
77.1, 77.2, 77.3 cross section image segments of HAR channels
78 vertical edge of a HAR structure
79.1 centroid of cross section image feature
80 horizontal edge of a layer
82 image processing unit
84 defect detection unit
86 charged particle column control unit
88 Interface Unit
90 angular spread of FIB in x
92 proximal trench
94 distal trench
96 first cross section surface
100.1, 100.2, 100.3 2D cross section images
1000 sequence of 2D cross section images
121 virtual cross section image slice
123 pixel raster in y-direction
125 interpolation direction for HAR structures
140 Helium Ion Microscope (HIM)
142 Optical Axis of HIM
146 Inspection site
148 Alignment feature
150 Image of alignment feature 148
152 single scanning line in x-direction
155 wafer stage
160 inspection volume
162 plurality of alternating layers
164 plurality of HAR structures
166.1, 166.2 virtual cross sections
175 Cross section of conducting layer or word line
177.1, 177.2 Cross section of HAR structure
179.1, 179.2 virtual cross section of HAR structure
181.1, 181.b blocks of inspection volumes
191 deep inspection volume
201 representative vertical HAR profile
203 cross section image features
205 HAR structures
207 digital image

What is claimed is:

1. A method, comprising:
alternately imaging and milling into an inspection volume of a wafer at a slant angle to obtain a sequence of N cross-section surfaces of the wafer and a corresponding sequence of N cross-section image slices of the wafer;
determining a first orientation direction of first semiconductor features of the wafer, the first semiconductor features forming a first plurality of first cross-section image features in the sequence of N cross-section image slices of the wafer; and
computing a virtual cross-section image perpendicular to the first orientation direction, the virtual cross-section image comprising a plurality of virtual cross-section image pixels,
wherein, for each virtual cross-section image pixel, the method comprises:
computing a pixel value by projecting a subset of at least one cross-section image slice of the sequence of N cross-section image slices in the first orientation direction;
selecting the subset of the at least one cross-section image slice by evaluating a distance of each of the sequence of N cross-section image slices to the virtual cross-section image pixel in the first orientation direction; and
selecting a first cross-section image slice having the shortest distance to the virtual cross-section image pixel in the first orientation direction.

2. The method of claim 1, further comprising selecting a second cross-section image slice of the subset of the at least one cross-section image slice as the cross-section image slice having the second shortest distance to the virtual cross-section image pixel in the first orientation direction.

3. The method of claim 1, further comprising selecting further cross-section image slices of the subset of the at least one cross-section image slice in sequence of increasing distances to the virtual cross-section image pixel in the first orientation direction.

4. The method of claim 1, wherein the projection of the subset of the at least one cross-section image slice comprises an interpolation of at least a subset of the first plurality of first cross-section image features.

5. The method of claim 4, further comprising combining the projection and the interpolation with at least one member selected from the group consisting of a feature extraction, a thresholding operation, a contour interpolation, and a model-based interpolation.

6. The method of claim 1, further comprising, for each of the sequence of N cross-section image slices, generating a depth map.

7. The method of claim 6, further comprising, for each depth map, generating the depth map from a plurality of second cross-section image features, wherein the plurality of second cross-section image features represent cross sections through second semiconductor features oriented in a second orientation direction perpendicular to the first orientation direction.

8. The method of claim 7, wherein each of the second semiconductor features comprise at least one member selected from the group consisting of an isolator line or layer, a metal line or layer, and a semiconductor line or layer of an integrated semiconductor circuit inside the inspection volume of the wafer.

9. The method of claim 7, further comprising, in each of the sequence of N cross-section image slices, determining:
at least one of the first cross-section image features; and
at least one of the second cross-section image features.

10. The method of claim 7, further comprising, for each depth map, generating the depth map by determining a depth of a first cross-section image feature in a cross-section image slice from lateral positions of at least two of the second cross-section image features.

11. The method of claim 1, wherein each of the first semiconductor features comprises at least of one member selected from the group consisting of a via, a high aspect ratio (HAR) structure, and a HAR channel of an integrated semiconductor circuit inside the inspection volume of the wafer.

12. The method of claim 1, wherein the first orientation direction is in a direction perpendicular to the wafer surface, and the virtual cross-section image slice is computed in a plane parallel to the wafer surface at a depth below the wafer surface.

13. The method of claim 12, further comprising, for each virtual cross-section image pixel coordinate, determining the subset of the at least one cross-section image slices by selecting the cross-section image slice with a minimum distance to the depth below the wafer surface.

14. The method of claim 13, further comprising selecting at least two additional cross-section image slices of the subset of the at least one cross-section image slice in sequence of increasing distances to the virtual cross-section image pixel in the direction perpendicular to the wafer surface.

15. The method of claim 12, further comprising adjusting the depth direction perpendicular to the wafer surface according to the depth of layers parallel to the wafer surface, wherein the layers are formed by second semiconductor features oriented in a second orientation direction parallel to the wafer surface.

16. The method of claim 12, further comprising computing the virtual cross-section image slice at a depth direction perpendicular to the wafer surface inside an isolation layer between two adjacent metal layers or word-lines.

17. The method of claim 12, further comprising computing the virtual cross-section image slice is computed at a depth direction perpendicular to the wafer surface inside a metal layer or inside a word-line.

18. The method of claim 1, further comprising orienting an optical axis of a charged particle beam imaging system configured to acquire the sequence of N cross-section image slices such that an angle between the optical axis of the charged particle beam imaging system and a normal to the wafer surface is 0°.

19. The method of claim 1, further comprising orienting an optical axis of a charged particle beam imaging system configured to acquire the sequence of N cross-section image slices perpendicular such that the optical axis of the charged particle beam is perpendicular an optical axis of a focused ion beam used to mill into the inspection volume.

20. The method of claim 1, further comprising performing a mutual lateral alignment of each of the sequence of N cross-section image slices with at least one common cross-section image feature.

21. The method of claim 20, comprising further forming at least one alignment feature in proximity of the inspection volume configured to form the at least one common cross-section image feature to perform the mutual lateral alignment.

22. The method of claim 20, wherein performing the mutual lateral image alignment comprises subtraction of an image distortion deviation.

23. The method of claim 1, wherein the number N is at least 10.

24. The method of claim 1, further comprising:
loading the wafer on a wafer support table in a dual beam device, the dual beam device comprising a focused ion beam (FIB) column and a charged particle imaging device, an optical axis of the FIB column being at the slant angle GF with a surface of the wafer support table, the charged particle imaging device having an optical axis that forms an intersection point with the optical axis of the FIB column; and
moving the wafer support table to bring a first measurement site on the wafer in coincidence with the intersection point.

25. The method of claim 24, wherein, when of obtaining the sequence of N cross-section image slices in the inspection volume, the wafer is not moved.

26. A system comprising:
one or more processing devices; and
one or more machine-readable hardware storage devices comprising instructions that are executable by the one or more processing devices to perform operations comprising the method of claim 1.

27. The system of claim 26, further comprising:
a wafer stage having a wafer support table configured to hold the wafer;
a focused ion beam (FIB) column configured to mill and expose the sequence of N cross-section surface in the inspection volume; and
a charged particle imaging device configured to image the sequence of N cross-section surfaces to form the sequence of N cross-section image slices,
wherein:
the focused ion beam comprises an optical axis forming the slant angle with a surface of the wafer support table; and
the charged particle imaging device comprises an optical axis that forms an intersection point with the optical axis of the FIB column.

28. The system of claim 27, wherein the slant angle is between 20° and 60°.

29. The system of claim 27, wherein the optical axis of the charged particle imaging device is perpendicular to the wafer surface.

30. The system of claim 27, wherein the charged particle imaging device is perpendicular to the optical axis of the FIB column.

31. One or more machine-readable hardware storage devices comprising instructions that are executable by one or more processing devices to perform operations comprising the method of claim 1.

* * * * *